United States Patent

Thompson et al.

[11] 4,393,486
[45] Jul. 12, 1983

[54] METHOD FOR INTERPRETING WELL LOG RECORDS TO YIELD INDICATIONS OF GAS/OIL IN AN EARTH FORMATION SUCH AS A SANDSTONE, LIMESTONE, OR DOLOSTONE

[75] Inventors: Don D. Thompson, Corona Del Mar; Robert J. S. Brown, Fullerton; Richard J. Runge, Anaheim, all of Calif.

[73] Assignee: Chevron Research Company, San Francisco, Calif.

[21] Appl. No.: 200,702

[22] Filed: Oct. 27, 1980

Related U.S. Application Data

[63] Continuation-in-part of Ser. No. 82,382, Oct. 5, 1979, abandoned.

[51] Int. Cl.³ .......................... G01V 1/36; G01V 1/30
[52] U.S. Cl. ........................................ 367/73; 367/75; 364/421
[58] Field of Search .................. 367/73, 75; 364/421, 364/422; 181/102; 175/50

[56] References Cited

U.S. PATENT DOCUMENTS 3,241,102  3/1966  Peterson .............................. 367/75

OTHER PUBLICATIONS

Zemtsova, "Razvedochnaya Geofiziker", 1966, pp. 3–17, #15.

Primary Examiner—Nelson Moskowitz
Attorney, Agent, or Firm—H. D. Messner; Edward J. Keeling

[57] ABSTRACT

The present invention indicates that acoustic characteristics associated with a first well penetrating a gas/oil-containing strata such as a sandstone, limestone or dolostone, can be normalized (and favorably compared) with similar characteristics of a second, contiguous well of known hydrocarbon potential, such characteristics being calculated and displayed by means of a machine-implemented data processing method in which well logging and geologic data are fed thereto to calculate such characteristics without the need for shear-wave velocities.

In more detail, in accordance with the invention brine-saturated bulk and shear moduli, (i.e., $Kw^*$ and $Gw^*$) of a sandstone, limestone or dolostone penetrated by the second well can be predicted as a function of, say, brine-saturated P-wave modulus ($Pw^*$) alone (independent of shear-wave velocity). In that way, resulting acoustic values including distinct velocity and amplitude values as a function of a saturation operator can ultimately be provided. Such values, when compared to actual, in-well, field-generated characteristics of the first well, are surprisingly accurate predictors of the amount of gas/oil saturation in and around the first well. The method has particular accuracy in designating gas zones within formations of interest due to use of the complete Benedict-Webb-Rubin non-ideal gas law in pseudo-reduced form.

12 Claims, 5 Drawing Figures

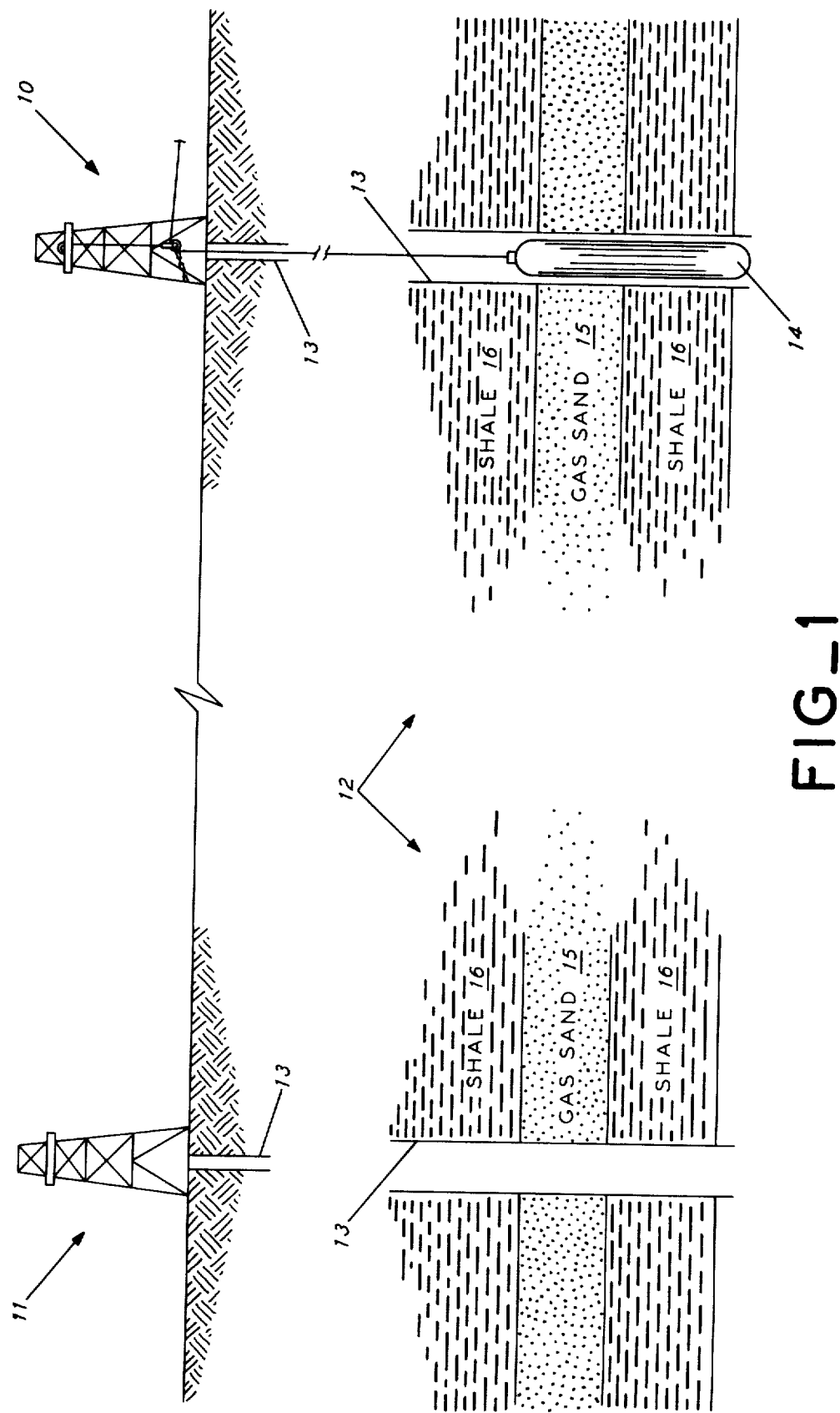
FIG_1

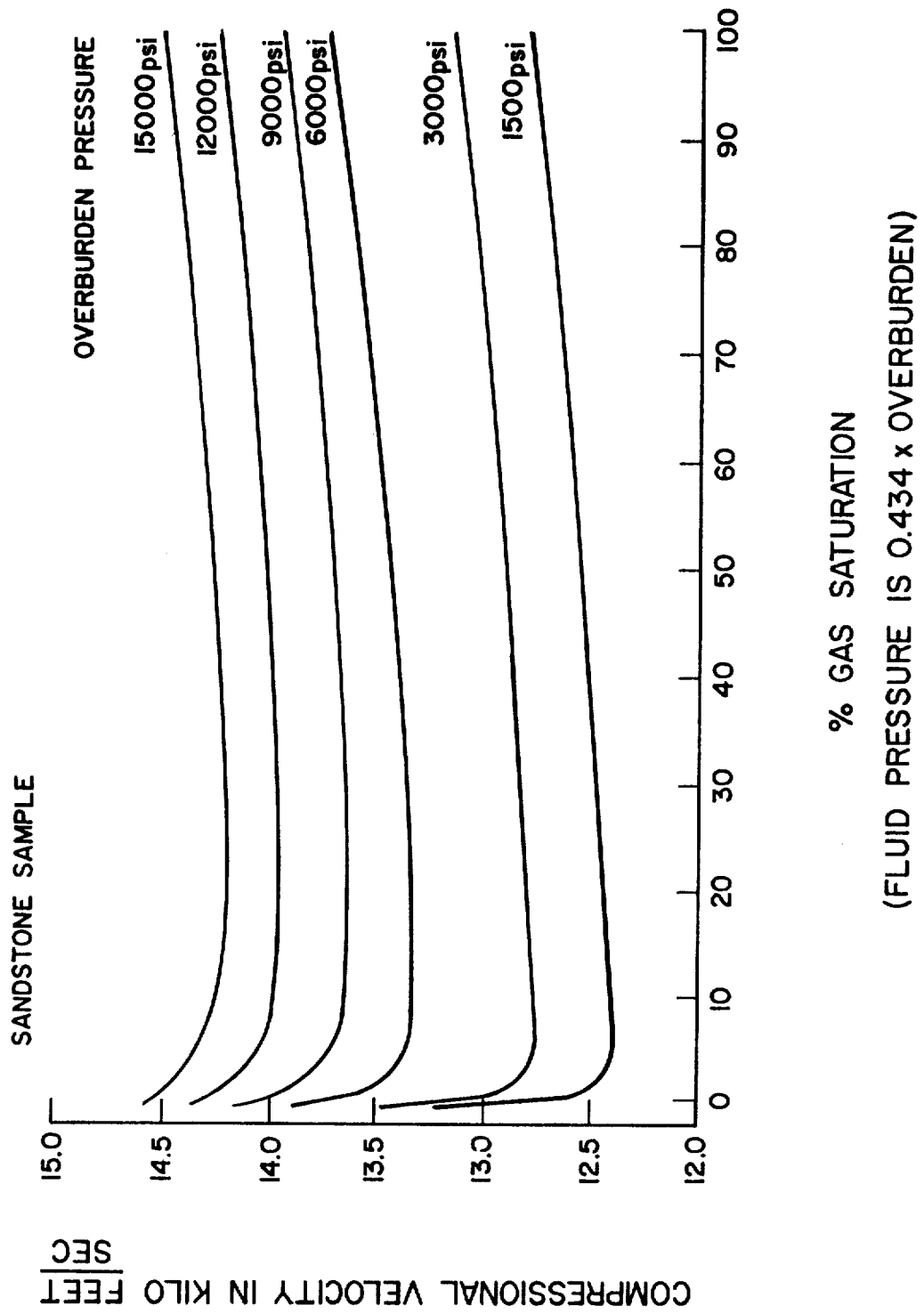
FIG_2

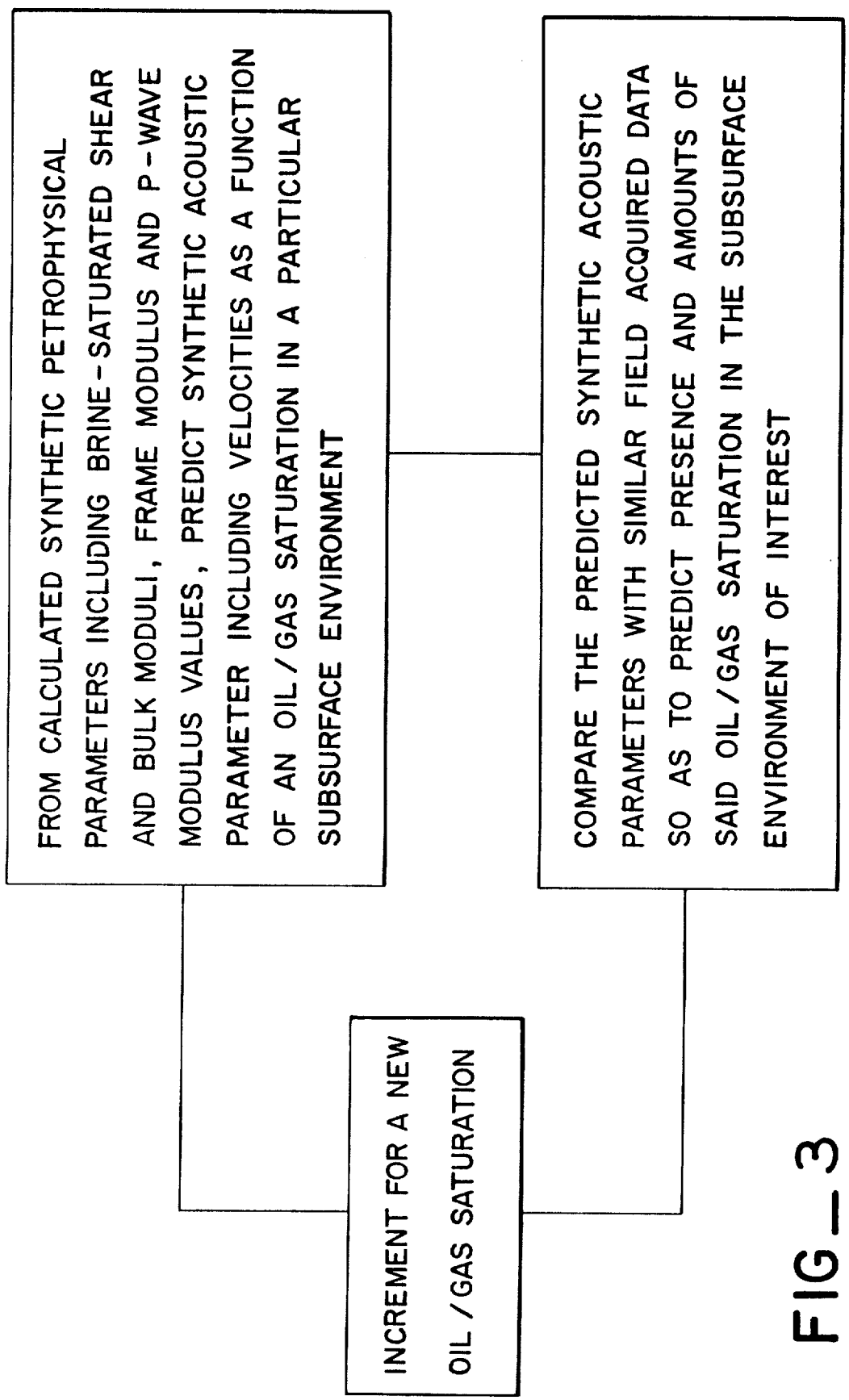
FIG_3

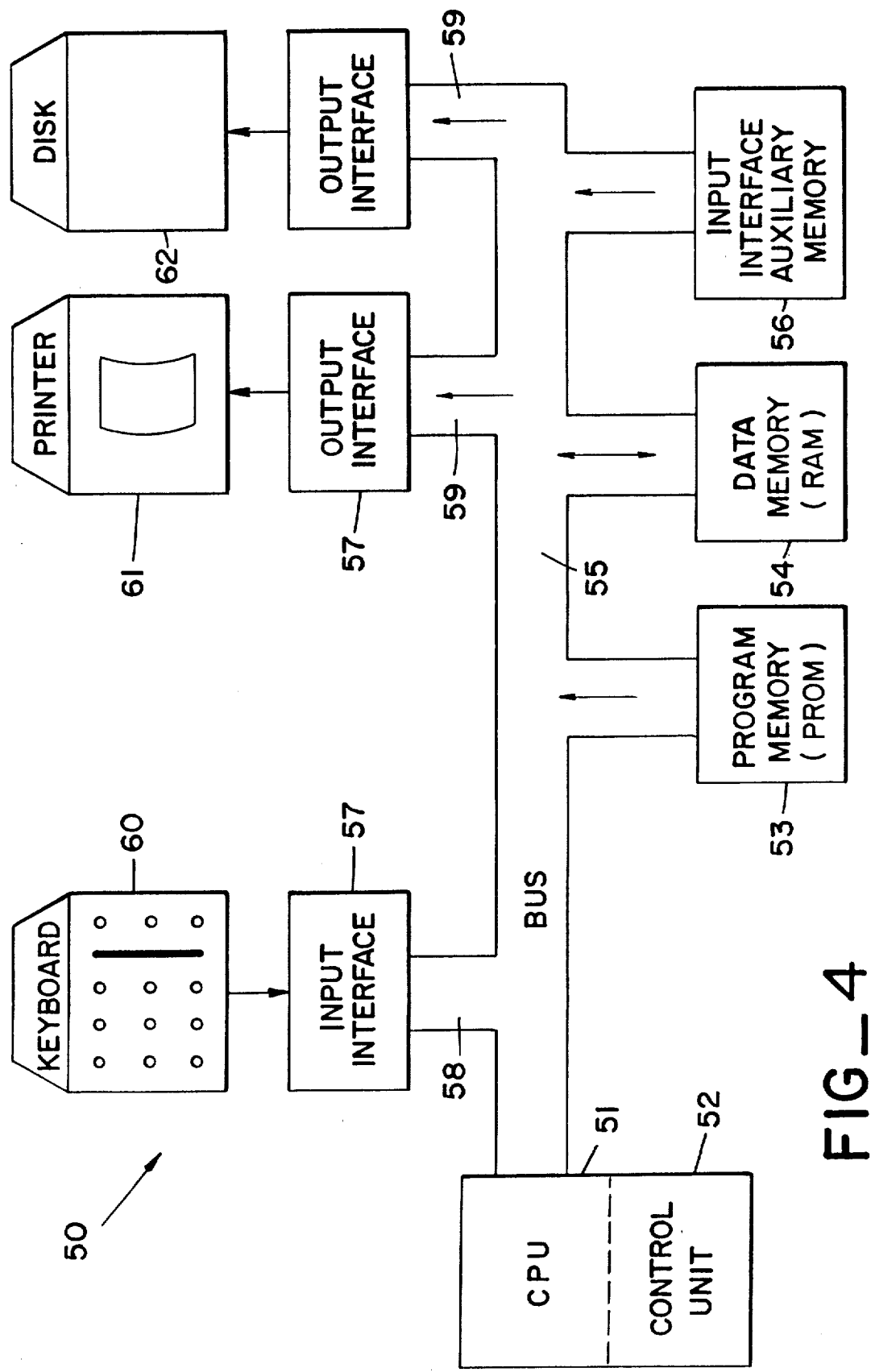
FIG_4

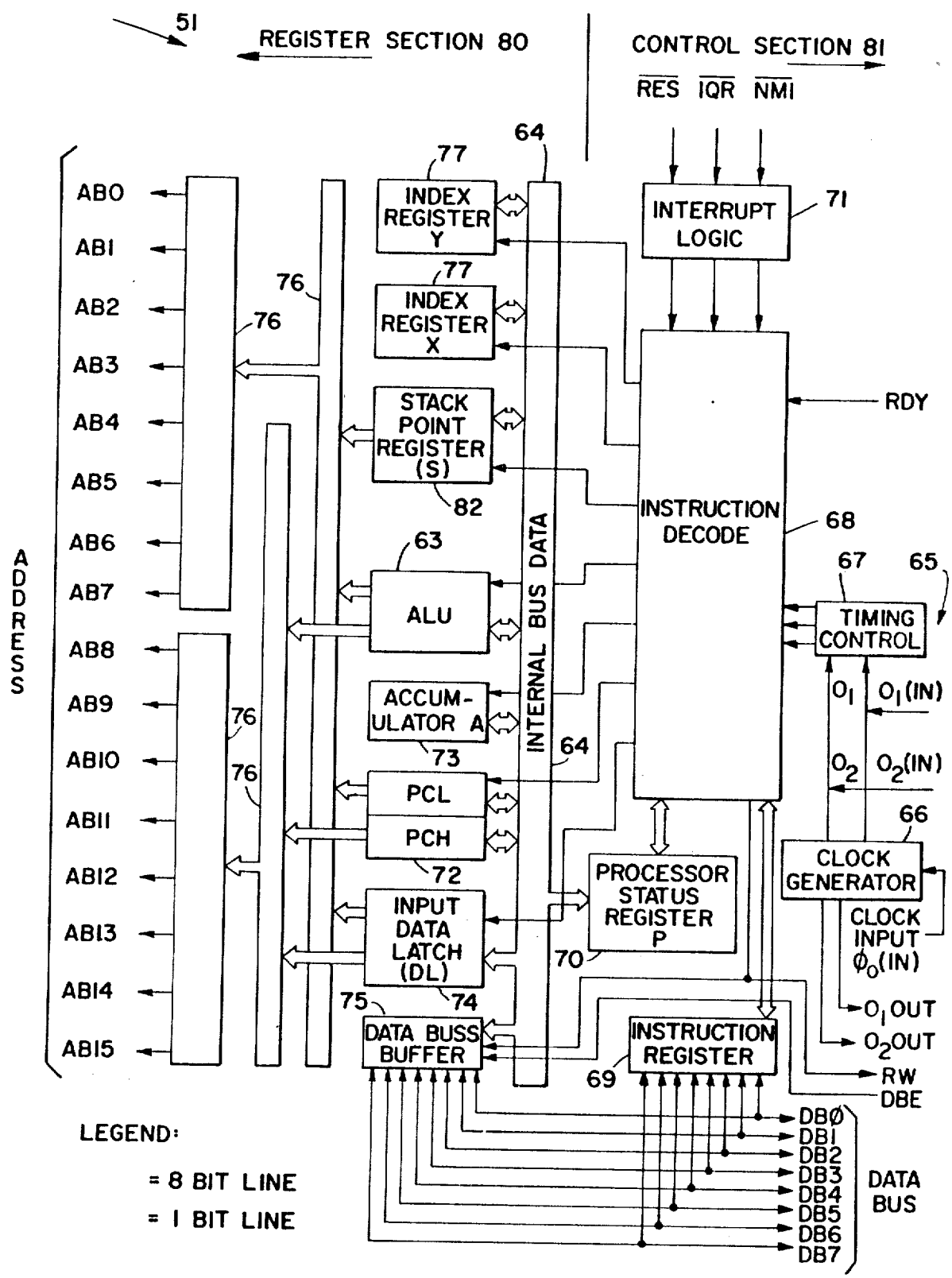
FIG_5

METHOD FOR INTERPRETING WELL LOG RECORDS TO YIELD INDICATIONS OF GAS/OIL IN AN EARTH FORMATION SUCH AS A SANDSTONE, LIMESTONE, OR DOLOSTONE

This is a continuation-in-part of application Ser. No. 82,382, filed Oct. 5, 1979.

DISCLAIMER

While the Abstract, supra, has been carefully written, the purpose of such statements is to provide a non-legal description of the contents of this application as a searching, scanning and classification aid for technical persons. Accordingly, all hereinbefore-presented statements are not intended to be used in understanding or otherwise comprehending the principles of the invention hereinafter described in detail and are not, more particularly, to be used in interpreting or in any way limiting the scope or fair interpretation of the claims appended hereto.

RELATED APPLICATIONS

Don D. Thompson, Robert J. S. Brown and Richard J. Runge, Ser. No. 322,509, filed Nov. 18, 1981 for "Method for Interpreting Seismic Records to Yield Indications of Gas/Oil in an Earth Formation", and Ser. No. 83,187, filed Oct. 9, 1979, for "Method for Interpreting Seismic Records to Yield Indications of Gas/Oil in an Earth Formation Such as a Sandstone, Limestone, or Dolostone".

FIELD OF THE INVENTION

The present invention pertains to the art of well logging, and more particularly to the art of interpreting amplitude and velocity anomalies observed on well logs into diagnostic indicators of the presence and amounts of gas/oil in the surrounding subsurface strata.

BACKGROUND OF THE INVENTION

For several decades, well logs have been used by oilfield operators for a variety of purposes, inter alia, to indicate presence of oil and gas, to determine lithology, to indicate stratigraphy, etc. Identifying the content of a producing basin has also been of particular interest. Such information often can be constructed using data taken from two or more contiguous wells within the region of interest; however, the results provided by such analysis have not always been accurate, especially in the area of predicting gas saturation based on the characteristics of the amplitude anomalies of the well logs.

The present invention improves the ability of the well log interpreter to correctly interpret gas as well as gas/oil content of a formation penetrated by a first well normalized to (and comparable with) a series of patterned acoustic characteristics associated with zones of similar mineralogy and determinable gas or gas/oil saturations of a second contiguous well.

OBJECT OF THE INVENTION

An object of the invention is the provision of a novel method of correctly predicting gas and/or gas/oil saturations of hydrocarbon-bearing structures using at least in part anomalies provided by well logs.

SUMMARY OF THE INVENTION

The present invention indicates that acoustic characteristics associated with a first well penetrating a gas/oil-containing strata such as sandstone, limestone or dolostone can be normalized (and favorably compared) with similar synthetic values of a second, contiguous well, such values being calculated and displayed by means of a machine-implemented data processing method in which well logging and geologic data are fed thereto to calculate such values.

In more detail, in accordance with the invention brine-saturated bulk and shear moduli, (i.e., $Kw^*$ and $Gw^*$) of a sandstone, limestone or dolostone penetrated by the second well can be predicted, say, as a function of brine-saturated P-wave modulus ($Pw^*$) (independent of shear-wave velocity), thereafter a surprisingly accurate estimation of bulk moduli of the fluid-filled pore spaces as a function of gas and/or oil saturation can occur. In that way, various synthetic values (say velocities, amplitudes, etc.) as a function of depth and of gas/oil saturation can be provided. Ultimately, such values when compared to actual field-generated values of the first well have accurate prognostic capabilities as to the amount of gas/oil saturation in the zone of interest. The method has particular accuracy in designating gas zones within formations of interest due to use of the complete Benedict-Webb-Rubin non-ideal gas law in pseudo-reduced form.

DESCRIPTION OF THE DRAWINGS

Further features of the invention will become more apparent upon consideration of the following detailed description of the invention when taken in connection with the accompanying drawings, wherein:

FIG. 1 is an elevational view of an earth formation penetrated by adjacent first and second wells wherein the first well has unknown hydrocarbon potential while the hydrocarbon potential of the second well is known (although it can be zero);

FIG. 2 is a plot of percentage of gas saturation vs. compressional velocity as a function of change in pressure (depth) of a particular subsurface material;

FIG. 3 is a diagram of process steps for carrying out the method of the present invention using, in at least part, programmed digital computing system; and FIGS. 4 and 5 are schematic diagrams of elements within the digital computing system of FIG. 3.

PREFERRED EMBODIMENTS OF THE INVENTION

Before discussion of an embodiment of the invention with an actual field environment, a brief description of the mathematical and theoretical concepts behind the discovery may prove beneficial and are presented below.

Firstly, it may be of interest to indicate lithology limitations associated with the present invention. Anomalies associated with gas or gas/oil sands or sandstone over shale rock cap are one example where the method of the present invention offers surprising predictive well-to-well capabilities. Another example relates to gas-saturated limestone or gas/oil-saturated limestone over shale. Still another is fluid-saturated dolostone capped by shale or the like. Secondly, it should be pointed out that certain relationships of various petrophysical parameters are also of great importance, viz., bulk and shear moduli of a rock formation as a function of the P-wave modulus in the zone of interest.

Now, in more detail, attention should be directed to the Figures, particularly FIG. 1, in which the field-collection phase of the present invention is shown. Note that, inter alia, FIG. 1 illustrates contiguous first and second wells 10 and 11 penetrating an earth formation 12. Each well 10, 11 includes a bore 13 in which a logging sonde 14 (shown within well 10) can be lowered and operated to provide well data. Particular purpose of the operating sonde 14: to provide well log velocity data by which the gas/oil saturation of sand 15 embedded in a shale stratum 16 can be determined, as set forth below. Parenthetically, the formation 12 is typical of a young, shallow geologic section found in the Gulf Coast of the United States.

Briefly, in accordance with the present invention, sonic velocity data from well 11 of known hydrocarbon potential is generated and then used in conjunction with data associated with well 10 to predict the hydrocarbon potential of the latter. The strata of interest surrounding the well 10 need not be of oil/gas-bearing quality; it can be zero in this regard, but its contiguousness and continuity with respect to well 11 must be known.

And how various gas fractions affect elastic moduli and compressional velocity, which can be of monumental interest to well log interpreters, is depicted in FIG. 2.

FIG. 2 also illustrates to some degree the complexity that is involved in relating various petrological parameters one to the other to the elastic moduli in the presence of gas. E.g., FIG. 2 shows that very small gas saturations cause nearly as much reduction in moduli of compression as do larger gas saturations. In highly porous sandstone a very small gas saturation may lead to a substantial reduction in compressional wave velocities, especially at low differential pressures. Briefly, the present invention shows that appropriate expressions can, in fact, be provided for calculating the elastic moduli of competent and incompetent strata based on reasonable assumptions, followed by a determination of synthetic characteristics as a function of oil/gas saturations of a well penetrating the formation of interest. Comparison techniques with actual field-collected data of another well of interest then can be utilized. Result: accurate estimations of gas/oil saturations for sandstone, limestone or dolostone strata penetrated by the latter occur. The expressions for providing such data are derived, in part, from surprising laboratory measurements to be described below. Also, well logging and other geologic data of the zone of interest are involved to some degree. Still further, the method has particular accuracy in designating gas zones or mixtures of gas/oil or gas/oil/-brines in the zones of interest due to use of the complete Benedict-Webb-Rubin non-ideal gas law in pseudo-reduced form, in which assumed adiabatic conditions improve accuracy to a surprising degree. Additionally, for ease of printing, Greek symbols have been omitted and the following equivalents substituted:

$\rho$gas = rho-gas $\rho_B$ = rho-B $\sigma^*$ = sigma*

$\gamma_r$ = gamma-r

General Principles

Expressions shown below relate densities, velocities and elastic moduli. First, in accordance with theory:

$$\rho_B V_p^2 = p^* = K^* + (4/3)G^* \tag{18}$$

and $$\rho_B V_s^2 = G^* \tag{19}$$

Here, rho-B is the bulk density (including contributions of pore fluids; Vp is the P-wave velocity, or plane-compressional-wave velocity; Vs is the shear-wave velocity; P* is the P-wave elastic modulus; K* is the compressional modulus (reciprocal of the compressibility) and G* is the shear modulus, or modulus of rigidity.

General Definitions

The rocks in these equations are assumed to be macroscopically homogeneous and isotropic. In fact, macroscopic isotropy and homogeneity are assumed to exist when petrological parameters are represented by only density and two other parameters, such as Vp and Vs or else G* and K*. The asterisk superscript (*) applied to an elastic modulus indicates reference to porous rock with fluid (any mixture of brine, oil and gas) in the pores. By measurement of rho-B, Vp and Vs, other parameters such as P*, K*, G*, Young's modulus or Poisson's ratio can be imparted.

Two additional macroscopic elastic moduli, the solid-material elastic modulus Km or Gm and the solid-frame modulus Ka, can be used.

If the solid material of a porous rock is reassembled in such a manner that there is no pore space, the resulting elastic moduli depend on the manner in which the material is assembled. However, upper and lower limits to the moduli can be computed. For such hypothetical rocks without pore space, upper and lower limits are not widely separated, and the means between these limits will be indicated by subscripts "m". Thus, Km and Gm are solid-material moduli. These quantities are set forth below in Table I.

TABLE I

Elastic Data and References for Some Sedimentary Minerals

| Mineral | Bulk Modulus in Kbars | Shear Modulus in Kbars | Grain Density | References |
|---|---|---|---|---|
| Quartz | 380 | 444 | 2.65 | (1) |
| Calcite | 767 | 323 | 2.71 | (2) |
| Dolomite | 948 | 457 | 2.87 | (2) |
| Biotite ("Clay") | 504 | 275 | 2.68 | (1) |
| Anhydrite | 563 | 291 | 2.98 | (3) |
| Siderite | 1240 | 510 | 3.96 | (4) |
| Barite | 546 | 238 | 4.51 | (1) |
| Hematite | 978 | 931 | 5.24 | (1) |
| Pyrite | 1581 | 1487 | 5.02 | (1) |
| Rutile | 2230 | 1035 | 4.26 | (1) |
| Halite | 252 | 153 | 2.16 | (1) |

(1) G. Simmons, J. Grad. Res. Center, Vol. 39, 3/65, SMU Press
(2) P. Humbert & F. Plicque, Compt. Rendus B275, 391 (1972)
(3) W. Schwerdtner, Can. J. Earth Sci., 2, 673 (1965)
(4) N. Christensen, J. Geophys. Res. 77, 369 (1972)

But if the pore space in a porous rock is all connected, and if the differential pressure in the fluid in the pores is held constant during a small change in the externally applied pressure, the ratio of the pressure change to the relative change in the bulk volume is the solid-frame modulus of compressibility, Ka. This modulus is sometimes referred to as the modulus of compressibility of the rock with the pore system empty. However, many oilfield rocks contain clays which may be altered by actually drying the rocks to empty the pore system. It is also possible that certain surface forces may be different when all water is removed from the pore system of a rock. It is also possible that there are several different possibilities for finding values of Ka.

If all pore space is connected, and if the rock is macroscopically homogeneous and isotropic, a change in the pore pressure cannot lead to macroscopic shear strains, since excluded from the specification of the system is anything which could define direction. Therefore, the compressibility of the fluid cannot influence the macroscopic shear modulus of the rock. Thus, $G^* = Ga$ for a rock satisfying the above conditions.

Note, however, that the dynamic elastic moduli of rocks usually depend on the static stresses and therefore on the fluid pressure in the pore system. This, in turn, affects the differential pressure, or the pressure supported by the elastic framework of the rock. Furthermore, note the requirement that there be time for the fluid pressure to equalize throughout the pore system. If the pore space is not connected, this cannot happen at all. If there are localized regions of low permeability, there may not be enough time for pressure equalization in the pore system if pressure changes are applied at high frequency. The time required for pressure equalization depends not only on the local permeability of the material but on the microscopic distribution of the pore fluid components. This consideration applies, for example, if the pore fluid is a mixture of brine and gas. The higher the seismic or sonic frequency, the finer must be the mixture of brine and gas.

However, in estimating gas/oil-saturation effects in accordance with the present invention, input parameters can be limited to compressional velocity, density and porosity, as set forth below.

The Effect of Gas Saturation

Gassmann derived an equation (Gassmann, F., "Elasticity of Porous Media" in Vierteljahrschrift der Naturforshenden Gesellschaft in Zürich, Heft I, 1951) and given also in a book by White (J. E. White, "Seismic Waves: Radiation, Transmission and Attenuation", McGraw-Hill, N.Y., 1965), relating K* and Ka.

$$K^* = K_a + K_f \frac{(1 - K_a/K_m)^2}{(1 - K_f/K_m)\phi + (K_f/K_m)(1 - K_f/K_m)} \quad (20a)$$

or the equivalent, $$K_a = K^* - K_f \frac{(1 - K^*/K_m)^2}{(1 - K_f/K_m)\phi - (K_f/K_m)(1 - K^*/K_m)} \quad (20b)$$

or another equivalent, $$\frac{1}{K_m - K^*} - \frac{1}{K_m - K^{*\prime}} = \frac{1}{\phi}\left[\frac{1}{K_m - K_f} - \frac{1}{K_m - K_f'}\right] \quad (20c)$$

or still another equivalent, $$(K^* - K_a)/K_m = K_f/K_m = b - a = \quad (20d)$$

$$\frac{(1 - a)^2}{f\phi + (1 - a)} = \frac{(1 - b)^2}{f\phi - (1 - b)}$$

where $a = Ka/Km$; $b = K^*/Km$; $g = G^*/Gm = Ga/Gm$; $f = (Km/Kf) - 1$.

Here $\phi$ is the fractional porosity, Kf is the compressibility modulus of the fluid in the pores, and the primes (') indicate values for a different pore fluid system. Thus, if $Kf' = 0$, the $K^{*\prime}$ becomes Ka. If the pore fluid is a multiphase system, such as any mixture of brine, oil and gas, Kf can be calculated by noting that the compressibility of a fluid mixture is the volume-weighted average of the compressibilities of the components. Thus, for a gas-brine mixture, $$\frac{1}{K_f} = \frac{S_{gas}}{K_{gas}} + \frac{(1 - S_{gas})}{K_{brine}} \quad (39)$$

where Sgas is the fractional gas saturation.

It can be seen from Equations 19 and 20a–20e that, if $G^*$, $P^*$, Km, Kf and $\phi$ are known, calculations are straightforward. But since $G^*$ and Km are not known, simultaneous solutions of equations is a distinct possibility and is set forth in detail below. If $K^*$ for two different values of Kf is measured, two equations with two unknowns are provided and both Ka and Km can be determined. Km may be computed with adequate accuracy from estimates of the composition of the solid framework of the rock, as set forth below, in which case measurements of $K^*$ and $\phi$, together with knowledge or estimates of Kf and Km give values of Ka.

Equations 18, 19 and 20a–20e are rigorously true if the rock is macrohomogeneous, macroisotropic, all pore space connected, time is allowed for pressure equalization in the pore fluid, and the material of the solid framework is microhomogeneous and microisotropic. The assumptions of microisotropy and microhomogeneity are not satisfied rigorously for real rocks. The lack of microisotropy is probably well accounted for by the spatial averaging employed in the determination of the "isotropized" values of the compressional moduli of the rock-forming minerals given in Table I, supra. It is highly probable that anisotropic mineral grains are deposited more or less randomly. Even if they are not, the directions of the stress vary greatly in a granular rock, justifying the spatial averaging.

The effects of microhomogeneity of the solid material of the rock may affect the strict validity of Equations 20a–20e supra if one of the components of the solid framework does not carry its share of the load and if that component has a compression modulus substantially different from those of other components. A candidate would be a sand consisting of a quartz framework with a large amount of clay or other materials with higher compressional moduli and attached in such a manner that it does not significantly share the stress.

It should be noted that if shear-wave logs would be available for the basin of interest, the bulk modulus can be calculated from the P- and S-wave transit times in the density of the zone of interest in accordance with Equations 18 and 19, supra. Unfortunately, the shear-wave logs needed for direct measurement of $K^*$ are not available for most basins.

Hence, a method is needed for accurately determining bulk and shear moduli of rock formations in such basins, these moduli being needed for use in the Biot-Gassmann relationship, i.e., the Equations 20a–20d supra, to model the influences of pore fluids on the bulk modulus, and therefore on the compression wave velocity. While these fluids may be either brine, liquid, hydrocarbon or gas or any combination thereof, the present invention relates to brine-gas mixtures principally but not exclusively.

In accordance with the present invention, only compressional velocity of the brine-saturated material, its brine-saturated density and porosity measurements are needed to estimate bulk and shear moduli for the zone of interest as functions of pressure, temperature and fluid content (gas saturation).

These equations which are set forth below and above permit an in-situ estimate of $K^*$ and $G^*$ as defined above, which may be based on measurement of the P-wave modulus of the aggregate (i.e., $Pw^*$) only, and do not require the need for shear-wave velocity. Also, a gas correction term applies only to well-consolidated sandstones, not to sand packs or loosely or poorly consolidated sands, as set forth in detail and discussed below.

A key to the above discovery that $Pw^*$ can be used to estimate the elastic moduli of the formation of interest on the basis of empirical expressions of the form $$\hat{G}^*_w = f_1(P^*_{ol}) \tag{21}$$

where $\hat{G}^*$ is the shear modulus, and the bulk modulus by the form $$\hat{K}^*_w = F_2(P^*_{ol}) \tag{22}$$

where $Pol^*$ is the P-wave modulus. The subscript "ol" means "observed in the laboratory". Of course, the subscript "ow" is also operative in this context: in circumstances where P-wave modulus is "observed from well log data", as explained below.

The empirical coefficients for the above Equations 21 and 22 have been found for sands without performing undue experimentation and, moreover, produced correlation coefficients in a range of 0.927 to 0.962.

In general, Equations 21 and 22 are proven excellent predictors. E.g., the above equations have been found to give correlation coefficients of 0.96 and 0.93 respectively at the highest pressure conditions. A standard acoustic measurement system (AMS) can be used to determine densities, porosities and three moduli ($P^*$, $K^*$ and $G^*$) as a function of pressure of known materials to predict the coefficients of the above equations.

Note also that values of P-wave modulus estimated from well logs is in accordance with $$P^*_{ow} = \rho_B V_p^2 \tag{35}$$

where rho-B is the density and $V_p$ is the compressional velocity from such logs, as explained below.

However, mineralogy can also be a determining factor.

Note that the present invention not only allows the experimentor to specify that the formation is initially 100% brine saturated, but also to be able to specify that the lithology is sandstone, limestone, or dolostone. Detailed mineralogy permits him also to make a more accurate estimate, but it is not a necessary input variable. If detailed mineralogy is known, the volume percent of each component must be input in a manner shown in the method set forth below.

The program uses the Voigt-Reuss-Hill (VRH) method to calculate the bulk modulus, Km, and the shear modulus, Gm, of the solid part of the rock.

If the detailed mineralogy is not used, the method of the present invention automatically defaults to "average" values of Km and Gm for each lithology.

If a rock is widely different in composition from "average" rocks, detailed mineralogy is necessary in order to do accurate estimates. For example, if a limestone contained quartz beyond about 25%, the Km, Gm default values for limestones could lead one into significant errors in estimation of fluid effects.

The limestone equations have practical validity in areas well represented by that particular sampling used above. Experience has shown that such data are particularly good predictors of velocity and porosity values in the Ardmore and Arcoma basins in the Midcontinent of the United States of America. However, the Biot-Gassmann relationship as set forth in Equation 20b should be used:

$$K_a = K^* - K_f \frac{(1 - K^*/K_m)^2}{(1 - K_f/K_m)\phi - (K_f/K_m)(1 - K^*/K_m)} \tag{20b}$$

where
Ka = frame modulus (the bulk modulus with empty pores)
Km = bulk modulus of the solid material
Kf = bulk modulus of the fluid (including the gas) in the pores.

The second term of the right-hand member of Equation 20d is referred to as the fluid correction term, Kfc, so that $K^* = Ka + Kfc$, as previously indicated.

Mathematical Modeling of Gas or Oil in Sandstone Formations

Equations 21 and 22 are assumed to be applicable in the area under study, as determined from well logs via equation 35. Without this assumption, calculation of fluid saturation effects on the P-wave modulus is not possible.

Parenthetically, there must be available from well logs +rho-B, $\phi$ and $V_p$, from which the observed P-wave modulus, $Pow^*$, is calculated ("ow" means "observed from well logs") by equation 35, supra. These data must come from a section of the well known to be 100% brine saturated. From these steps, the elastic moduli can be calculated.

FIG. 3 is a flow diagram of the data transformation process of the present invention.

Briefly, in the initial step, predicted shear modulus, $\hat{G}w^*$, for the depth (pressure) is calculated from the predictor Equation 21 supra, i.e., $$\hat{G}^* = f_1(P^*_{ol}) \tag{21}$$

In step (2), there is the calculation of the predicted bulk modulus, $\hat{K}w^*$, for the depth (pressure) from the predictor Equation 22 supra, i.e., $$\hat{K}^* = f_2(P^*_{ol}) \tag{22}$$

In step (3), to model gas-saturated formations, there is next calculated Ka via Equations 20a–20d. In these statistical terms, Equations should be modified to read $$\hat{K}_a = \hat{K}^*_w - \frac{K_{br}(1 - \hat{K}^*_w/K_m)^2}{(1 - K_{br}/K_m)\phi - K_{br}/K_m(1 - \hat{K}^*_w/K_m)} \tag{20e}$$

where Kbr is the bulk modulus of brine. Assume a pressure-independent value of 25 Kbar. The bulk modulus of the solid material, Km, is also assumed to be pressure-independent.

From the several sandstone samples, a mean Km of 393 Kbar is noted with a standard deviation of less than 10%. This value can be used as a starting point if one has no other data.

It is physically impossible for $\hat{K}w^*$ to exceed Km. However, the predicted modulus, $\hat{K}w^*$, can exceed the mean value of Km. In that event, either:

1. abort the method for that set of data, or
2. independently determine the true value of Km.

Errors in $\hat{K}a$ are apt to be largest for porosities less than about 5%. Above that value, we had no problems in this step of the calculation.

In step (4), calculation of $\hat{K}gas/oil^*$, the predicted modulus with gas/oil present, can be in accordance with:

$$\hat{K}^*_{gas/oil} = K + \frac{(1 - \hat{K}_a/K_m)^2}{\phi/K_f + (1-\phi)/K_m - \hat{K}_a/K_m^2} \quad (23)$$

where Kf equals the bulk modulus of a liquid-gas mixture. It is equal to $$1/K_f = S_{gas}/K_{gas} + S_{oil}/K_{oil} = (1 - S_{gas} - S_{oil})K_{br} \quad (24)$$

where Sg and Soil are the fractional gas and oil saturation and Kg is the bulk modulus of the gas. The latter is both temperature- and pressure-dependent.

Note that Ka and G* are independent of the fluid so that these values need not be recalculated. However, K* is a dependent variable with regard to the fluid in the pores of the rock of interest. Hence, its value is a function of the total bulk modulus of the fluid Kf.

Estimation of the bulk modulus of the gas and oil can be rigorous. Approximate methods to estimate the fluid modulus, Kf, for use in the Biot-Gassmann relations can be used, and are set forth supra.

Attempts to estimate the bulk modulus of a gas component, Kfgas, from either the isothermal or adibatic perfect gas laws are inadequate for some applications, but results can be obtaied in the manner set forth below. In this method, the gas modulus and density are computed in accordance with an isothermal non-ideal equation of state for a gas in pseudo-reduced form as proposed by Benedict, Webb and Rubin; see Journal of Pet. Tech., Vol. 22, 1970, pp. 889–895.

Oil Equations

Bulk modulus and density for oil can be easily calculated and are, of course, necessary parts of the total fluid moduli and density calculations of a given gas/oil mixture. Oil density (rho-oil) can be calculated by $$\rho_{oil} = 141.5/(\epsilon_{oil}[APl] + 131.5) \quad (59)$$

Oil bulk modulus (Koil) can also be easily obtained:

$$K_{oil} = f_{10}\rho_{oil} \quad (60)$$

In step (5), equations 21 and 23 are used to obtain $\hat{P}gas/oil^*$, according to the Biot-Gassmann theory, $$\hat{P}^*_{gas/oil} = \hat{K}^*_{gas/oil} + (4/3)\hat{G}^*_w \quad (61)$$

$\hat{P}gas/oil$ is the predicted P-wave modulus with gas/oil present.

In step (6), to convert the moduli to velocities, use the aforementioned gas and oil density values along with a brine density of 1.05 g/cm³ and a medium density of 2.65 g/cm³, and assuming values of Sg and Soil to obtain a bulk density value rho-B of the formation:

$$\rho_B = \phi\rho_{fgo} + (1-\phi)\rho_m \quad (62)$$

where rho-fgo = Sg-rho-g + Soil(rho-oil) + (1-Sgas-Soil)rho-br to obtain an equation for velocity with gas and oil present, i.e., to obtain the predicted value of $V_p$ with gas present:

$$\hat{P}^*_{gas} = \rho_B \hat{V}_p^2 \quad (62)$$

In step (7), sonic characteristics of interest are calculated as a function of different gas saturations and compared with actual values until a pattern match occurs. The amount of gas saturation is then evident.

MODIFICATION

Note in Equation 54 that the gas compression is assumed to be an isothermal process.

In the seismic frequency range below 100 hz, and for average pore sizes of about 40 micrometers or so, experience has shown that isothermal compression is probably the most likely. On the other hand, for moderate-size pores in this range, dealing with frequencies on the order of 20 khz, i.e., those frequencies used for acoustic wall logs (sonic logs), calculations based upon the inequalities shown by the above experience indicate that the gas compression is most likely adiabatic. Additionally, for intermediate pore size distributions and intermediate frequencies, it is possible to have a certain amount of isothermal and a certain amount of adiabatic compression occurring in the gas trapped in the pores of a rock. Thus, an improvement in the prior proprietary techniques as cited in the copending applications, supra, can be had by considering the possibility of having isothermal as well as adiabatic mixture calculations, especially for well logging applications.

The present invention provides such calculation, yet is also capable in addition of making calculations based on an isothermal gas bulk modulus. Briefly, it first calculates the isothermal gas bulk modulus (KISOGAS) as previously done, and then proceeds to evaluate the specific heat of the gas at constant pressure, Cp, and the specific heat of the gas at constant volume, Cv, as well as obtains the specific heat ratio Cp/Cv. Once the Cp/Cv ratio is obtained, the adiabatic gas modulus (KADGAS) can be computed as shown in Equation 58a:

$$KADGAS = (Cp/Cv) \text{ KISOGAS} \quad (58a)$$

Having thus obtained both the isothermal and adiabatic gas bulk moduli, the parameter GASMIX, is input to the program to calculate the gas bulk modulus, Kgas, via the equation set forth below:

$$Kgas = (GASMIX)(KADGAS) + (1-GASMIX)(KISOGAS) \quad (58b)$$

Inspection of Equation 56 shows that when GASMIX = 0, the resulting gas bulk modulus is the isothermal value. The default on GASMIX is the isothermal case, i.e., GASMIX = 0. However, the user of the present invention can input any GASMIX value between 0 and 1. Taking GASMIX = 1 yields the adiabatic value for Kgas, $$K_{gas} = KADGAS \quad (58c)$$

An additional feature of the present invention should be mentioned, and that is that the present invention can be carried out in a digital computer such that the Km, Gm default values can be used when no mineral data are available. Such values can be input by the user. This was not the case in the prior applications supra, where the user was forced to accept the built-in values based on average Km and Gm values computed from laboratory data for sandstones, limestones and dolostones. The new parameters of interest are GASMIX, KMDEF and GMDEF.

Also, the present invention includes the techniques of the prior copending cases as a special case and enables users to apply a particular type of calculating scheme to the analysis of well log data with the objective of applying the results to acoustic and density measurements in another well. All of the original (isothermal) seismic applications still prevail for GASMIX=0. Either compressional velocities or sonic log delta-T's for seismic applications can be input as long as GASMIX=0. It is possible also to have seismic inputs, if these are available, and use them to assist formation evaluation in a logged well. The possibilities are now: (1) seismic to seismic; (2) well logs to seismic; (3) well logs to well logs; and finally (4) seismic to well logs.

Now in more detail, the present invention sets forth the following calculations for elastic moduli of gases under adiabatic conditions.

Calculations of Cp and Cv for natural gas:

$$C_p - C_v = -T \left( \frac{\partial p}{\partial T} \right)_V^2 / \left( \frac{\partial p}{\partial V} \right)_T \quad (A1)$$

where Cp and Cv are the specific heats of the natural gas at constant pressure and at constant volume respectively in Btu/lb °Rankine. Also, p, V and T are the pressure, temperature and volume. If Tpc and Ppc are the pseudo-critical temperatures and pressures, the following equations result:

$$\left. \begin{array}{l} T = Tpc\ Tpr \\ P = Ppc\ Ppr \\ V = R_o \frac{Tpc\ Vpr}{Ppc} \end{array} \right\} \quad (A2)$$

where Tpr, Ppr and Vpr are then then-calculable pseudo-reduced temperature, pressure and volume. Now at a certain point in the present invention, all the pseudo-reduced quantities have been computed (they are dimensionless).

Placing (A2) into (A1) yields the result $$C_p - C_v = R_o \left[ -Tpr \left( \frac{\partial Ppr}{\partial Tpr} \right)_{Vpr}^2 / \left( \frac{\partial Ppr}{\partial Vpr} \right)_{Tpr} \right] \quad (A3)$$

where the bracketed quantity on the right is simply a pseudo-reduced version of Cp–Cv, namely the computable quantity $$Cpr - Cvr = -Tpr \left( \frac{\partial Ppr}{\partial Tpr} \right)_{Vpr}^2 / \left( \frac{\partial Ppr}{\partial Vpr} \right)_{Tpr} \quad (A4)$$

In (A2) and (A3), $R_o$ is the gas constant with units and dimensions, $$R_o = 1.987\ \text{BTU/lb. mol °Rankine} \quad (A5)$$

Hence, placing (A4) in (A3) we get simply $$C_p = C_v + R_o(Cpr - Cvr) \quad (A6)$$

The problem is then to compute Cpr-Cvr and also Cv so that Cp can be computed and hence the all-important Cp/Cv ratio.

The present invention has previously solved the Benedict-Webb-Rubin equations 54 and 55 in pseudo-reduced form for X where $$X = 1/Vpr \quad (A7)$$

is the reciprocal of the pseudo-reduced volume, Vpr.

In addition, an isothermal pseudo-reduced gas bulk modulus Kisord has been computed from the relation $$K_{isord} = -Vpr \left( \frac{Ppr}{Vpr} \right) Tpr \quad (A8)$$

Hence the denominator of (A4) is thus given by the product, $$\left( \frac{\partial Ppr}{\partial Vpr} \right) = -X\ K_{isord} \quad (A9)$$

and is thus known at this point in the method of the present invention. It remains to compute $$\left( \frac{\partial Ppr}{\partial Tpr} \right)_{Vpr}$$

in the numberator of (A4)

Note that:

$$\left( \frac{\partial Ppr}{\partial Tpr} \right)_{Vpr} = X + Q_1 X^2 + brX^3 - \frac{2X^3}{Tpr^3} Cr(1 - \gamma r X^2)e^{-\gamma r X^2} \quad (A10)$$

where $$Q_1 = Bor + 2Cor/Tpr^3 \quad (A11)$$

and the pseudo-reduced B-W-R coefficients Bor, Cor, Cr, gamma-r, br, etc., are given and known from Table A below:

TABLE A

| Coefficients for the Reduced Benedict-Webb-Rubin Equation of State for Natural Gas | | |
|---|---|---|
| Coefficient | Ppr from 0.4 to 5.0 | Ppr from 5.0 to 15.0 |
| ar | 0.001290236 | 0.0014507882 |
| Aor | 0.38193005 | 0.37922269 |
| br | 0.022199287 | 0.024181399 |
| Bor | 0.12215481 | 0.11812287 |
| Cr | −0.015674794 | 0.037905663 |
| Cor | 0.027271364 | 0.19845016 |

TABLE A-continued

Coefficients for the Reduced Benedict-Webb-Rubin Equation of State for Natural Gas

| Coefficient | Ppr from 0.4 to 5.0 | Ppr from 5.0 to 15.0 |
|---|---|---|
| alpha-r | 0.023834219 | 0.048911693 |
| gamma-r | 0.43617780 | 0.0631425417 |

Thus, from (A11), Table A, (A10) and (A4), we see that the numerator (A4) can be calculated, since X, Tpr, Ppr, and the pseudo-reduced coefficients are known. This enables Cpr-Cvr for use in (A6) to be calculated.

It remains to calculate Cv in (A6), and this can be done as follows. Table B below, for known pseudo-critical Tpc, Ppc, the quantities A, Ao, B, Bo, C, Co, alpha and gamma can be calculated. These are then used in the following equation, viz:

$$C_v = C_v^o + \frac{6}{T^3 V_m}\left[ C_o - \frac{cV_m}{\gamma} + \frac{cV_m}{\gamma}e^{-\gamma/V_m^2} + \frac{ce^{-\gamma/V_m^2}}{2V_m}\right] \quad (A12)$$

to compute Cv.

In (A12), T is the known Rankine temperature prevailing and Vm is the molar volume provided the molar gas constant Rm given by $$Rm = 10.73 = psi\ cu.ft/lb\ mol\ °R) \quad (A13)$$

The result of (A13) is used in the equations (A17)-(A24) of Table B below.

In (A12), Cvo is the low-pressure heat capacity at constant volume given by (A226), namely $$C_v^* = C_p^* - R_o \quad (A14)$$

where Ro is given by (A5) and Cpo is given by (A27), namely $$C_p^* = A + BT_f + CG + DG^2 + E(T_f G) + FT_f^2 \quad (A15)$$

In (A15), Tf is the known Fahrenheit temperature and G is the known API gas gravity. The constants A, B, C, D, E and F are given in Table C below, i.e.,

TABLE C

Coefficients for the Correlation of Low-Pressure Isobaric Heat Capacity for Natural Gas As Function of Temperature and Gravity

| Temperature Range | | Units |
|---|---|---|
| 0 to 200° F. | 0 to 600° F. | |
| 4.6435 | 3.7771 | T: °F. = Tf |
| −0.0079997 | −0.0011050 | Cpo: Btu/lb mol °F. |
| 5.8425 | 7.5281 | |
| 1.1533 | 0.65621 | |
| 0.020603 | 0.014609 | |
| 9.849(10⁻⁶) | 0.0 | |

In the method, both the 0°-200° F. and 0°-600° F. range values of Table C are used when appropriate. Thus, the sequence is to get Cpo from (A15), use it in (A14) to get Cvo; use Cvo in (A12) to get Cv. Then having Cpr-Cvr and Cv, use (A6) to compute Cp. Thus, Cp/Cv is obtained for use in Equation 58a.

Below in Table B is a list of relevant equations:

TABLE B

| | |
|---|---|
| a = arR³Tpc³/Ppc² | (A17) |
| Ao = AorR²Tpc²/Ppc | (A18) |
| b = brR²Tpc²/Ppc² | (A19) |
| Bo = Bor RTpc/Ppc | (A20) |
| c = crR³Tpc⁵/Ppc² | (A21) |
| Co = Cor R²Tpc⁴/Ppc | (A12) |
| alpha = alpha-r R³Tpc³/Ppc³ | (A23) |
| gamma = gamma-r R²Tpc²/Ppc² | (A24) |

In Table D below, some computed values of Cp/Cv for methane, "ethane" and "butane" for a variety of pressures and temperatures are illustrated.

TABLE D

| Depth (ft) | Fluid Pressure (psi) | Temp. °F. | Gas | Gas Gravity = G | Cp/Cv |
|---|---|---|---|---|---|
| 2,000 | 930 | 104 | Methane | 0.554 | 1.421 |
| 4,000 | 1860 | 134 | Methane | 0.554 | 1.501 |
| 10,000 | 4650 | 224 | Methane | 0.554 | 1.473 |
| 2,000 | 930 | 104 | "Ethane" | 1.0 | 1.672 |
| 4,000 | 1860 | 134 | "Ethane" | 1.0 | 1.795 |
| 10,000 | 4650 | 224 | "Ethane" | 1.0 | 1.289 |
| 2,000 | 930 | 104 | "Butane" | 2.0 | 1.081 |
| 4,000 | 1860 | 134 | "Butane" | 2.0 | 1.081 |
| 10,000 | 4650 | 224 | "Butane" | 2.0 | 1.066 |

DESCRIPTION OF EMBODIMENT

Having now established a firm mathematical and theoretical basis for the process of the present invention, perhaps a description for a system for carrying out the invention is in order. In this regard, reference again should be made to FIG. 3, which is a flow diagram for such a system. From the above descriptions, it is evident that displays ultimately will be provided which indicate both presence and amounts of gas/oil-bearing strata within a zone of interest.

It should be pointed out that while theoretical acoustic characteristics can be provided using the expressions and descriptions set forth above, actual acoustic data must be available from the field; such data are initially collected, say, using one of today's conventional well-logging techniques, e.g., those providing sonic velocity values. From such data, characteristics of events of the logs associated with gas/oil-bearing strata can be normalized and then compared with the theoretical data predicted by the method involving the present invention, such values being variable as a function of gas/oil saturation, inter alia.

Note further in returning to FIG. 3 that it can be assumed that a section of the log has been analyzed for hydrocarbon potential, say, a gas-bearing strata alone, such events being known by geographic location and depth basis.

The steps of FIG. 3 include calculation of synthetic acoustic values of interest, as a function of gas saturation, and comparing these values with actual field logging values obtained using conventional sonic logs in the new well of interest.

Such comparison will include calculations of the theoretical data values as a function of gas/oil saturation; then the pattern of such values as a function of gas/oil saturation can be analyzed so that an interpreter can compare actual logged data therewith and therefore estimate the gas/oil saturation in the zone of interest.

Comparison Techniques

The comparison of such values can occur within (or without) the particular computing system to be adopted. If internal comparison techniques are used, the nature of the results (to be equated in a comparison sense) must be taken into account:

(i) for velocity comparisons, an array comparison technique can be used within the system to be adopted in which dimensions of the array include: velocity amplitudes (both synthetic and actual) as a function of geometrical location, depth values, and gas/oil saturation.

While either the synthetic or actual values can serve as the primary selector values, it is perhaps better to use the latter to compare with the former. In that way, the array addresses associated with individual velocity values can be incremented in sequence (in one or more dimensions) and the results compared. The best match becomes apparent from a reading or listing of all comparisons made, or from a designation of the best match on a GO-NO GO basis. In this regard, some preliminary processing analysis of the seismic record is in order to establish the active seismic velocity deducible from the record as a function of depth. A technique well known in the art to reconcile theory and data, uses an iterative technique in which a sonic velocity for a set of logs is associated, and coherency of the data noted. Then the process is repeated with a different sonic velocity; the most coherent of the data allows a "best" sonic velocity determination to be deduced.

(ii) for amplitude comparisons, an array technique similar to that previously described can be used; but conversely an auxiliary comparitor could also be implemented to function with disk data provided from the computing system to be described hereinafter. In the former, dimensions of the array would include: actual and synthetic amplitude values as a function of geometrical location, depth values and gas/oil saturation values. Incrementing of the array (in one or more dimensions) allows for a determination of "best" match of the data. In the latter, "best" match statistics can be developed, including cross-correlation techniques.

FIG. 4 illustrates particular elements of a computing system for carrying out the steps of FIG. 3, including certain aspects related to the comparison of data.

The System

While many computing systems are available to carry out the process of the present invention, to best illustrate operations a microcomputing system 50 of FIG. 4 is didactically best and is presented in detail below.

System 50 of FIG. 4 can be implemented on hardware provided by many different manufacturers, and for this purpose elements provided by MOS Technology, Norristown, Pa. 19401, may be preferred.

Such a system 50, which can be an MCS-6500 system from the above corporation, can include a CPU 51 controlled by a control unit 52 in conjunction with signals from external devices (one or more), not shown. Two memory units 53 and 54 connect to CPU 51 through bus 55. Program memory unit 53 (ROM) stores instructions for directing the activities of the CPU 51, while data memory 54 (RAM) contains data as data words related to logging and other geologic data provided by field acquisition systems. Since the logging and geologic data banks comprise large amounts of big-bit data, an auxiliary memory unit 56 may also be useful in carrying out the method of the present invention. Inputting and accessing such information is usually via peripheral interfaces 57. To rapidly input or access data, the CPU 51 addresses a particular port (say at input port 58, output ports 59). Such ports are addressed to receive or access information as required, such information being fed say via keyboard 60 or outputted or storable on usual external equipment known in the art, e.g., printer 61, floppy disks 62, paper-tape readers, etc.

The number and type of peripheral devices needed to carry out the method of the invention can generally be estimated very accurately. However, it is important to keep in mind that such estimates must be subject to review after a full analysis of system performance is completed. The seismic-interpreter-designer may find it necessary to use a special-purpose interface part or to redesign the I/O structure if the evaluation of total system performance reveals that the system performance reveals that the system cannot operate at the required speed. Use of special-purpose peripheral interface parts will reduce the number of tasks which must be handled by the CPU 51 and consequently can increase the over-all system speed, but this generally involves additional component cost.

Likewise, the use of a fully vectored interrupt can lead to increased performance at increased cost. The goal of any program must be to meet all the system performance at the minimum possible cost.

After the various peripheral devices in the system have been evaluated to determine the number of inputs and outputs required, the total required by all peripherals can be divided by 16 to determine the number of devices required. This is a good first approximation which will be reevaluated as the system development progresses.

Evaluation of the amount of RAM required by the system is a somewhat more difficult problem than estimation of peripheral devices. This is due primarily to the fact that much of the RAM is required by the system software as working storage, such as storage of immediate results in arithmetic operations. Since the machine-implemented program will probably not be written when these estimates are first attempted, the probability of error in this portion of the estimate may be fairly high.

In addition to working storage, the RAM must provide storage for:
1. The Stack (to be described below):
2. Peripheral input data storage;
3. Peripheral output data storage.

Items 2 and 3, above, can be evaluated quite accurately, since a detailed analysis of the peripheral devices has usually been completed when these estimates are first attempted. In general, a block of RAM must be made available for each peripheral device. The amount of RAM required for each is a function of the type of peripheral device being interfaced and just how the device is to be controlled.

The amount of RAM required by the stack is a function of both the interrupt structure and the system software. As a result, an estimate of this requirement must be based on the system programmer's best estimates of his requirements. This should be combined with an estimate of the required working storage and the peripheral data storage requirements to obtain an estimate of the total system RAM.

Amount of ROM required in a system cannot be determined accurately until the system program is completed. However, by partitioning the system program into definable pieces, an estimate can be made of each task and the total can be obtained of the ROM required by each section.

Most programs consist of easily defined sections such as the software for each peripheral device, arithmetic routines, etc. These are the pieces which should be examined separately to estimate the ROM required by each.

For outputting information, system 50 can be included with printer 61, again accessed through a particular interface 57 at an output port 59, whereby the operations in accordance with the present invention are printable. Of more use as an outputting unit, however, would be a disk unit which would temporarily store the accumulated data after the latter had again been accessed through a different interface 57 at another output port 59. In that way, the information on the disk unit can be used in conjunction with an off-line digital plotter capable of generating proper side-by-side displays of the data for use in conjunction with typical seismic data sections for comparisons and interpretation, as explained below. Such plotters are available in the art. One proprietary model that we are familiar with uses a computer-controlled CRT for optically merging onto photographic paper as a display mechanism the data provided by the present invention. Briefly, in such a plotter, the data are converted to CRT deflection signals; the resulting beam is drawn on the face of the CRT and the optically merged record of the events recorded, say via photographic film. After a predetermined number of side-by-side lines have been drawn, the film is processed in a photography laboratory and hard copies returned to the interpreters for their review.

Of course, the CPU 51 of FIG. 4 is the key to the operation in accordance with the present invention. As a general matter, it controls the functions performed by the other components, including addressing all input and output ports. It also fetches instructions from program memory unit 53, decodes their binary content and executes them. It also references data memory unit 54 (and/or other auxiliary memory units) and other interface ports as required in the execution of the instructions. It also recognizes and responds to certain control signals as set forth below.

FIG. 5 illustrates CPU 51 in more detail.

As shown, the CPU 51 includes an array of registers surrounding but operatively tied to an arithmetic logic unit (ALU) 63 through an internal data bus 64, all under control of a control unit generally indicated at 65. As indicated, the control unit includes clock generator 66, timing control unit 67 and instruction decoder 68. Note that the instruction decoder 68 is also operatively timed to the following units for control purposes: an instruction register 69, processor status register 70 and interrupt logic circuit 71, operating as set forth below. While instruction register 69 and program counters 72 have dedicated uses, an array of other registers, such as accumulator 73 and index registers 77 have more general uses.

The accumulator 73 usually stores one of the seismic operands to be manipulated by the ALU 63. E.g., in the summation of two or more numbers, the instruction may direct the ALU 63 to not only add in sequence the contents of the temporary registers containing predetermined values of logging or geologic data in the accumulator, but also store the result in the accumulator itself. Hence the accumulator 73 operates as both a source (operand) and a destination (result) register. Additional registers such as input data latch 74, data bus buffer 75 and address latches and buffers 76 are useful in manipulation of other seismic results and data, since they eliminate the need to shuffle results back and forth between the external memory units of FIG. 4 and accumulator 73.

The internal organization of the CPU 51 can be split into two sections. In general, the instructions obtained from the program memory 54 (FIG. 4) are executed by implementing a series of data transfers in the register section indicated at 80. The control lines which actually cause the data transfers to take place are generated in the control section generally indicated at 81. Instructions enter the CPU 51 on the bus 55 (FIG. 4), are latched into instruction register 69 and are then decoded along with timing signals at instruction decoder 68 to generate the register control signals to the various other elements of the system.

The control unit 65, including timing controller 67, keeps track of the specific cycle being executed. These units are set to "T0" for each instruction fetch cycle and are advanced at the beginning of each "Phase One" clock pulse. Each instruction starts in T0 and goes to T1, T2, T3, etc., for as many cycles as are required to complete execution of the instruction. Each data transfer, etc., which takes place in the register section 80 is caused by decoding the contents of both the instruction register 69 and the timing control unit 65.

Additional control lines which affect the execution of the instructions are derived from the interrupt logic unit 71 and from the process status register 70. The interrupt logic unit 71 controls the CPU interface to the interrupt inputs to assure proper timing, enabling, sequencing, etc., which the CPU 51 recognizes and services.

The processor status register 70 also can contain a set of latches which serve to control certain aspects of the CPU operation, say to indicate the results of CPU arithmetic and logic operations, and to indicate the status of data either generated by the CPU or transferred into the CPU from outside.

Since the real work of the CPU is carried on in the register section 80 of the CPU, perhaps a detailed study is in order. The components of section 80 include:

Data Bus Buffers 75
Input Data Latch (DL) 74
Program Counter (PCL, PCH) 72
Accumulator (A) 73
Arithmetic Logic Unit (ALU) 63
Stack Pointer (S) 82
Index Registers (X, Y) 77
Address Bus Latches/Buffers 76
Process Status Register (P) 70

Again referring to FIG. 4, at 1 mHz the data which come into the CPU from the program memory 54, the data memory 53 or from peripheral devices appears on the bus 55 during the last 100 nanoseconds of Phase Two. No attempt is made to actually operate on the data during this short period. Instead, it is simply transferred into the input data latch 74 (FIG. 5) for use during the next cycle. The data latch 74 serves to trap the data on the bus during each Phase Two pulse. It can then be transferred onto one of the internal buses, say bus 64, and from there into one of the internal registers. For example, data being transferred from memory into the accumulator 73 will be placed on the internal data bus 64 and will then be transferred from the internal data bus 64 into the accumulator 73. If an arithmetic or logic operation is to be performed, say using the data from a memory unit and the contents of the accumulator 73, data in the input data latch 74 will be transferred onto the internal data bus 64 as before. From there, it will be transferred into the ALU 63. At the same time, the contents of the accumulator 73 will be transferred onto a bus in the register section 80 and from there into the second input to the ALU 63. The results of the arithmetic or logic operation will be transferred back to the accumulator 73 on the next cycle by transferring first onto the bus and then into the accumulator 73. All of these data transfers take place during the Phase One clock pulse.

The program counter (PCL, PCH) 72 provides the addresses which step the CPU through sequential instructions to the program. Each time the CPU fetches an instruction from program memory, the contents of PCL 72 are placed on the low-order 8 bits of the address bus and the contents of PCH 72 are placed on the high-order 8 bits. The counter 72 is incremented each time an instruction or data is fetched from program memory.

Accumulator 73 is a general-purpose 8-bit register which stores the results of most arithmetic and logic operations. In addition, the accumulator 73 usually contains one of the two data words used in these operations.

All logic and arithmetic operations take place in the ALU 63. This includes incrementing and decrementing of internal registers (except PCL and PCH 72). However, the ALU 63 cannot store data for more than one cycle. If data are placed on the inputs to the ALU 63 at the beginning of one cycle, the result is always gated into one of the storage registers or to external memory during the next cycle. Each bit of the ALU 63 has two inputs. These inputs can be tied to various internal buses or to a logic zero; the ALU 63 then generates the SUM, AND, OR, etc., function using the data on the two inputs.

Stack pointer (S) 82 and the two index registers (X and Y) 77 each consist of 8 simple latches. These registers store data which are to be used in calculating addresses in data memory.

Address bus buffers 76 consist, in part, of a set of latches and TTL compatible drivers. These latches store the addresses which are used in accessing the peripheral devices (ROM, RAM, and I/O's of FIG. 4.

Table VI illustrates the total CPU instructions which must be used to carry out the method of the present invention.

In brief, the CPU instruction set is divided into three basic groups. The first group has the greatest addressing flexibility and consists of the most general-purpose instructions such as Load, Add, Store, etc. The second group includes the Read, Modify, Write instructions such as Shift, Increment, Decrement and the Register X movement instructions. The third group contains all the remaining instructions, including all stack operations, the register Y, compares for X and Y and instructions which do not fit naturally into Group One or Group Two.

There are eight Group One instructions, eight Group Two instructions, and all of the 39 remaining instructions are Group Three instructions.

The three groups are obtained by organizing the OP CODE pattern to give maximum addressing flexibility (16 addressing combinations) to Group One, to give 8 combinations to Group Two instructions and the Group Three instructions are basically individually decoded.

Group One Instructions

These instructions are: Add With Carry (ADC), (AND), Compare (CMP), Exclusive Or (EOR), Load A (LDA), Or (ORA), Subtract With Carry (SBC), and Store A (STA). Each of these instructions has a potential for 16 addressing modes, although usually in practice only 8 of the available modes are used.

Addressing modes for Group One are: Immediate, Zero Page, Zero Page Indexed by X, Absolute, Absolute Indexed by X, Absolute Indexed by Y, Indexed Indirect, Indirect Indexed. The unused 8 addressing modes are used to allow, possibly, addressing of additional on-chip registers, of on-chip I/O ports, and to allow two-byte word processing.

Group Two Instructions

Group Two instructions are primily Read, Modify, Write instructions. There are really two subcategories within the Group Two instructions. The components of the first group are shift and rotate instructions and are: Shift Right (LSR), Shift Left (ASL), Rotate Left (RCL), and Rotate Right (ROR).

The second subgroup includes the Increment (INC) and Decrement (DEC) instructions and the two index register X instructions, Load X (LDX) and Store X (STX). These instructions would normally have 8 addressing modes available to them because of the bit pattern. However, to allow for upward expansion, only the following addressing modes have been defined: Zero Page, Zero Page Indexed by X, Absolute, Absolute Indexed by X, and a special Accumulator (or Register) mode. The four shift instructions all have register A operations; the incremented or decremented Load X and Store X instructions also have accumulator modes, although the Increment and Decrement Accumulator has been reserved for other purposes. Load X from A has been assigned its own mnemonic, TAX. Also included in this group are the special functions of Decrement X which is one of the special cases of Store X. Included also in this group in the X decodes are the TXS and TSX instructions.

All group One instructions have all addressing modes available to each instruction. In the case of Group Two instructions, another addressing mode has been added; that of the accumulator and the other special decodes have also been implemented in this basic group. However, the primary function of Group Two instructions is to perform some memory operation using the appropriate index.

It should be noted for documentation purposes that the X instructions have a special mode of addressing in which register Y is used for all indexing operations; thus, instead of Zero Page Indexed by X, X instructions have Zero Page Indexed by Y, and instead of having Absolute Indexed by X, X instructions have Absolute Indexed by Y.

Group Three Instructions

There are really two major classifications of Group Three instructions; the modify Y register instructions, Load Y (LDY), Store Y (STY), Compare Y (CPY), and Compare X (CPX), instructions actually occupy about half of the OP CODE space for the Group Three instructions. Increment X (INX) and Increment Y (INY) are special subsets of the Compare X and Compare Y instructions and all of the branch instructions are in the Group Three instructions.

Instructions in this group consist of all of the branches: BCC, BCS, BEQ, BMI, BNE, BPI, BPC and BPS. All of the flag operations are also devoted to one addressing mode—they are: CLC, SEC, CLD, SED, CLI, SEI and CLV. All of the push-and-pull instructions and stack operation instructions are Group Three instructions. These include: BRK, JSR, PHA, PHP, PLA and PLP. The JMP and BIT instructions are also included in this group. There is no common addressing mode available to members of this group. Load Y, Store Y, BIT, Compare X and Compare Y have Zero Page and Absolute, and all of the Y and X instructions allow Zero Page Indexed operations and Immediate.

Returning to FIG. 4, the total CPU instruction set of Table VII which controls CPU 51 is stored in the program memory unit 53. The CPU 51 references the contents of the memory unit 53 in order to determine appropriate processing steps.

In operations, the addresses of the instruction set, in order, are numerically adjacent, the lower addresses containing the first instructions to be executed and the higher addresses containing later instructions.

The only time the program violates the sequential rule previously mentioned is when the instruction in one section of memory is a "jump" instruction to another section of memory.

A jump instruction can also contain the address of the instruction which is to follow it. The next instruction may be stored in any location in memory unit 53, FIG. 4, as long as the programmed jump specifies the correct address.

A special kind of program jump occurs when the stored program "calls" a subroutine. In this kind of jump, the CPU 51 is required to "remember" the contents of the program counter at the time that the jump occurs. This enables the CPU 51 to resume execution of the main program which it is finished with the last instruction of the subroutine.

A "subroutine" is a program within a program. Usually it is a general-purpose set of instructions that must be executed repeatedly in the course of a main program.

The CPU 51 has a special way of handling subroutines in order to insure an orderly return to the main program. When the CPU receives a call instruction, it increments the program counter and notes the counter's contents in a reserved memory area of the memory unit known as the stack area, which includes stack pointer 82 and index registers 77 of FIG. 5. The stack area thus saves the address of the instruction to be executed after the subroutine is completed. Then the CPU 51 loads the address specified in the call into the program counter 72. The next instruction fetched will therefore be the first step of the subroutine.

The last instruction in any subroutine is a "return". Such an instruction need specify no address. When the CPU 51 fetches a return instruction, it simply replaces the current contents of the program counter with the address on the top of the stack. This causes the CPU 51 to resume execution of the calling program at the point immediately following the original call instruction.

Subroutines are often "nested", that is, one subroutine will sometimes call a second subroutine. The second may call a third, and so on. This is perfectly acceptable, as long as CPU 51 has enough capacity to store the necessary return addresses, and the logical provision for doing so. In other words, the maximum depth of nesting is determined by the depth of the stack. If the stack has space for storing three return addresses, then three levels of subroutines may be accomplished.

CPU's have different ways of maintaining stack contents. Some have facilities for the storage of return addresses built into the CPU itself. Other CPU's use a reserved area of external memory as the stack area and simply maintain a stack "pointer" register, such as pointer register 82, FIG. 6, which contains the address of the most recent stack entry. The external stack hence allows virtually unlimited subroutine nesting. In addition, if the processor provides instructions that cause the contents of the accumulator 73 and other general-purpose registers to be "pushed" onto the stack or "pulled" off the stack via the address stored in the stack pointer 82, multi-level interrupt processing (as described later) is possible. The status of CPU 51 (i.e., the contents of all the registers) can be saved in the stack when an interrupt is accepted and then restored after the interrupt has been serviced. This ability to save the CPU's status at any given time is possible, even if an interrupt service routine itself is interrupted.

Each operation that the CPU can perform is identified by a unique byte of data known as an "operation code". An 8-bit word used as an operation code can distinguish between 256 alternative actions, more than adequate for most processors.

In general, all instructions begin with T0 and the fetch of the OP CODE and continue through the required number of cycles until the next T0 and the fetch of the next OP CODE. Basic terminology used in conjunction with the Figures and is as defined below, for ease of reference.

OP CODE—The first byte of the instruction containing the operator and mode of address.

OPERAND—The data on which the operation specified in the OP CODE is performed.

BASE ADDRESS—The address in Indexed addressing modes which specifies the location in memory to which indexing is referenced. The high order of byte of the base address (AB08 to AB15) is BAH (Base Address High) and the low order of the base address (AB00 to AB07) is BAL (Base Address Low).

EFFECTIVE ADDRESS—The destination in memory in which the data are to be found. The effective address may be loaded directly as in the case of page Zero and Absolute Addressing or may be calculated as in Indexing operations. The high order byte of the effective address (AB08 to AB15) is ADH and the low order byte of the effective address (AB00 to AB07) is ADL.

INDIRECT ADDRESS—The address found in the operand of instructions utilizing (Indirect), Y which contains the low order byte of the base address. IAH and IAL represent the high and low order bytes.

JUMP ADDRESS—The value to be loaded into Program Counter as a result of a Jump Instruction.

During operation, the CPU 51 fetches an instruction in two distinct operations. First, CPU 51 transmits the address in its program counter 72 of FIG. 6 to the memory. Then the memory returns the addressed byte to CPU 51, viz. to the instruction decoder 68, and uses it to direct activities during the remainder of the execution.

The mechanism by which the CPU translates an operation code into specific progressing actions requires some elaboration. The 8 bits stored in the instruction decoder 68 can be decoded and used to selectively activate one of a number of output lines, in this case up to 256 lines. Each line represents a set of activities associated with execution of a particular operation code. The enabled line can be combined with selected timing pulses, to develop electrical signals that can then be used to initiate specific actions. This translation of code into action is also aided by the control circuitry associated therewith, as previously explained.

An 8-bit operation code is often sufficient to specify a particular processing action. There are times, however, when execution of the instruction requires more information than 8 bits can convey, e.g., say when the instruction references a memory location. The basic instruction code identifies the operation to be performed, but cannot specify the object address as well. In a case such as this, a 2- or 3-byte instruction must be used. Successive instruction bytes are stored in sequentially adjacent memory locations, and the CPU performs two or three fetches in succession to obtain the full instruction. The first byte retrieved from memory is placed in the CPU's instruction 66 and subsequent bytes are placed in temporary storage; the CPU then proceeds with the execution phase.

CPU 51 usually uses register-pairs to hold the address of a memory location that is to be accessed for data. If the address register is programmable (i.e., if there are instructions that allow the programmer to alter the contents of the register), the program can "build" an address in the address register prior to executing a memory reference instruction (i.e., and instruction that reads data from memory, writes data to memory or operates on data stored in memory).

ALU 63, as previously mentioned, is that portion of the CPU performing the arithmetical and logical operations on the binary data.

The ALU 63 must contain an adder which is capable of combining the contents of registers of array, the register of the CPU and accumulator 73 in accordance with the logic of binary arithmetic. This provision permits the CPU to perform arithmetical manipulations on the data it obtains from memory and from its other inputs.

Using only the basic adder, routines can subtract, multiply and divide, giving the machine complete arithmetical capabilities. In practice, however, most ALU's provide other built-in functions, including hardware subtraction, boolean logic operations and shift capabilities in conjunction with index registers 77.

As previously indicated, interrupt provisions are included on many central processors as a means of improving the CPU's efficiency. Consider the case of a computer that is processing a large volume of data, portions of which are to be output to a printer. The CPU 51 can output a byte of data within a single machine cycle, but it may take the printer the equivalent of many machine cycles to actually print the character specified by the data byte. The CPU 51 would then remain idle, waiting until the printer can accept the next data byte. If an interrupt capability is implemented to the computer, the CPU can output a data byte, then return to data processing. When the printer is ready to accept the next data byte, it can request an interrupt. When the CPU 51 acknowledges the interrupt, it suspends main program execution and automatically branches to a routine that will output the next data byte. After the byte is output, the CPU 51 continues with main program execution. Note that this is, in principle, quite similar to a subroutine call, except that the jump is initiated externally rather than by the program.

More complex interrupt structures are possible, in which several interrupting devices share the same processor but have different priority levels. Interruptive processing is an important feature that enables maximum utilization of a processor's capacity for high system throughput.

Another important feature that improves the throughput of a CPU is the hold. The hold provision enables direct memory access (DMA) operations.

In ordinary input and output operations, the CPU 51 supervises the entire data transfer. Information to be placed in memory is transferred from the input device to the CPU, and then from the CPU to the designated memory location. In similar fashion, information that goes from memory to output devices goes by way of the CPU.

Some peripheral devices, however, are capable of transferring information to and from memory much faster than the CPU itself can accomplish the transfer. If any appreciable quantity of data must be transferred to or from such a device, then system throughput will be increased by having the device accomplish the transfer directly. The CPU 51 must temporarily suspend its operation during such a transfer, to prevent conflicts that would arise if the CPU and peripheral device attempted to access memory simultaneously. It is for this reason that a hold provision is provided.

TABLE VI

Summary of Processor Instructions by Hexadecimal Sequence

| Hexadecimal | Mnemonic |
| --- | --- |
| 00 | BRK |
| 01 | CRA - (Indirect,X) |
| 05 | CRA - Zero Page |
| 06 | ASL - Zero Page |
| 08 | PHP |
| 09 | CRA - Immediate |
| 0A | ASL - Accumulator |
| 0D | CRA - Absolute |
| 0E | ASI - Absolute |
| 10 | BPL |
| 11 | CRA - (Indirect),Y |
| 15 | ORA - Zero Page,X |
| 18 | CLC |
| 19 | ORA - Absolute,Y |
| 1D | CRA - Absolute,X |
| 1E | ASL - Absolute,X |
| 20 | JSR |
| 21 | AND - (Indirect,X) |
| 24 | BIT - Zero Page |
| 25 | AND - Zero Page |
| 26 | ROL - Zero Page |
| 28 | PLP |
| 29 | AND - Immediate |
| 2A | ROL - Accumulator |
| 2C | BIT - Absolute |
| 2E | ROL - Absolute |
| 30 | BMI |
| 31 | AND - (Indirect),Y |
| 35 | AND - Zero Page,X |
| 36 | ROL - Zero Page,X |
| 38 | SEC |
| 39 | AND - Absolute,Y |
| 3D | AND - Absolute,X |
| 3E | ROL - Absolute,X |
| 40 | RTI |
| 41 | EOR - (Indirect,X) |
| 45 | EOR - Zero Page |
| 46 | LSR - Zero Page |
| 48 | PHA |
| 68 | PLA |
| 69 | ADC - Immediate |
| 6A | ROR - Accumulator |
| 6C | JMP - Indirect |
| 6D | ADC - Absolute |
| 6E | ROR - Absolute |
| 70 | BVS |

TABLE VI-continued
Summary of Processor Instructions by Hexadecimal Sequence

| Hexadecimal | Mnemonic |
|---|---|
| 71 | ADC - (Indirect),Y |
| 75 | ADC - Zero Page,X |
| 76 | ROR - Zero Page,X |
| 78 | SEI |
| 79 | ADC - Absolute,Y |
| 7D | ADC - Absolute,X |
| 7E | ROR - Absolute,X |
| 81 | STA - (Indirect,X) |
| 84 | STY - Zero Page |
| 85 | STA - Zero Page |
| 86 | STX - Zero Page |
| 88 | DEY |
| 8A | TXA |
| 8C | STY - Absolute |
| 8D | STA - Absolute |
| 8E | STX - Absolute |
| 90 | BCC |
| 91 | STA - (Indirect),Y |
| 94 | STY - Zero Page,X |
| 95 | STA - Zero Page,Y |
| 98 | TYA |
| 99 | STA - Absolute,Y |
| 9A | TXS |
| 9D | STA - Absolute,X |
| A0 | LDY - Immediate |
| A1 | LDA - (Indirect,X) |
| A2 | LDX - Immediate |
| A4 | LDY - Zero Page |
| A5 | LDA - Zero Page |
| A6 | LDX - Zero Page |
| A8 | TAY |
| A9 | LDA - Immediate |
| AA | TAX |
| AC | LDY - Absolute |
| AD | LDA - Absolute |
| AE | LDX - Absolute |
| B0 | BCS |
| B1 | LDA - (Indirect),Y |
| B4 | LDY - Zero Page,X |
| B5 | LDA - Indirect,X |
| B6 | LDX - Indirect,Y |
| B8 | CLV |
| B9 | LDA - Absolute,Y |
| BA | TSX |
| BC | LDY - Absolute,X |
| BD | LDA - Absolute,X |
| BE | LDX - Absolute,Y |
| C0 | CPY - Immediate |
| C1 | CMP - (Indirect,X) |
| C4 | CPY - Zero Page |
| C5 | CMP - Zero Page |
| C6 | DEC - Zero Page |
| C8 | INY |
| C9 | CMP - Immediate |
| CA | DEX |
| CC | CPY - Absolute |
| CD | CMP - Absolute |
| CE | DEC - Absolute |
| D0 | BNE |
| D1 | CMP - (Indirect),Y |
| D5 | CMP - Zero Page,X |
| D6 | DEC - Zero Page,X |
| D8 | CLD |
| D9 | CMP - Absolute,Y |
| DD | CMP - Absolute,X |
| DE | DEC - Absolute,X |
| E0 | CPX - Immediate |
| E1 | SBC - (Indirect,X) |
| E4 | CPX - Zero Page |
| E5 | SBC - Zero Page |
| E6 | INC - Zero Page |
| E8 | INX |
| E9 | SBC - Immediate |
| EA | NOP |
| EC | CPX - Absolute |
| ED | SBC - Absolute |
| EE | INC - Absolute |
| F0 | BEQ |
| F1 | SBC - (Indirect),Y |
| F5 | SBC - Zero Page,X |
| F6 | IQC - Zero Page,X |
| F8 | SED |
| F9 | SBC - Absolute,Y |
| FD | SBC - Absolute,X |
| FE | INC - Absolute,X |

To repeat, in estimating gas-liquid saturation effects in sands or sandstones having any degree of consolidation, inputting only compressional-wave velocity, density and porosity is all that is required in order to provide estimates of the compression (or bulk) moduli, $K^*$, of fluid-saturated sands; the compression moduli, $K_a$, of sands with empty pores (or with pore-fluid pressures held constant $K_{fc} = K^* - K_a$; and the shear moduli, $G^*$ of fluid-saturated sands (or $G_a$, of empty sands).

And for an isotropic and homogeneous medium, the velocity, density and moduli are as related above:

$$\rho_B V_p^2 = P^* = K^* + (4/3)G^* \qquad (18)$$

$$\rho_B V_s^2 = G^* \qquad (19)$$

where rho-B is the bulk density of the formation.

If both compressional- and shear-wave velocities are known, of course, Equation 18 gives $K^*$ directly. But no shear-wave logs exist for most basins under study; furthermore, if they exist, the results are unreliable in loose (unconsolidated) sands.

For convenience and brevity, a program listing has been formulated to ease the solution of the above equations, including calculation of elastic moduli of gases in pseudo-reduced form and preferably under adiabatic conditions, and is set forth below in the Appendix. In such listing, several lower-case symbols will represent dimensionless ratios of moduli where $a = K_a/K_m$, $b = K^*/K_m$, $g + G^*/G_m = G_a/G_m$, and $f = (K_m/K_f) - 1$.

Gassmann's equations 18 and 20d can be modified:

$$\rho_B V_p^2 = P^* = bK_m + (4/3g)G_m \qquad (18)$$

$$(K^* - K_a)/K_m = K_f/K_m = b - a = \frac{(1-a)^2}{f\phi + (1-a)} = \frac{(1-b)^2}{f\phi - (1-b)} \qquad (20d)$$

Additionally, an acceptable empirical relationship between the a and g dimensionless ratios includes:

$$a - g = f_3(c, a+g) \qquad (63)$$

where c is an adjustable parameter, a and g are as defined above, and $f_3$ is a functional operator.

The program also computes fluid effects $K_f$ in limestone, sandstone or dolostone formations in which the saturants can be oil (of any gravity), gas (of any gravity), brine, or a combination of all of the above. The resulting output of the program then is the best estimate of seismic velocities and densities as a function of the assumed saturants. Needed input data are depth, pressure gradient, temperature gradient, compressional velocity, $V_p$ (from a sonic log), porosity, $\phi$, bulk density, rho-B, and lithology. Detailed mineralogy is desirable, but not necessary. Note that the user first assumes a gas-oil-brine saturation; an expected compressional velocity Vp, shear velocity Vs, and Poisson's ratio, sigma*, are computed for the formation in the extrapolated region adjacent the well bore. Then velocities can be modeled as a function of gas-oil saturations, for any gravity liquid or gas. Shear wave data are not necessary to use the technique of the present invention. Section A of the listing of the program indicates that the comment statements of the program are quite complete. They describe the meaning of the different symbols used in the program, the method of inputting data to the program and references to the literature relevant to the theory of operation.

Much of the data are built into the program by means of such declarative statements. The inputs are also exhibited in the early part of the program listing.

Briefly, in operation, after reading in the parameter cards and sample cards and possibly mineral cards, the program proceeds to a main compute loop.

Section B illustrates the main part of the program. Note that the compute loop calculates the quantities needed to make the Biot-Gassman fluid corrections to the bulk modulus as a function of gas saturation and oil saturation. Note that the user can indicate lithology, i.e., sandstone, limestone and dolostone lithologies. Furthermore, it does not obtain the gas bulk modulus for methane only, but uses the complete Benedict-Webb-Rubin non-ideal gas law in pseudo-reduced form to calculate both gas modulus and the gas density. Surprisingly, for predicting elastic properties of fluids using well log data, the adiabatic form of the Benedict-Webb-Rubin equation has been found to be unexpectedly accurate in predicting the gas bulk modulus Kg*. Reason: at the frequencies of interest, i.e., around 20 Khz, heat exchange between the rock and gas is of some consequence, assuming moderate pore sizes, and usual values of heat conductivities for the gas. A very important input is the API gas gravity and, in addition, the API oil gravity in cases where the user wishes to consider a total fluid consisting of brine, gas and oil mixtures. It should be pointed out that the three components are in separate phases in the pores spaces of the rock. As the program proceeds, calculations for different gas and oil saturations occur, varying the gas saturation over 18 values from 0 to 100% while also varying within each gas saturation the oil saturation over 6 values from 0 to 100% in steps of 20%. The program requires that the sum of the gas, oil and brine saturations be equal to unity and will stop the calculation and proceed to the next case if the sum of the saturations exceeds unity.

For sandstones and sands, essentially the program does the following. Using its brine-saturated inputs, rho-B, the bulk density and Vp, the compressional wave velocity, in the case of a sandstone subroutine KGKA is called to solve simultaneously Equations 18, 20d and 64. Km is the solid matrix bulk modulus, Gm is the solid matrix shear modulus and P* is the P-wave modulus.

These are a set of non-linear equations in the quantities a, b, $f_o$ and g defined by equations $a = K_a/K_m$
$b = K^*/K_m$
$g = G^*/G_m$ and $f_o = K_m/K_f - 1$ Since the matrix moduli Km, Gm will be known, one can then solve for the Biot-Gassmann frame modulus Ka, the brine-filled bulk modulus K* and the brine-filled shear modulus G*. Kf is the total fluid modulus.

For carbonates, in the case of a limestone or dolostone the equations are not solved by the halving search of KGKA, but rather another subroutine LIDOS is entered. It uses the set of equations which are linear in the P-wave modulus P*, namely the equations indicated above. There ak, bk, ag, bg are pressure-dependent empirical coefficients.

The Biot-Gassmann equation is again used and the system is solved by LIDOS to give K*, G* and the frame modulus Ka. Ka and G* are independent of the fluid in the pores so that these values can be used over and over again when needed. K* is not so independent, but requires for its calculation a repeated application of the fluid correction and the Biot-Gassmann equations. This is done in subroutine BIOT for the various fluid moduli, Kf, computed by subroutine FLMOD2.

Gas Equations

The gas modulus and density are computed before entering the DO compute loop in which gas and oil saturations are varied by a subroutine GASMD3. The subroutine GASMD3 essentially solves the Benedict-Webb-Rubin equation for the reciprocal of the pseudo-reduced volume, namely, if $X = 1/Vpr$ as previously explained, which has to be solved for X in a search procedure.

The subroutine GASMD3 first calculates the isothermal gas bulk modulus KISOGAS using Equation 45 et seq., supra. As previously mentioned, such equations relate to an isothermal non-ideal gas law of state in pseudo-reduced form. Its quantities gamma-r, Bor, Aor, Cor, br, ar, alpha-r are the Benedict-Webb-Rubin coefficients given in the reference of record.

Next, GASMD3 evaluates the specific heat of the gas at constant pressure, Cp, and the specific heat of the gas at constant volume, Cv, using Equations A1-A24, supra. Specifically, the sequence is to obtain Cpo from Equation A15, use that value in Equation A14 to calculate Cvo; then use that value of Cvo in Equation A12 to calculate Cv. Then having Cpr-Cor and Cv values, use Equation A6 to compute Cp. Thus, Cp/Cv can be obtained (by association) for computing the adiabatic gas modulus KADGAS using Equation 58 a, supra.

As mentioned hereinbefore, a parameter GASMIX is input to the subroutine to calculate the gas bulk modulus Kgas via Equations 58b and 58c. I.e., if GASMIX = 1, the adiabatic value for Kgas is calculated in Equation 58c.

An additional feature: while previously the user had to accept built-in values for the average elastic properties Km and Gm, in GASMD3, the user can input his own values under the parameter heading KMDEF and GMDEF of the listing infra.

Upon exit from GASMD3, the user is provided with the gas bulk modulus Kgas and the gas density rho-gas. An inner loop is next entered in which the gas and oil saturations are varied as described above. For each particular gas, oil and brine saturation adding up to unity, a subroutine FLMOD2 is entered with the saturations and with the porosity, which calculates the effective fluid bulk modulus, Kf, by means of applications of Wood's equation+ for the fluid moduli, and the new bulk density RHOBC, which reflects the new fluid mixture, is calculated. What varies as this routine is entered are the saturations, the effective fluid moduli and the effective bulk density. The BIOT subroutine is then entered, and using the original and unchanging frame modulus Ka makes the fluid correction yielding the current K* for the current oil and gas saturations.

+Wood's equation states that the total fluid bulk modulus Kf is given by $1/K_f_3 = S_{gas}/K_{gas} + S_{oil}/K_{oil} + (1-S_{gas}-S_{oil})/K_{brine}$ where $S_{gas}$ and $S_{oil}$ are fractional gas and oil saturations.

The routine also calculates the oil bulk modulus and density, since these are necessary parts of the fluid moduli and density calculations, as previously indicated.

Upon exit from FLMOD2, an effective Poisson's ratio, sigma*, is calculated, and in addition the P-wave velocity and S-wave velocities for this case are obtained from the current K* and rho-B values using $$\sigma^* = (3K^* - 2G^*)/(6K^* + 2G^*)$$

$$P^* = \rho_B V_P^2 = K^* + (4/3)G^*, \quad \rho_B V_s^2 = G^*$$

For each pair of these saturations, the P-wave velocity, the S-wave velocity, the Poisson's ratio, and the bulk density, are printable. Such data constitutes the main output of the program.

Note further in the program that for assumed conditions, the modulus Kf=25 Kbar (to be within the accuracy needed) is pressure-independent. However, an estimate of Km, Gm, and a relationship between a and g are also needed.

To estimate Km and Gm, all information on rock composition of a given area (basin, formation, well, etc.) must be used, i.e., using samples or logs (nuclear, etc.). But mean values for Km and Gm are fairly accurate for many sands, consolidated or not, viz:

$$Km = 393 \text{ Kbar}; \quad Gm = 361 \text{ Kbar} \qquad (65)$$

The standard deviations of the above quantities for several samples measured were 7% and 12% respectively. Extensive calculations with and without physical models, with sandstone data, produced the acceptable empirical relationship between a and g previously indicated, i.e., Equation 64, supra $$a - g = f_3(c, a+g) \qquad (64)$$

where c is an adjustable empirical parameter, a and g are as described above, and $f_3$ is a functional operator which relates to the variables of interest in an empirical fashion. It was surprising found by minimizing the rms error between predicted and measured moduli values and is pressure-independent in the above approximation. The correlation coefficients for estimating K* and G* using Equation 64 are both over 0.95.

Final data base includes suites for all lithologies of interest, with densities and porosities measured and with all compressional-wave and shear-wave velocities measured as functions of pressure. In addition, compositions were determined by an overlapping suite of measurements to give estimates of Km and Gm. Equation 18 supra gives G*, P* and K*; with values of Km and Gm, a and g can then be provided. Equation 64 then gives a c-value for each sample. Such c-values were found not to be significantly correlated with either G, $\phi$, Km/Gm, Gm, or some other pertinent parameters.

Samples containing substantial amounts of carbonates or high-elastic-modulus iron minerals, e.g., had somewhat negative correlations of c with Km. Deleting such samples from the data base reduced the suite of hard sandstones slightly. A slight negative correlation also existed between c and pressure.

By adopting the above equations and the value Kf=25 Kbar, all the information needed to use Equations 18 and 20d become available. The computation, however, is easy to do only "backwards"; that is, by starting with some value of (a+b) and computing (a−g), a and g. Then Equation 20d gives b, and finally, Equation 18 gives P*. Of course, use of the definitions of the various quantities as indicated above is mandatory.

To use P* and $\phi$ to compute K*, Ka, G*, etc., one approach is to program an iterative solution as set forth below. But also, another approach would be to start with various values of (a+g) and construct plots or of the desired quantities as functions of P* for various values of $\phi$, as also indicated below.

Carbonates

In the case of a limestone or dolostone, Equations 18, 20d, 33 and 34 are not directly solved by the method outlined above; instead, a new set of equations can be used, viz., Equations 20d, 21 and 22, supra; these equations which are functions of the P-wave modulus, P*, are used to solve for bulk and shear moduli (K* and G*) and the frame modulus (Ka) is next solved using the relationship $a = Ka/Km$; $b = /Km$; $g = G^*/Gm$; and $f = Km/Kf - 1$. For carbonates, it is preferable that Equation 20d be rewritten as follows:

$$a = \frac{(f\phi + 1)b - 1}{f\phi + b - 1} \qquad (20f)$$

Note in the above calculations that Ka and G* are independent of the fluid in the pore space, so that the former values can be used over again as needed. The variable K* is not independent, but requires repeated application of the fluid correction and the Biot-Gassmann Equations 20a-20f. This can routinely be achieved for various fluid moduli as specified in detail below.

Note that the present invention not only allows the experimenter to specify that the formation is initially 100% brine saturated and that the lithology is sandstone, limestone or dolostone, but also to be able to specify isothermal or adiabatic conditions for the calculation of the gas modulus, Kgas. Detailed mineralogy also permits him also to make a more accurate estimate, but it is not a necessary input variable. If detailed mineralogy is known, the volume percent of each component must be input in a manner shown in the method set forth below.

The program uses the Voigt-Reuss-Hill (VRH) method to calculate the bulk modulus, Km, and the shear modulus, Gm, of the solid part of the rock.

If the detailed mineralogy is not used, the method of the present invention automatically defaults to "average" values of Km and Gm for each lithology.

If a rock is widely different in composition from "average" rocks, detailed mineralogy is necessary in order to do accurate estimates. For example, if a limestone contained quartz beyond about 25%, the Km, Gm default values for limestones could lead one into significant errors in estimation of fluid effects.

Data banks for the process of the invention, of course, must come from a 100%-brine-saturated section of a well. If Km and Gm are known from mineralogical analysis, such values are used. If not, the assumed values of 393 and 361 Kbar, respectively, are available. The solution to Gassmann's equation is very sensitive to errors in Km only when the porosity is low. As the major application of these equations is intended to be in high-porosity "soft" rocks, errors in Km are not apt to be a major drawback.

Note the general expression for Vp for any fluid saturant:

$$V_p = \left[1/\rho_b \left(\hat{K}_a + \frac{(1 - \hat{K}_a/K_m)^2}{\phi/K_f + (1 - \phi)/K_m - \hat{K}_a/K_m^2} + (4/3)\hat{G}^*\right)\right]^{\frac{1}{2}}$$

where Kfg equals the bulk modulus for a brine-gas mixture.

Iterative Method in Detail

The objective is to start with assumed values of Km, Gm, and Kf, and the measured values of P* and $\phi$; and then to use the empirical relationship in Equation 34 and Gassmann's Equation 20d supra to estimate Ka, K*, Kfc and G*. A simple iterative calculation with interval-halving to update the variable (a+g) of Equation 34 is available, and such sequence is as follows:

(1) From the current value of (a+g), calculate (a−g); then solve for a and g, and use Gassmann's equation 20d to get b. Use Equations 33 and 18 and the definitions of the quantities to get trial values of K*, G* and finally P*. Let the trial value of P* be P′; the error in P* is then P′−P*.

(2) If the sign of the error is opposite to that of the preceding error, divide the increment for updating (a+g) by −2. That is, if (P′−P*) has crossed zero, reverse directions and use steps only half as large.

(3) Update (a+g) by adding the current size and sign of the increment, as mentioned above.

(4) If the increment [or (P′−P*)] is satisfactorily small, terminate the iteration. Otherwise, repeat from Step (1).

Suitable starting values are (a+g)=0, increment=+0.4, and negative (P′−P*). The results for (a+g), (a−g) and K* are easily used to calculate the various parameters.

APPENDIX

Having now briefly described the operation of the CPU 51 and of an instruction set for operation of a particular type microprocessor system, e.g. MGS 6500, the program listing for carrying out, in the main, the method of the present invention is of consequence and is set forth below in detail.

The listing is divided into two sections. Section A contains comments as to the purpose and scope of the method. E.g., Steps 40000–220000 detail the purpose and limitations of the method; Steps 230000–1040000 indicate the form and nature of the input data; Steps 1050000–1210000 state the form and nature of the output information; Steps 1220000–1280000 indicate what error messages are to be expected; Steps 1290053–1310000 indicate the nature and scope of subroutines, etc.

Section B describes the method in detail for calculating various petrophysical parameters of interest. Note that designated instruction numbers describe particular operations as carried by the subsequent instructions. These commands provide in sequence form the operations previously described with reference to FIGS. 4 and 5. Comparison of actual versus synthetic values then occurs on a separate internal (or external) basis as previously described.

SUMMARY

The program has a variety of potential uses, especially in wells where shear wave data are either unavailable or unreliable. It should be of most value in wells where the rocks are "soft", i.e., they are poorly cemented, fractured or have high porosity. Fluid effects in general tend to diminish with increasing effective pressure, so these concepts will be more likely applicable at shallow depths. They will also, in general, be more observable in young rather than old sediments.

Hard, low-porosity and well-cemented rocks of any lithology are poor candidates to attempt these types of calculations.

Among the sands, the more soil-like materials are the most likely, and the well-cemented quartzites the least likely, candidates.

The order among carbonates is (1) chalks; (2) clastics; and (3) reefs.

The user is advised to be cautious in applying the invention to abnormally pressured formations, inasmuch as empirical relationships are established for normal fluid pressures. Additionally, possible fluid pressure dependence may alter the validity of the numerical constants. Furhtermore, other uncertainties could be emergent, due to the fact that the invention cannot take into account possible changes in porosity resulting from alteration in the fluid pressure gradient. This inability to take these orosity changes into account could lead to apparently anomalous calculated velocities. Hence, if the user attempts to model an abnormally section by altering the fluid pressure gradient, he should bear in mind these cautions.

Inputting incompatible brine-saturated velocities, porosities and/or densities will lead to a warning message to the user that he has violated an elastic lower-bound condition; however, the calculations will proceed. Further in summary, the invention has proven to be surprisingly accurate in computing the change in compressional-wave velocity due to a change in pore fluids. Examples of calculations include two poorly consolidated sands from a documentable well, offshore Louisiana, and such estimates correlate surprisingly well with laboratory results.

SECTION A

```
12    ; C
13    ; C
14    ; C
15    ; C     PURPOSE-THIS PROGRAM TAKES BRINE SATURATED PETROPHYSICAL
16    ; C     PARAMETERS FOR A ROCK SAMPLE OR EARTH SECTION AND COMPUTES
17    ; C     FOR A RANGE OF G/O SATURATIONS THE P-WAVE VELOCITY,VCP, THE SHE
18    ; C     WAVE  VELOCITY VCS, THE POISSON'S RATIO AND THE CALCULATED BULK
19    ; C     DENSITY RHOBC AND LISTS THEM IN A TABLE. THE PROGRAM MAY OR MAY
20    ; C     NOT HAVE MINERALOGICAL INPUTS X(I),I=1,13.
21    ; C     SANDSTONE,LIMESTONE & DOLOSTONE LITHOLOGIES ARE ALLOWED.
22    ; C        THIS PROGRAM DIFFERS FROM THE ORIGINAL BALTIMOR IN THAT IT C
23    ; C     HANDLE THE THREE LITHOLOGIES AS WELL AS A VARIETY OF OIL AND GA
24    ; C     SATURATIONS (SOIL+SGAS <1.0). THE BENEDICT-WEBB-RUBIN EQN. IS
25    ; C     TO OBTAIN KGAS (GAS MODULUS) AND RHOGAS (GAS BULK DENSITY.)
26    ; C     KGAS IS COMPUTED FROM THE ISOTHERMAL FORM OF THE B-W-R EQN.
27    ; C     AND THE ADIABATIC FORM MIXED AS (1-GASMIX)*KISO+GASMIX*KADIABAT
28    ; C     FOR SEISMIC FREQUENCIES, THE ISOTHERMAL (GASMIX=0) OPTION APPLI
29    ; C     FOR HIGHER FREQUENCIES (SONIC LOG) THE ADIABATIC (GASMIX=1) CAS
30    ; C     APPLIES. INTERMEDIATE FREQUENCIES MAY REQUIRE A MIXTURE.
31    ; C     SPECIAL EMPIRICAL RELATIONS ARE USED TO OBTAIN KOIL(OIL BULK MO
32    ; C     AND RHOOIL (OIL BULK DENSITY).
33    ; C
34    ; C     THIS PROGRAM TAKES AS INPUT:
35    ; C     1. 3 HEADING CARDS PER SUITE OF PROBLEMS,ALPHAMERIC COLS.1..80.
36    ; C        FORMAT(20A4).
37    ; C     2. A PARAMETER CARD (8F7.0,3I3) :
38    ; C        TGRAD=DEG.F TEMP GRADIENT.
39    ; C        FGRAD=FLUID PRESSURE GRADIENT.
40    ; C        CO=THOMPSON BROWN EQN. COFF.
41    ; C        KBRINE=BRINE BULK MODULUS.
42    ; C        RHOBRN=BRINE BULK DENSITY(GM/CM**3).
43    ; C        TOL=1-B EQN HALVING SEARCH TOLERANCE.
44    ; C        TO=SURFACE TEMP.DEG.F. DEFAULT=74 DEG. F.
45    ; C        TST=TOLERANCE OF COMPUTED VS. OBSERVED BULK DENSITY VARIATIO
46    ; C        IN %.            APPLIES WHEN MINERALS ARE KNOWN (MIN.>0
47    ; C        NBUG=SPECIAL (RESEARCHY) DEBUG PARAMETER WHEN>0., DEFAULT=0.
48    ; C        NSG=NO. OF GAS SATURATION ,SG,VALUES. (CURRENTLY LIMITED TO
49    ; C        18 VALUES(SEE ARRAYS BELOW). DEFAULT=18.
50    ; C        NSO=NO. OF OIL SATURATION VALUES,CURRENTLY=6=DEFAULT,
51    ; C        TO OBTAIN ZERO OIL SATURATION, SET NSO=1, OILSAT=0.0
52    ; C     3. A SECOND PARAMETER CARD (5F10.0,2F8.0):
53    ; C        GASGRV=API GAS GRAVITY. DEFAULT=0.554 (METHANE)F10.0
54    ; C        OILGRV=API OIL GRAVITY.
55    ; C        OVGRAD=OVERBURDEN PRESSURE GRADIENT.              F10.
56    ; C        OILSAT, A PREDETERMINED FIXED OIL SATURATION(%) WHICH HOLDS
57    ; C        THE OIL SATURATION FIXED IF OILSAT>0. THE DEFAULT=0 ,IN WHIC
58    ; C        CASE OIL SATURATION CAN VARY FROM SO(1)...SO(NSO), WHERE NSO
59    ; C        WHEN OILSAT >0, NSO=1 AUTOMATICALLY.    (F10.0)
60    ; C        GASMIX, A ISOTHERMAL -ADIABATIC MIXING PARAMETER,
61    ; C        KGAS                                    DEFAULT=0=ISOTHERMAL
62    ; C        MUST BE BETWEEN 0 AND 1.0          (F10.0)
63    ; C        KMCEF,GMCEF OVERIDES OF THE BUILT IN VALUES IF NOT 0.0
64    ; C        (2F8.0)
65    ; C     TO OBTAIN ALL DEFAULTS,SET QUANTITY EQUAL TO BLANK, < OR = 0.
66    ; C     4. INPUT CARDS (SAMPLE CARDS),NOBJ IN NUMBER COUNTED AUTOMATICA
67    ; C        THESE CONTAIN:
68    ; C        A.OBSERVED P-WAVE VELOCITY IN FT.SEC(OR SONIC LOG MICRSEC./FT.
69    ; C          NOTE: IF SONIC =0.0, VELOCITY, IF SONIC. NE.0.0 CONVERTS
70    ; C          SONIC LOG TO FT./SEC., VP=1.0E6/VP, ORIGINALLY VP=DELTAT,
71    ; C          WHERE DELTAT IS IN MICROSEC./FT.    COLS.1..10.
72    ; C        B.BULK DENSITY IN GM/CM**3          COLS.11..20.
73    ; C        C.POROSITY IN %                     COLS.21..30.
74    ; C        D.DEPTH IN FT.                      COLS.31..40.
75    ; C        E.TEMPERATURE(DEG.F) COMPUTED IF .LE.0    COLS.41..50.
76    ; C        F. MIN=0(NO MINERALOGY), IF>0,MINERALOGY ,X(I), KNOWN.
77    ; C          DEFAULT=0. COLS.51..53.
78    ; C        G. LTH=1 (SANDSTONE), =2(LIMESTONE), =3(DOLOSTONE) COLS. 54..5
79    ; C        H.SONIC. IF=0,P-WAVE VELOCITY. IF .NE.0,MICROSEC/FT IN COLS.
80    ; C          1...10, WHICH IS CONVERTED TO FT./SEC.(INDICATES SONIC LOG).
81    ; C          DEFAULT=0.0.                    COLS.57..66.
82    ; C        I.SAMP(J),COL(J)=A6,A2 SAMPLE ID COLS. 71...80.
83    ; C        J. TERMINATED BY END FLAG CARD(COLS.1..66 BLANK OR ZERO.)
84    ; C
85    ; C        FORMAT IS (5F10.0,2I3,F10.0,4X,A6,A2)
```

```
 86    ) C
 87    ) C     POSSIBLE MINERALS CARD:
 88    ) C     WHEN MIN =0 NO MINERALS ASSUMED AND KM,GM DEFAULTS TAKEN,
 89    ) C     ALSO RHOBC=MEASURED BULK DENSITY AND RHOM(J) IS COMPUTED TO BE
 90    ) C     COMPATIBLE WITH THIS.
 91    ) C     WHEN MIN>0, A MINERAL CARD ,FORMAT(13F5.0) FOLLOWS THE GENERAL
 92    ) C     PHYSICAL PARAMETER CARD A---G WITH SAME ID IN COLS. 71..80,
 93    ) C     (SAMP,COL)AND WITH MINERALS X(1)...X(13) IN % IN 5 COL. FIELDS
 94    ) C     THESE ARE:
 95    ) C     1.  QUARTZ=X(1)
 96    ) C     2.  CALCITE=X(2)
 97    ) C     3.  DOLOMITE=X(3)
 98    ) C     4.  CLAYS=X(4)
 99    ) C     5.  SILICA=X(5)
100    ) C     6.  FELDSPARS=X(6)
101    ) C     7.  ANHYDRITE=X(7)
102    ) C     8.  SIDERITE=X(8)
103    ) C     9.  BARITE=X(9)
104    ) C     10. PYRITE=X(10)
105    ) C     11. RUTILE=X(11)
106    ) C     12. HALITE=X(12)
107    ) C     13. MICA=X(13), ALL IN PERCENT AND NORMALIZED.
108    ) C     IF NOT NORMALIZED, PROGRAM WILL DO SO.
109    ) C     (THIS CARD MUST FOLLOW THE EACH SAMPLE CARD IF MIN>0)
110    ) C     A BLANK OR 0 X(I) CARD WILL DEFAULT TO MIN=0.
111    ) C     THE ELASIC PARAMETERS K(I),G(I) THE SHEAR & BULK MODULI FOR
112    ) C     EACH OF THE 13 MINERALS AND THE BULK DENSITY,RHO(I), ARE GIVEN
113    ) C     AS FIXED DATA IN THE PROGRAM, FROM WHICH VRH AVERAGES AND AN
114    ) C     AVERAGE FOR RHOM(J) CAN BE BE COMPUTED WHEN MIN>0.
115    ) C
116    ) C     OUTPUT PRINTOUT:
117    ) C     1. HEADING CARD INFORMATION.
118    ) C     2.PARAMETER CARD INFORMATION FOR TWO PARAMETER CARDS.
119    ) C     3.NO. OF OBSERVATIONS(SAMPLES)
120    ) C     4.PROBLEM NO. AND SAMPLE ID.
121    ) C     5. BRINE SATURATED INPUTS, THEN KM,GM,POROSITY AND SONIC.
122    ) C     6.TABLE (L-H)SG,CALCVP,CALCVS,POISSON'S RATIO AND CALC. BULK DE
123    ) C        AS A FUNCTION OF 18 SG=GAS SATURATIONS.
124    ) C
125    ) C     ELASTIC MODULI ARE IN KB., VELOCITIES IN FT./SEC. DENSITIES IN
126    ) C     GM./CM**3  POROSITIES ,SATURATIONS IN %  IN PRINTOUT.
127    ) C
128    ) C     THE ABOVE IS FOR DEFAULT NBUG=0. IF NBUG=1, WE GET ADDITIONALLY
129    ) C     ABOVE THE TABLE(7) VALUES OF A=KA/KM,B=K*/KM,G=G*/GM,K* AND
130    ) C     AND VALUES OF RHOGAS,KGAS AND THE LOCAL TEMERATURE DEG. F,
131    ) C     PLUS NUMEROUS OTHER DIAGNOSTIC QUANTITIES SUCH AS KOIL,RHOOIL,E
132    ) C
133    ) C     ERROR MESSAGES INDICATING EITHER ZERO POROSITY(UNTENABLE) OR
134    ) C     K*<HASHIN SHTRIKMAN LOWER BOUND=KLOW ARE ALSO POSSIBLE.
135    ) C     WHEN MINERALS ARE KNOWN(MIN.GT.0) THE BULK DENSITY, RHOBC IS
136    ) C     CALCULATED. IF ABS(BULKD-RHOBC)/BULKD(%)>TST(%) AN ERROR IS
137    ) C     INDICATED. ONLY ZERO POROSITY TERMINATES THE PROBLEM AND GOES O
138    ) C     TO THE NEXT, ALL OTHER ERRORS ARE PASSIVE MESSAGES.
139    ) C
140    ) C     SUBROUTINES: NAME2,KGKA,FLMOD3,GASMO3,BIOT,CALC,INTERP,LIDOS.
141    ) C     FUNCTION SUBPROGRAMS: FCNRWR,FCNCV,FCNPTV.
142    ) C
143    ) C     REFERENCES:
144    ) C     THOMPSON,D.D. & BROWN,R.J.S.-TECH MEMO                    (KGKA
145    ) C     THOMPSON,D.D. MEMO TO J.K.MAHER,          (RHOOIL)
146    ) C     RUNGE,R.J AND THOMPSON,D.D.-TECH MEMO                     (LIO
147    ) C     RUNGE,R.J. MEMO TO W.W.KERR,
148    ) C     THOMPSON,D.D. & RUNGE,R.J.-COFRC TECH MEMO.
149    ) C     BROWN,R.J.S. & KORRINGA,J.-COFRC MEMO.
150    ) C     THOMAS,K. HANKINSON,W. & PHILLIPS,A.-JOUR.PET.TECH.,V 22(1970)
151    ) C     PGS. 889-895.  B-W-R EQN. & THEORY (GASMO3)
152    ) C     SAGE,B.H.-"THERMODYNAMICS OF MULTI-COMPONENT SYSTEMS", RHEINHOL
153    ) C     N.Y. (1965). DISCUSSES BENEDICT-WEBB-RUBIN EQN. OF STATE (GASM
154    ) C
155    ) C
```

SECTION B

```
165  ; C       
166  ;         IMPLICIT REAL(K)
167  ;         DIMENSION VP(200),BULKD(200),DEPTH(200),POR(200),X(13),WD(65),
168  ;        *FTEMP(200),KM(200),GM(200),RHOM(200),COL(200),MINR(200),LITH(20
169  ;         REAL*8 SAMP(200),SMP

170  ;         DIMENSION SG(18)                                01590000
171  ;         SG(1)=0.0                                       01590100
172            LDA     #1
173            ASL     A
174            ASL     A
175            CLC
176            ADC     #(SG||101-4) MOD .M
177            STA     .T000005
178            LDA     #0
179            ADC     #(SG||101-4)/256
180            STA     .T000005+1
181  .MFLTASG  SET     1
182            JSR     .FLTASGN
183            .BYTE   0
184            .WORD   .C000003
185            .WORD   -.T000005
186  ;         SG(2)=1.0                                       01590200
187            LDA     #2
188            ASL     A
189            ASL     A
190            CLC
191            ADC     #(SG||101-4) MOD .M
192            STA     .T000005
193            LDA     #0
194            ADC     #(SG||101-4)/256
195            STA     .T000005+1
196  .MFLTASG  SET     1
197            JSR     .FLTASGN
198            .BYTE   0
199            .WORD   .C000007
200            .WORD   -.T000005
201  ;         SG(3)=2.0                                       01590300
202            LDA     #3
203            ASL     A
204            ASL     A
205            CLC
206            ADC     #(SG||101-4) MOD .M
207            STA     .T000005
208            LDA     #0
209            ADC     #(SG||101-4)/256
210            STA     .T000005+1
211  .MFLTASG  SET     1
212            JSR     .FLTASGN
213            .BYTE   0
214            .WORD   .C000009
215            .WORD   -.T000005
216  ;         SG(4)=3.0                                       01590400
217            LDA     #4
218            ASL     A
219            ASL     A
220            CLC
221            ADC     #(SG||101-4) MOD .M
222            STA     .T000005
223            LDA     #0
224            ADC     #(SG||101-4)/256
225            STA     .T000005+1
226  .MFLTASG  SET     1
227            JSR     .FLTASGN
228            .BYTE   0
229            .WORD   .C000011
230            .WORD   -.T000005
231  ;         SG(5)=4.0                                       01590500
232            LDA     #5
233            ASL     A
234            ASL     A
235            CLC
236            ADC     #(SG||101-4) MOD .M
237            STA     .T000005
238            LDA     #0
```

```
239              ADC     #(SG111101-4)/256
240              STA     .T000005+1
241     .MFLTASG SET     1
242              JSR     .FLTASGN
243              .BYTE   0
244              .WORD   .C000013
245              .WORD   -.T000005
246     ;        SG(6)=5.0                                    01590600
247              LDA     #6
248              ASL     A
249              ASL     A
250              CLC
251              ADC     #(SG111101-4) MOD .M
252              STA     .T000005
253              LDA     #0
254              ADC     #(SG111101-4)/256
255              STA     .T000005+1
256     .MFLTASG SET     1
257              JSR     .FLTASGN
258              .BYTE   0
259              .WORD   .C000015
260              .WORD   -.T000005
261     ;        SG(7)=10.0                                   01590700
262              LDA     #7
263              ASL     A
264              ASL     A
265              CLC
266              ADC     #(SG111101-4) MOD .M
267              STA     .T000005
268              LDA     #0
269              ADC     #(SG111101-4)/256
270              STA     .T000005+1
271     .MFLTASG SET     1
272              JSR     .FLTASGN
273              .BYTE   0
274              .WORD   .C000017
275              .WORD   -.T000005
276     ;        SG(8)=15.0                                   01590800
277              LDA     #8
278              ASL     A
279              ASL     A
280              CLC
281              ADC     #(SG111101-4) MOD .M
282              STA     .T000005
283              LDA     #0
284              ADC     #(SG111101-4)/256
285              STA     .T000005+1
286     .MFLTASG SET     1
287              JSR     .FLTASGN
288              .BYTE   0
289              .WORD   .C000019
290              .WORD   -.T000005
291     ;        SG(9)=20.0                                   01590900
292              LDA     #9
293              ASL     A
294              ASL     A
295              CLC
296              ADC     #(SG111101-4) MOD .M
297              STA     .T000005
298              LDA     #0
299              ADC     #(SG111101-4)/256
300              STA     .T000005+1
301     .MFLTASG SET     1
302              JSR     .FLTASGN
303              .BYTE   0
304              .WORD   .C000021
305              .WORD   -.T000005
306     ;        SG(10)=25.0                                  01591000
307              LDA     #10
308              ASL     A
309              ASL     A
310              CLC
311              ADC     #(SG111101-4) MOD .M
312              STA     .T000005
313              LDA     #0
314              ADC     #(SG111101-4)/256
315              STA     .T000005+1
316     .MFLTASG SET     1
```

```
317            JSR     .FLTASGN
318            .BYTE   0
319            .WORD   .C000023
320            .WORD   -.T000005
321     ;      SG(11)=30.0                                      01591100
322            LDA     #11
323            ASL     A
324            ASL     A
325            CLC
326            ADC     #(SG111101-4) MOD .M
327            STA     .T000005
328            LDA     #0
329            ADC     #(SG111101-4)/256
330            STA     .T000005+1
331     .MFLTASG SET   1
332            JSR     .FLTASGN
333            .BYTE   0
334            .WORD   .C000025
335            .WORD   -.T000005
336     ;      SG(12)=40.0                                      01591200
337            LDA     #12
338            ASL     A
339            ASL     A
340            CLC
341            ADC     #(SG111101-4) MOD .M
342            STA     .T000005
343            LDA     #0
344            ADC     #(SG111101-4)/256
345            STA     .T000005+1
346     .MFLTASG SET   1
347            JSR     .FLTASGN
348            .BYTE   0
349            .WORD   .C000027
350            .WORD   -.T000005
351     ;      SG(13)=50.0                                      01591300
352            LDA     #13
353            ASL     A
354            ASL     A
355            CLC
356            ADC     #(SG111101-4) MOD .M
357            STA     .T000005
358            LDA     #0
359            ADC     #(SG111101-4)/256
360            STA     .T000005+1
361     .MFLTASG SET   1
362            JSR     .FLTASGN
363            .BYTE   0
364            .WORD   .C000029
365            .WORD   -.T000005
366     ;      SG(14)=60.0                                      01591400
367            LDA     #14
368            ASL     A
369            ASL     A
370            CLC
371            ADC     #(SG111101-4) MOD .M
372            STA     .T000005
373            LDA     #0
374            ADC     #(SG111101-4)/256
375            STA     .T000005+1
376     .MFLTASG SET   1
377            JSR     .FLTASGN
378            .BYTE   0
379            .WORD   .C000031
380            .WORD   -.T000005
381     ;      SG(15)=70.0                                      01591500
382            LDA     #15
383            ASL     A
384            ASL     A
385            CLC
386            ADC     #(SG111101-4) MOD .M
387            STA     .T000005
388            LDA     #0
389            ADC     #(SG111101-4)/256
390            STA     .T000005+1
391     .MFLTASG SET   1
392            JSR     .FLTASGN
393            .BYTE   0
394            .WORD   .C000033
```

```
395                 .WORD  -.T000005
396       ;         SG(16)=60.0                                              01591600
397                 LDA    #16
398                 ASL    A
399                 ASL    A
400                 CLC
401                 ADC    #(SG11101-4) MOD .M
402                 STA    .T000005
403                 LDA    #0
404                 ADC    #(SG11101-4)/256
405                 STA    .T000005+1
406       .MFLTASG  SET    1
407                 JSR    .FLTASGN
408                 .BYTE  0
409                 .WORD  .C000035
410                 .WORD  -.T000005
411       ;         SG(17)=90.0                                              01591700
412                 LDA    #17
413                 ASL    A
414                 ASL    A
415                 CLC
416                 ADC    #(SG11101-4) MOD .M
417                 STA    .T000005
418                 LDA    #0
419                 ADC    #(SG11101-4)/256
420                 STA    .T000005+1
421       .MFLTASG  SET    1
422                 JSR    .FLTASGN
423                 .BYTE  0
424                 .WORD  .C000037
425                 .WORD  -.T000005
426       ;         SG(18)=100.0                                             01591800
427                 LDA    #18
428                 ASL    A
429                 ASL    A
430                 CLC
431                 ADC    #(SG11101-4) MOD .M
432                 STA    .T000005
433                 LDA    #0
434                 ADC    #(SG11101-4)/256
435                 STA    .T000005+1
436       .MFLTASG  SET    1
437                 JSR    .FLTASGN
438                 .BYTE  0
439                 .WORD  .C000039
440                 .WORD  -.T000005
441       ;         REAL*4 SO(6)/0.0,20.0,40.0,60.0,80.0,100.0/
442       ; C       QUARTZ,CALCITE,DOLOMITE,CLAY,SILICA,FELDSPARS,ANHYDRITE,SIDERIT
443       ; C       ,BARITE,PYRITE,RUTILE,HALITE,MICA.          13 MINERALS
444       ;
445       ;
446       ;
447       ;
448       ;
449       ;
450       ;         NIN=5
451                 LDA    #0
452                 STA    NIN11101
453                 LDA    #5
454                 STA    NIN11101+1
455       ;         NOUT=6                                                   01710027
456       ; C       READ THREE 80 COLUMN HEADING CARDS                       01720000
457                 LDA    #0
458                 STA    NOUT11101
459                 LDA    #6
460                 STA    NOUT11101+1
461       ;       1 CALL NAME2(HD,3,0,NIN,NOUT)                              01730029
462       .L000040  EQU    *
463                 LDA    #NOUT11101 MOD .M
464                 STA    NAME2.05
465                 LDA    #NOUT11101/256
466                 STA    NAME2.05+1
467                 LDA    #NIN11101 MOD .M
468                 STA    NAME2.04
469                 LDA    #NIN11101/256
470                 STA    NAME2.04+1
471                 LDA    #.C000041 MOD .M
472                 STA    NAME2.03
```

```
473            LDA     #.C000041/256
474            STA     NAME2.03+1
475            LDA     #.C000008 MOD .M
476            STA     NAME2.02
477            LDA     #.C000008/256
478            STA     NAME2.02+1
479            LDA     #%01111101 MOD .M
480            STA     NAME2.01
481            LDA     #%01111101/256
482            STA     NAME2.01+1
483            JSR     NAME2
484    ; C     READ GENERAL PARAMETER CARD.
485    ; C     READ(NIN,3)TGRAD,FGRAD,CO,KBRINE,RHOBRN,TOL,TO,TST,NBUG,NSG,NSO
486    ; C     3 FORMAT(8F7.0,3I3 )
487    ; C     READ IN API GAS & OIL GRAVITIES AND OVERBURDEN GRADIENT (KPSI/K
488    ; C     ALSO OILSAT,GASMIX AND KMDEF,GMDEF IF DESIRED
489    ; C     IF KMDEF,GMDEF NOT = 0,WILL OVERIDE LATER ATTEMPTED DEFAULTS.
490    ; C
491    ; C     READ(NIN,4)GASGRV,OILGRV,OVGRAD,OILSAT,GASMIX,KMDEF,GMDEF
492    ; C     4 FORMAT(5F10.0,2F8.0)
493    ; C
494    ; C     WRITE(NOUT,5)
495    ; C     5 FORMAT(/45X,'* * * * * BALTMOR * * * * * '//)
496    ;
497            LDA     #0
498            CMP     NSG11101+1
499            LDA     #0
500            SBC     NSG11101
501            BMI     .L000042
502            LDA     #0
503            STA     NSG11101
504            LDA     #18
505            STA     NSG11101+1
506    .L000042 EQU    *                                                01870003
507    ;
508            LDA     #18
509            CMP     NSG11101+1
510            LDA     #0
511            SBC     NSG11101
512            BMI     .L000045
513            JMP     .L000044
514    .L000045 EQU    *
515            LDA     #0
516            STA     NSG11101
517            LDA     #18
518            STA     NSG11101+1
519    .L000044 EQU    *                                                01880012
520    ;
521            LDA     #0
522            CMP     NSO11101+1
523            LDA     #0
524            SBC     NSO11101
525            BMI     .L000046
526            LDA     #0
527            STA     NSO11101
528            LDA     #6
529            STA     NSO11101+1
530    .L000046 EQU    *                                                01890005
531    ;
532            LDA     #6
533            CMP     NSO11101+1
534            LDA     #0
535            SBC     NSO11101
536            BMI     .L000049
537            JMP     .L000048
538    .L000049 EQU    *
539            LDA     #0
540            STA     NSO11101
541            LDA     #6
542            STA     NSO11101+1
543    .L000048 EQU    *                                                01900012
544    ;
545    .MFFLE  SET     1
546            JSR     .FFLE
547            .BYTE   0
548            .WORD   OILSAT01,.C000050
549            ASL     A
550            BCS     *+5
551            JMP     .L000052
```

```
552     .MFLTASG SET    1
553              JSR    .FLTASGN
554              .BYTE  0
555              .WORD  .C000053
556              .WORD  OILSAT01
557     .L000052 EQU    *                                           01910012
558     ;
559     .MFFGT   SET    1
560              JSR    .FFGT
561              .BYTE  0
562              .WORD  OILSAT01,.C000054
563              ASL    A
564              BCS    *+5
565              JMP    .L000055
566              LDA    #0
567              STA    NSOIL101
568              LDA    #1
569              STA    NSOIL101+1
570     .L000055 EQU    *
571     ;        IF(OVGRAD.LE.0.0)OVGRAD=1.0                         01920003
572     .MFFLE   SET    1
573              JSR    .FFLE
574              .BYTE  0
575              .WORD  OVGRAD01,.C000056
576              ASL    A
577              BCS    *+5
578              JMP    .L000057
579     .MFLTASG SET    1
580              JSR    .FLTASGN
581              .BYTE  0
582              .WORD  .C000058
583              .WORD  OVGRAD01
584     .L000057 EQU    *
585     ;        SONIC=0.0                                           01930000
586     .MFLTASG SET    1
587              JSR    .FLTASGN
588              .BYTE  0
589              .WORD  .C000059
590              .WORD  SONIC101
591     ;                                                            01940000
592     .MFFLE   SET    1
593              JSR    .FFLE
594              .BYTE  0
595              .WORD  TST11101,.C000060
596              ASL    A
597              BCS    *+5
598              JMP    .L000061
599     .MFLTASG SET    1
600              JSR    .FLTASGN
601              .BYTE  0
602              .WORD  .C000062
603              .WORD  TST11101
604     .L000061 EQU    *
605     ;        IF(TGRAD.LE.0.0) TGRAD=15.0                         01950000
606     .MFFLE   SET    1
607              JSR    .FFLE
608              .BYTE  0
609              .WORD  TGRAD101,.C000063
610              ASL    A
611              BCS    *+5
612              JMP    .L000064
613     .MFLTASG SET    1
614              JSR    .FLTASGN
615              .BYTE  0
616              .WORD  .C000065
617              .WORD  TGRAD101
618     .L000064 EQU    *
619     ;                                                            01960000
620     .MFFLE   SET    1
621              JSR    .FFLE
622              .BYTE  0
623              .WORD  FGRAD101,.C000066
624              ASL    A
625              BCS    *+5
626              JMP    .L000067
627     .MFLTASG SET    1
628              JSR    .FLTASGN
629              .BYTE  0
```

```
630            .WORD .C000068
631            .WORD FGRADIO1
632   .L000067 EQU   *
633   ;                                              01970000
634   .MFFLE   SET   1
635            JSR   .FFLE
636            .BYTE 0
637            .WORD CO111101,.C000069
638            ASL   A
639            BCS   *+5
640            JMP   .L000070
641   .MFLTASG SET   1
642            JSR   .FLTASGN
643            .BYTE 0
644            .WORD .C000071
645            .WORD CO111101
646   .L000070 EQU   *
647   ;                                              01980002
648   .MFFLE   SET   1
649            JSR   .FFLE
650            .BYTE 0
651            .WORD FBRINE01,.C000072
652            ASL   A
653            BCS   *+5
654            JMP   .L000073
655   .MFLTASG SET   1
656            JSR   .FLTASGN
657            .BYTE 0
658            .WORD .C000074
659            .WORD KBRINE01
660   .L000073 EQU   *
661   ;                                              01990005
662   .MFFLE   SET   1
663            JSR   .FFLE
664            .BYTE 0
665            .WORD RHOBRN01,.C000075
666            ASL   A
667            BCS   *+5
668            JMP   .L000076
669   .MFLTASG SET   1
670            JSR   .FLTASGN
671            .BYTE 0
672            .WORD .C000077
673            .WORD RHOBRN01
674   .L000076 EQU   *
675   ;                                              02000000
676   .MFFLE   SET   1
677            JSR   .FFLE
678            .BYTE 0
679            .WORD TOL11101,.C000078
680            ASL   A
681            BCS   *+5
682            JMP   .L000079
683   .MFLTASG SET   1
684            JSR   .FLTASGN
685            .BYTE 0
686            .WORD .C000080
687            .WORD TOL11101
688   .L000079 EQU   *
689   ;                                              02010005
690   .MFFSUB  SET   1
691            JSR   .FFSUB
692            .BYTE 0
693            .WORD OVGRAD01,FGRADIO1
694            .WORD DGRADIO1
695   ;        IF(NBUG.LE.0)NBUG=0                   02020000
696            LDA   #0
697            CMP   NBUG1101+1
698            LDA   #0
699            SBC   NBUG1101
700            BMI   .L000082
701            LDA   #0
702            STA   NBUG1101
703            LDA   #0
704            STA   NBUG1101+1
705   .L000082 EQU   *
706   ;                                              02030000
707   .MFFLE   SET   1
708            JSR   .FFLE
709            .BYTE 0
```

```
710                 .WORD   T0111101,.L000084
711                 ASL     A
712                 BCS     *+5
713                 JMP     .L000085
714     .MFLTASG    SET     1
715                 JSR     .FLTASGN
716                 .BYTE   0
717                 .WORD   .C000086
718                 .WORD   T0111101
719     .L000085    EQU     *
720     ;                                                                       02040009
721     .MFFLE      SET     1
722                 JSR     .FFLE
723                 .BYTE   0
724                 .WORD   GASGRV01,.C000087
725                 ASL     A
726                 BCS     *+5
727                 JMP     .L000088
728     ; C     METHANE GASGRV DEFAULT=0.554                                    02050032
729     .MFLTASG    SET     1
730                 JSR     .FLTASGN
731                 .BYTE   0
732                 .WORD   .C000089
733                 .WORD   GASGRV01
734     .L000088    EQU     *
735     ;                                                                       02060009
736     .MFFLE      SET     1
737                 JSR     .FFLE
738                 .BYTE   0
739                 .WORD   OILGRV01,.C000090
740                 ASL     A
741                 BCS     *+5
742                 JMP     .L000091
743     ; C     ISOTHERMAL DEFAULT FOR GASMIX=0.                                02070041
744     .MFLTASG    SET     1
745                 JSR     .FLTASGN
746                 .BYTE   0
747                 .WORD   .C000092
748                 .WORD   OILGRV01
749     .L000091    EQU     *
750     ;       IF(GASMIX.LE.0.0)GASMIX=0.0                                     02080041
751     .MFFLE      SET     1
752                 JSR     .FFLE
753                 .BYTE   0
754                 .WORD   GASMIX01,.C000093
755                 ASL     A
756                 BCS     *+5
757                 JMP     .L000094
758     .MFLTASG    SET     1
759                 JSR     .FLTASGN
760                 .BYTE   0
761                 .WORD   .C000095
762                 .WORD   GASMIX01
763     .L000094    EQU     *
764     ;       IF(GASMIX.GT.1.0)GASMIX=1.0                                     02090041
765     .MFFGT      SET     1
766                 JSR     .FFGT
767                 .BYTE   0
768                 .WORD   GASMIX01,.C000096
769                 ASL     A
770                 BCS     *+5
771                 JMP     .L000097
772     .MFLTASG    SET     1
773                 JSR     .FLTASGN
774                 .BYTE   0
775                 .WORD   .C000098
776                 .WORD   GASMIX01
777     .L000097    EQU     *
778     ;       NP=6                                                            30030
779     ; C     WRITE(NOUT,10)TGRAD,FGRAD,KBRINE,RHOBRN,TOL,NBUG,TO,CO           10026
780     ; C     10 FORMAT(/5X,' PARAMETERS: '/5X,' TGRAD(DEG.F/KILOFT)=',F 10.3, 20000
781     ; C     * FGRAD(KPSI/KILOFT-FLUID GRADIENT)=',F10.4,'   KBRINE(KB)=',F10 10032
782     ; C     */6X,'LIQUID DENSITY=',F10.5,' TOL= ',F10.6,                    10032
783     ; C     *' NBUG(DEBUG FLAG)=',I5,' TO(DEG.F)=',F7.2,' CO=',F7.4 //)     30032
784     ; C     WRITE(NOUT,11)NSG,NSO,GASGRV,OILGRV,OVGRAD,OILSAT,GASMIX        60041
785     ; C     11 FORMAT(/5X,' ADDITIONAL PARAMETERS: '/5X,' NSG=',I3,' NSO=',I3 70012
786     ; C     *' GASGRAVITY=',F10.3,'  OILGRAVITY=',F10.3,'   OVGRAD(PSI/FT)=' 30032
787     ; C     *,F10.3,'  OILSAT=',F8.4,'  GASMIX=',F8.4 //)                   90041
```

```
788            LDA    #0
789            STA    NP|||101
790            LDA    #6
791            STA    NP|||101+1                                    02200000
792    ;       NOBS=0                                                02210003
793    ; C     *  *  *                                               02220000
794    ; C     READ INPUT CARDS                                      02230003
795    ; C     *  *  **
796            LDA    #0
797            STA    NOBS||01
798            LDA    #0
799            STA    NOBS||01+1                                    02240000
800    ;       DO 50 J=1,200
801            LDA    #0
802            STA    J||||101
803            LDA    #1
804            STA    J||||101+1                                    02250027
805    ; C     READ(NIN,20)V,BLK,POROS,DEP,T,MIN,LTH,SONIC,SMP,CL
806            JMP    .L000102
807    .L000099 EQU   *
808            LDA    J||||101+1
809            CLC
810            ADC    #1
811            STA    J||||101+1
812            LDA    J||||101
813            ADC    #0
814            STA    J||||101
815            LDA    #200
816            CMP    J||||101+1
817            LDA    #0
818            SBC    J||||101
819            BMI    .L000100
820    .L000102 EQU   *
821    ;       IF(V .EQ.0.0 .OR.BLK.EQ.0.0)GO TO 75                  02260000
822    .MFFEQ  SET    1
823            JSR    .FFEQ
824            .BYTE  0
825            .WORD  BLK|||101,.C000106
826            STA    .T000005
827    .MFFEQ  SET    1
828            JSR    .FFEQ
829            .BYTE  0
830            .WORD  V||||101,.C000105
831            ORA    .T000005
832            ASL    A
833            BCS    *+5
834            JMP    .L000107
835            JMP    .L000108
836    .L000107 EQU   *
837    ; C     END FLAG CARD                                         02270000
838    ;       SONIK=SONIC                                           02280000
839    .MFLTASG SET   1
840            JSR    .FLTASGN
841            .BYTE  0
842            .WORD  SONIC|01
843            .WORD  SONIK|01
844    ;       IF(SONIK.NE.0.0)V=1.0E6/V                             02290000
845    .MFFNE  SET    1
846            JSR    .FFNE
847            .BYTE  0
848            .WORD  SONIK|01,.C000109
849            ASL    A
850            BCS    *+5
851            JMP    .L000110
852    ; C     CONVERT DELTA T (SONIC LOG MICSEC/FT) TO FT.SEC.      02300000
853    ; C     20 FORMAT(5F10.0,2I3,F10.0,4X,A8,A2)                  02310003
854    .MFFDIV SET    1
855            JSR    .FFDIV
856            .BYTE  0
857            .WORD  .C000111,V||||101
858            .WORD  V||||101
859    .L000110 EQU   *
860    ;                                                             02320000
861            LDA    J||||101+1
862            ASL    A
863            ASL    A
864            CLC
865            ADC    #(VP|||101-4) MOD .M
```

```
866              STA     .T000005
867              LDA     #0
868              ADC     #(VPIIII01-4)/256
869              STA     .T000005+1
870   .MFLTASG SET    1
871              JSR     .FLTASGN
872              .BYTE 0
873              .WORD VIIII101
874              .WORD -.T000005
875   ;        BULKD(J)=BLK                                              02330000
876              LDA     JIIII101+1
877              ASL     A
878              ASL     A
879              CLC
880              ADC     #(BULKDI01-4) MOD .M
881              STA     .T000005
882              LDA     #0
883              ADC     #(BULKDI01-4)/256
884              STA     .T000005+1
885   .MFLTASG SET    1
886              JSR     .FLTASGN
887              .BYTE 0
888              .WORD BLKIII01
889              .WORD -.T000005
890   ;        POR(J)=POROS/100.                                         02340000
891              LDA     JIIII101+1
892              ASL     A
893              ASL     A
894              CLC
895              ADC     #(PORIII01-4) MOD .M
896              STA     .T000051
897              LDA     #0
898              ADC     #(PORIII01-4)/256
899              STA     .T000051+1
900   .MFFDIV  SET    1
901              JSR     .FFDIV
902              .BYTE 0
903              .WORD POROSI01,.C000112
904              .WORD -.T000051
905   ;        FTEMP(J)=T                                                02350000
906              LDA     JIIII101+1
907              ASL     A
908              ASL     A
909              CLC
910              ADC     #(FTEMPI01-4) MOD .M
911              STA     .T000005
912              LDA     #0
913              ADC     #(FTEMPI01-4)/256
914              STA     .T000005+1
915   .MFLTASG SET    1
916              JSR     .FLTASGN
917              .BYTE 0
918              .WORD TIIII101
919              .WORD -.T000005
920   ;        MINR(J)=MIN                                               02360000
921              LDA     JIIII101+1
922              ASL     A
923              STA     .T000004
924              LDA     MINIII01
925              LDX     .T000004
926              STA     MINRII01-2,X
927              LDA     MINIII01+1
928              STA     MINRII01-1,X
929   ;                                                                  02370003
930              LDA     #0
931              CMP     LTHIII01+1
932              LDA     #0
933              SBC     LTHIII01
934              BMI     .L000113
935              LDA     #0
936              STA     LTHIII01
937              LDA     #1
938              STA     LTHIII01+1
939   .L000113 EQU    *
940   ;                                                                  02380003
941              LDA     #3
942              CMP     LTHIII01+1
943              LDA     #0
944              SBC     LTHIII01
```

```
945             BMI     .L000116
946             JMP     .L000115
947    .L000116 EQU     *
948             LDA     #0
949             STA     LTH11101
950             LDA     #3
951             STA     LTH11101+1
952    .L000115 EQU     *
953    ;        LITH(J)=LTH
954             LDA     J11111101+1
955             ASL     A
956             STA     .T000004
957             LDA     LTH11101
958             LDX     .T000004
959             STA     LITH1101-2,X
960             LDA     LTH11101+1
961             STA     LITH1101-1,X
962    ;
963    .MFFEQ   SET     1
964             JSR     .FFEQ
965             .BYTE   0
966             .WORD   KMDEF101,.C000117
967             STA     .T000005
968             LDA     LTH11101+1
969             CMP     #1
970             BNE     .L000118
971             LDA     LTH11101
972             CMP     #0
973             BNE     .L000118
974    .L000119 LDA     #80H
975             BNE     *+4
976    .L000118 LDA     #0
977             AND     .T000005
978             ASL     A
979             BCS     *+5
980             JMP     .L000120
981    .MFLTASG SET     1
982             JSR     .FLTASGN
983             .BYTE   0
984             .WORD   .C000121
985             .WORD   KMDEF101
986    .L000120 EQU     *
987    ;
988    .MFFEQ   SET     1
989             JSR     .FFFQ
990             .BYTE   0
991             .WORD   GMDEF101,.C000122
992             STA     .T000005
993             LDA     LTH11101+1
994             CMP     #1
995             BNE     .L000123
996             LDA     LTH11101
997             CMP     #0
998             BNE     .L000123
999    .L000124 LDA     #80H
1000            BNE     *+4
1001   .L000123 LDA     #0
1002            AND     .T000005
1003            ASL     A
1004            BCS     *+5
1005            JMP     .L000125
1006   .MFLTASG SET     1
1007            JSR     .FLTASGN
1008            .BYTE   0
1009            .WORD   .C000126
1010            .WORD   GMDEF101
1011   .L000125 EQU     *
1012   ;
1013   .MFFEQ   SET     1
1014            JSR     .FFEQ
1015            .BYTE   0
1016            .WORD   KMDEF101,.C000127
1017            STA     .T000005
1018            LDA     LTH11101+1
1019            CMP     #2
1020            BNE     .L000128
1021            LDA     LTH11101
1022            CMP     #0
1023            BNE     .L000128
1024   .L000129 LDA     #80H
```

```
1025              BNE     *+4
1026   .L000128  LDA     #0
1027              AND     .T000005
1028              ASL     A
1029              BCS     *+5
1030              JMP     .L000130
1031   .MFLTASG  SET     1
1032              JSR     .FLTASGN
1033              .BYTE   0
1034              .WORD   .C000131
1035              .WORD   KMDEF101
1036   .L000130  EQU     *
1037   ;                                                                      02430050
1038   .MFFEQ    SET     1
1039              JSR     .FFEQ
1040              .BYTE   0
1041              .WORD   GMDEF101,.C000132
1042              STA     .T000005
1043              LDA     LTHI1101+1
1044              CMP     #2
1045              BNE     .L000133
1046              LDA     LTHI1101
1047              CMP     #0
1048              BNE     .L000133
1049   .L000134  LDA     #80H
1050              BNE     *+4
1051   .L000133  LDA     #0
1052              AND     .T000005
1053              ASL     A
1054              BCS     *+5
1055              JMP     .L000135
1056   .MFLTASG  SET     1
1057              JSR     .FLTASGN
1058              .BYTE   0
1059              .WORD   .C000136
1060              .WORD   GMDEF101
1061   .L000135  EQU     *
1062   ;                                                                      02440050
1063   .MFFEQ    SET     1
1064              JSR     .FFEQ
1065              .BYTE   0
1066              .WORD   KMDEF101,.C000137
1067              STA     .T000005
1068              LDA     LTHI1101+1
1069              CMP     #3
1070              BNE     .L000138
1071              LDA     LTHI1101
1072              CMP     #0
1073              BNE     .L000138
1074   .L000139  LDA     #80H
1075              BNE     *+4
1076   .L000138  LDA     #0
1077              AND     .T000005
1078              ASL     A
1079              BCS     *+5
1080              JMP     .L000140
1081   .MFLTASG  SET     1
1082              JSR     .FLTASGN
1083              .BYTE   0
1084              .WORD   .C000141
1085              .WORD   KMDEF101
1086   .L000140  EQU     *
1087   ;                                                                      02450050
1088   .MFFEQ    SET     1
1089              JSR     .FFEQ
1090              .BYTE   0
1091              .WORD   GMDEF101,.C000142
1092              STA     .T000005
1093              LDA     LTHI1101+1
1094              CMP     #3
1095              BNE     .L000143
1096              LDA     LTHI1101
1097              CMP     #0
1098              BNE     .L000143
1099   .L000144  LDA     #80H
1100              BNE     *+4
1101   .L000143  LDA     #0
1102              AND     .T000005
1103              ASL     A
```

```
1104            BCS     *+5
1105            JMP     .L000145
1106   .MFLTASG SET     1
1107            JSR     .FLTASGN
1108            .BYTE   0
1109            .WORD   .C000146
1110            .WORD   GMDEFI01
1111   .L000145 EQU     *
1112   !        SAMP(J)=SMP                                      02460000
1113            LDA     J11111101+1
1114            ASL     A
1115            ASL     A
1116            ASL     A
1117            CLC
1118            ADC     #(SAMP1101-8) MOD .M
1119            STA     .T000005
1120            LDA     #0
1121            ADC     #(SAMP1101-8)/256
1122            STA     .T000005+1
1123   .MFLTASG SET     1
1124            JSR     .FLTASGN
1125            .BYTE   0
1126            .WORD   SMP11101
1127            .WORD   -.T000005
1128   !        COL(J)=CL                                        02470000
1129            LDA     J11111101+1
1130            ASL     A
1131            ASL     A
1132            CLC
1133            ADC     #(COL11101-4) MOD .M
1134            STA     .T000005
1135            LDA     #0
1136            ADC     #(COL11101-4)/256
1137            STA     .T000005+1
1138   .MFLTASG SET     1
1139            JSR     .FLTASGN
1140            .BYTE   0
1141            .WORD   CL11101
1142            .WORD   -.T000005
1143   !        IF(DEP.GT.30.0)DEP=DEP/1000.0                    02480000
1144   .MFFGT   SET     1
1145            JSR     .FFGT
1146            .BYTE   0
1147            .WORD   DEP11101,.C000147
1148            ASL     A
1149            BCS     *+5
1150            JMP     .L000148
1151   .MFFDIV  SET     1
1152            JSR     .FFDIV
1153            .BYTE   0
1154            .WORD   DEP11101,.C000149
1155            .WORD   DEP11101
1156   .L000148 EQU     *
1157   !        DEPTH(J)=DEP                                     02490000
1158            LDA     J11111101+1
1159            ASL     A
1160            ASL     A
1161            CLC
1162            ADC     #(DEPTH101-4) MOD .M
1163            STA     .T000005
1164            LDA     #0
1165            ADC     #(DEPTH101-4)/256
1166            STA     .T000005+1
1167   .MFLTASG SET     1
1168            JSR     .FLTASGN
1169            .BYTE   0
1170            .WORD   DEP11101
1171            .WORD   -.T000005
1172   !        IF(MIN.LE.0)GO TO 35                             02500000
1173            LDA     #0
1174            CMP     MIN11101+1
1175            LDA     #0
1176            SBC     MIN11101
1177            BMI     .L000150
1178            JMP     .L000152
1179   .L000150 EQU     *
1180   ! C      READ MINERALS CARD SINCE MIN >0.                 02510000
1181   ! C      READ(NIN,22)(X(L),L=1,13)                        02520027
1182   ! C  22 FORMAT(13F5.0)                                    02530000
1183   !        SUM=0.0                                          02540000
```

```
1184        .MFLTASG SET    1
1185                 JSR    .FLTASGN
1186                 .BYTE  0
1187                 .WORD  .C000153
1188                 .WORD  SUM11101
1189        ;        DO 25 L=1,13                              02550000
1190                 LDA    #0
1191                 STA    L1111101
1192                 LDA    #1
1193                 STA    L1111101+1
1194                 JMP    .L000156
1195        .L000154 EQU    *
1196                 LDA    L1111101+1
1197                 CLC
1198                 ADC    #1
1199                 STA    L1111101+1
1200                 LDA    L1111101
1201                 ADC    #0
1202                 STA    L1111101
1203                 LDA    #13
1204                 CMP    L1111101+1
1205                 LDA    #0
1206                 SBC    L1111101
1207                 BMI    .L000155
1208        .L000156 EQU    *
1209        ;        X(L)=X(L)/100.0                           02560000
1210                 LDA    L1111101+1
1211                 ASL    A
1212                 ASL    A
1213                 CLC
1214                 ADC    #(X1111101-4) MOD .M
1215                 STA    .T000005
1216                 LDA    #0
1217                 ADC    #(X1111101-4)/256
1218                 STA    .T000005+1
1219                 LDA    L1111101+1
1220                 ASL    A
1221                 ASL    A
1222                 CLC
1223                 ADC    #(X1111101-4) MOD .M
1224                 STA    .T000051
1225                 LDA    #0
1226                 ADC    #(X1111101-4)/256
1227                 STA    .T000051+1
1228        .MFFDIV  SET    1
1229                 JSR    .FFDIV
1230                 .BYTE  0
1231                 .WORD  -.T000005,.C000159
1232                 .WORD  -.T000051
1233        ;        SUM=SUM+X(L)                              02570000
1234                 LDA    L1111101+1
1235                 ASL    A
1236                 ASL    A
1237                 CLC
1238                 ADC    #(X1111101-4) MOD .M
1239                 STA    .T000004
1240                 LDA    #0
1241                 ADC    #(X1111101-4)/256
1242                 STA    .T000004+1
1243        .MFFADD  SET    1
1244                 JSR    .FFADD
1245                 .BYTE  0
1246                 .WORD  SUM11101,-.T000004
1247                 .WORD  SUM11101
1248        ;     25 CONTINUE                                  02580000
1249        .L000158 EQU    *
1250                 JMP    .L000154
1251        .L000155 EQU    *
1252        ;        IF(SUM.LE.0.0)MIN=0                       02590000
1253        .MFFLE   SET    1
1254                 JSR    .FFLE
1255                 .BYTE  0
1256                 .WORD  SUM11101,.C000160
1257                 ASL    A
1258                 BCS    *+5
1259                 JMP    .L000161
1260                 LDA    #0
1261                 STA    MIN11101
1262                 LDA    #0
1263                 STA    MIN11101+1
```

```
1264        .L000161 EQU     *
1265        ;        IF(MIN.LE.0)GO TO 35                              02600000
1266                 LDA     #0
1267                 CMP     MIN11101+1
1268                 LDA     #0
1269                 SBC     MIN11101
1270                 BMI     .L000162
1271                 JMP     .L000152
1272        .L000162 EQU     *
1273        ;        DO 26 L=1,13                                      02610000
1274                 LDA     #0
1275                 STA     L11111101
1276                 LDA     #1
1277                 STA     L11111101+1
1278                 JMP     .L000166
1279        .L000164 EQU     *
1280                 LDA     L11111101+1
1281                 CLC
1282                 ADC     #1
1283                 STA     L11111101+1
1284                 LDA     L11111101
1285                 ADC     #0
1286                 STA     L11111101
1287                 LDA     #13
1288                 CMP     L11111101+1
1289                 LDA     #0
1290                 SBC     L11111101
1291                 BMI     .L000165
1292        .L000166 EQU     *
1293        ;     26 X(L)= X(L)/SUM                                    02620000
1294        .L000168 EQU     *
1295                 LDA     L11111101+1
1296                 ASL     A
1297                 ASL     A
1298                 CLC
1299                 ADC     #(X11111101-4) MOD .M
1300                 STA     .T000005
1301                 LDA     #0
1302                 ADC     #(X11111101-4)/256
1303                 STA     .T000005+1
1304                 LDA     L11111101+1
1305                 ASL     A
1306                 ASL     A
1307                 CLC
1308                 ADC     #(X11111101-4) MOD .M
1309                 STA     .T000051
1310                 LDA     #0
1311                 ADC     #(X11111101-4)/256
1312                 STA     .T000051+1
1313        .FFDIV   SET     1
1314                 JSR     .FFDIV
1315                 .BYTE   0
1316                 .WORD   -.T000005,SUM11101
1317                 .WORD   -.T000051
1318                 JMP     .L000164
1319        .L000165 EQU     *
1320        ;        RHOM(J)=0.0                                       02630000
1321                 LDA     J11111101+1
1322                 ASL     A
1323                 ASL     A
1324                 CLC
1325                 ADC     #(RHOM11101-4) MOD .M
1326                 STA     .T000005
1327                 LDA     #0
1328                 ADC     #(RHOM11101-4)/256
1329                 STA     .T000005+1
1330        .MFLTASG SET     1
1331                 JSR     .FLTASGN
1332                 .BYTE   0
1333                 .WORD   .C000169
1334                 .WORD   -.T000005
1335        ;        DO 29 L=1,13                                      02640000
1336                 LDA     #0
1337                 STA     L11111101
1338                 LDA     #1
1339                 STA     L11111101+1
1340                 JMP     .L000172
1341        .L000173 EQU     *
1342                 LDA     L11111101+1
```

```
1343            CLC
1344            ADC     #1
1345            STA     L111101+1
1346            LDA     L111101
1347            ADC     #0
1348            STA     L111101
1349            LDA     #13
1350            CMP     L111101+1
1351            LDA     #0
1352            SBC     L111101
1353            BMI     .L000171
1354   .L000172 EQU     *
1355   ;    29 RHOM(J)=RHOM(J)+ X(L)*RHO(L)                            02650000
1356   .L000174 EQU     *
1357            LDA     L111101+1
1358            ASL     A
1359            ASL     A
1360            CLC
1361            ADC     #(RHO11101-4) MOD .M
1362            STA     .T000004
1363            LDA     #0
1364            ADC     #(RHO11101-4)/256
1365            STA     .T000004+1
1366            LDA     L111101+1
1367            ASL     A
1368            ASL     A
1369            CLC
1370            ADC     #(X111101-4) MOD .M
1371            STA     .T000005
1372            LDA     #0
1373            ADC     #(X111101-4)/256
1374            STA     .T000005+1
1375   .MFFMUL  SET     1
1376            JSR     .FFMUL
1377            .BYTE   0
1378            .WORD   -.T000005,-.T000004
1379            .WORD   .T000081
1380            LDA     J111101+1
1381            ASL     A
1382            ASL     A
1383            CLC
1384            ADC     #(RHOM1101-4) MOD .M
1385            STA     .T000005
1386            LDA     #0
1387            ADC     #(RHOM1101-4)/256
1388            STA     .T000005+1
1389            LDA     J111101+1
1390            ASL     A
1391            ASL     A
1392            CLC
1393            ADC     #(RHOM1101-4) MOD .M
1394            STA     .T000051
1395            LDA     #0
1396            ADC     #(RHOM1101-4)/256
1397            STA     .T000051+1
1398   .MFFADD  SET     1
1399            JSR     .FFADD
1400            .BYTE   0
1401            .WORD   -.T000005,.T000081
1402            .WORD   -.T000051
1403            JMP     .L000170
1404   .L000171 EQU     *
1405   ;        KV=0.0                                                 02660000
1406   .MFLTASG SET     1
1407            JSR     .FLTASGN
1408            .BYTE   0
1409            .WORD   .C000176
1410            .WORD   KV111101
1411   ;        KR=0.0                                                 02670000
1412   .MFLTASG SET     1
1413            JSR     .FLTASGN
1414            .BYTE   0
1415            .WORD   .C000177
1416            .WORD   KR111101
1417   ;        GV=0.0                                                 02680000
1418   .MFLTASG SET     1
1419            JSR     .FLTASGN
1420            .BYTE   0
1421            .WORD   .C000178
1422            .WORD   GV111101
```

```
1423  ;         GR=0.0                              02690000
1424  .MFLTASG SET   1
1425          JSR   .FLTASGN
1426          .BYTE 0
1427          .WORD .C000179
1428          .WORD GR111101
1429  ;         DO 30 L=1,13                        02700000
1430          LDA   #0
1431          STA   L111101
1432          LDA   #1
1433          STA   L111101+1
1434          JMP   .L000182
1435  .L000180 EQU  *
1436          LDA   L111101+1
1437          CLC
1438          ADC   #1
1439          STA   L111101+1
1440          LDA   L111101
1441          ADC   #0
1442          STA   L111101
1443          LDA   #13
1444          CMP   L111101+1
1445          LDA   #0
1446          SBC   L111101
1447          BMI   .L000181
1448  .L000182 EQU  *
1449  ;                                             02710000
1450          LDA   L111101+1
1451          ASL   A
1452          ASL   A
1453          CLC
1454          ADC   #(K111101-4) MOD .M
1455          STA   .T000004
1456          LDA   #0
1457          ADC   #(K111101-4)/256
1458          STA   .T000004+1
1459          LDA   L111101+1
1460          ASL   A
1461          ASL   A
1462          CLC
1463          ADC   #(X111101-4) MOD .M
1464          STA   .T000005
1465          LDA   #0
1466          ADC   #(X111101-4)/256
1467          STA   .T000005+1
1468  .MFFMUL SET    1
1469          JSR   .FFMUL
1470          .BYTE 0
1471          .WORD -.T000005,-.T000004
1472          .WORD .T000081
1473  .MFFADD SET    1
1474          JSR   .FFADD
1475          .BYTE 0
1476          .WORD KV111101,.T000081
1477          .WORD KV111101
1478  ;                                             02720000
1479          LDA   L111101+1
1480          ASL   A
1481          ASL   A
1482          CLC
1483          ADC   #(K111101-4) MOD .M
1484          STA   .T000004
1485          LDA   #0
1486          ADC   #(K111101-4)/256
1487          STA   .T000004+1
1488          LDA   L111101+1
1489          ASL   A
1490          ASL   A
1491          CLC
1492          ADC   #(X111101-4) MOD .M
1493          STA   .T000005
1494          LDA   #0
1495          ADC   #(X111101-4)/256
1496          STA   .T000005+1
1497  .MFFDIV SET    1
1498          JSR   .FFDIV
1499          .BYTE 0
1500          .WORD -.T000005,-.T000004
1501          .WORD .T000081
1502  .MFFADD SET    1
```

```
1503            JSR     .FFADD
1504            .BYTE   0
1505            .WORD   KR111101,.T000081
1506            .WORD   KR111101
1507    ;                                                                       02730000
1508            LDA     L111101+1
1509            ASL     A
1510            ASL     A
1511            CLC
1512            ADC     #(G111101-4) MOD .M
1513            STA     .T000004
1514            LDA     #0
1515            ADC     #(G111101-4)/256
1516            STA     .T000004+1
1517            LDA     L111101+1
1518            ASL     A
1519            ASL     A
1520            CLC
1521            ADC     #(X111101-4) MOD .M
1522            STA     .T000005
1523            LDA     #0
1524            ADC     #(X111101-4)/256
1525            STA     .T000005+1
1526    .MFFMUL SET     1
1527            JSR     .FFMUL
1528            .BYTE   0
1529            .WORD   -.T000005,-.T000004
1530            .WORD   .T000081
1531    .MFFADD SET     1
1532            JSR     .FFADD
1533            .BYTE   0
1534            .WORD   GV111101,.T000081
1535            .WORD   GV111101
1536    ;                                                                       02740000
1537            LDA     L111101+1
1538            ASL     A
1539            ASL     A
1540            CLC
1541            ADC     #(G111101-4) MOD .M
1542            STA     .T000004
1543            LDA     #0
1544            ADC     #(G111101-4)/256
1545            STA     .T000004+1
1546            LDA     L111101+1
1547            ASL     A
1548            ASL     A
1549            CLC
1550            ADC     #(X111101-4) MOD .M
1551            STA     .T000005
1552            LDA     #0
1553            ADC     #(X111101-4)/256
1554            STA     .T000005+1
1555    .MFFDIV SET     1
1556            JSR     .FFDIV
1557            .BYTE   0
1558            .WORD   -.T000005,-.T000004
1559            .WORD   .T000081
1560    .MFFADD SET     1
1561            JSR     .FFADD
1562            .BYTE   0
1563            .WORD   GR111101,.T000081
1564            .WORD   GR111101
1565    ;       30 CONTINUE                                                     02750000
1566    .L000184 EQU    *
1567            JMP     .L000160
1568    .L000181 EQU    *
1569    ;                                                                       02760000
1570    .MFFDIV SET     1
1571            JSR     .FFDIV
1572            .BYTE   0
1573            .WORD   .C000185,GR111101
1574            .WORD   GR111101
1575    ;                                                                       02770000
1576    ;                                                                       02780000
1577    .MFFDIV SET     1
1578            JSR     .FFDIV
1579            .BYTE   0
1580            .WORD   .C000186,KR111101
1581            .WORD   KR111101
1582    ;       KM(J)=(KV+KR)/2.0                                               02790000
```

```
1583        .MFFADD   SET    1
1584                  JSR    .FFADD
1585                  .BYTE  0
1586                  .WORD  KVIIII01,KRIIII01
1587                  .WORD  .T000081
1588                  LDA    JIIII101+1
1589                  ASL    A
1590                  ASL    A
1591                  CLC
1592                  ADC    #(KMIIII01-4) MOD .M
1593                  STA    .T000051
1594                  LDA    #0
1595                  ADC    #(KMIIII01-4)/256
1596                  STA    .T000051+1
1597        .MFFDIV   SET    1
1598                  JSR    .FFDIV
1599                  .BYTE  0
1600                  .WORD  .T000081,.C000187
1601                  .WORD  -.T000051
1602        ;                                                02800000
1603        .MFFADD   SET    1
1604                  JSR    .FFADD
1605                  .BYTE  0
1606                  .WORD  GVIIII01,GRIIII01
1607                  .WORD  .T000081
1608                  LDA    JIIII101+1
1609                  ASL    A
1610                  ASL    A
1611                  CLC
1612                  ADC    #(GMIIII01-4) MOD .M
1613                  STA    .T000051
1614                  LDA    #0
1615                  ADC    #(GMIIII01-4)/256
1616                  STA    .T000051+1
1617        .MFFDIV   SET    1
1618                  JSR    .FFDIV
1619                  .BYTE  0
1620                  .WORD  .T000081,.C000188
1621                  .WORD  -.T000051
1622        ;         GO TO 40                               02810000
1623                  JMP    .L000189
1624        ; C       DEFAULTS:                              02820000
1625        ;     35  KM(J)=KMDEF                            02830000
1626        .L000152  EQU    *
1627                  LDA    JIIII101+1
1628                  ASL    A
1629                  ASL    A
1630                  CLC
1631                  ADC    #(KMIIII01-4) MOD .M
1632                  STA    .T000005
1633                  LDA    #0
1634                  ADC    #(KMIIII01-4)/256
1635                  STA    .T000005+1
1636        .MFLTASG  SET    1
1637                  JSR    .FLTASGN
1638                  .BYTE  0
1639                  .WORD  KMDEF101
1640                  .WORD  -.T000005
1641        ;         GM(J)=GMDEF                            02840000
1642                  LDA    JIIII101+1
1643                  ASL    A
1644                  ASL    A
1645                  CLC
1646                  ADC    #(GMIIII01-4) MOD .M
1647                  STA    .T000005
1648                  LDA    #0
1649                  ADC    #(GMIIII01-4)/256
1650                  STA    .T000005+1
1651        .MFLTASG  SET    1
1652                  JSR    .FLTASGN
1653                  .BYTE  0
1654                  .WORD  GMDEF101
1655                  .WORD  -.T000005
1656        ;     40  NOBS=J                                 02850000
1657        .L000189  EQU    *
1658                  LDA    JIIII101
1659                  STA    NOBS1101
1660                  LDA    JIIII101+1
1661                  STA    NOBS1101+1
1662        ;     50  CONTINUE                               02860000
1663        .L000104  EQU    *
```

```
1604              JMP     .L000099
1605   .L000100 EQU      *
1606   ; C   75 WRITE(NOUT,80)NOBS                                              02870026
1607   ; C   80 FORMAT(/5X,'    NO. OF OBSERVATIONS=',I6 //)                    02880000
                                                                                02890003
1608   ; C           * * *                                                      02900000
1609   ; C      MAIN COMPUTE LOOP :                                             02910003
1610   ; C*  * *                                                                02910003
1611   ;         DO 200 J=1,NOBS                                                02920000
1672             LDA     #0
1673             STA     J11111101
1674             LDA     #1
1675             STA     J11111101+1
1676   ; C      WRITE(NOUT,110)J,SAMP(J),COL(J)                                 02930026
1677   ; C  110 FORMAT(/5X,'       PROBLEM NO. J=',I5,9X,'SAMPLE  NO.=',A8,A2   02940000
1678             JMP     .L000192
1679   .L000190 EQU      *
1680             LDA     J11111101+1
1681             CLC
1682             ADC     #1
1683             STA     J11111101+1
1684             LDA     J11111101
1685             ADC     #0
1686             STA     J11111101
1687             LDA     NOBS11101+1
1688             CMP     J11111101+1
1689             LDA     NOBS11101
1690             SBC     J11111101
1691             BMI     .L000191
1692   .L000192 EQU      *
1693   ;         MIN=MINR(J)                                                    02950000
1694             LDA     J11111101+1
1695             ASL     A
1696             TAX
1697             LDA     MINR11101-2,X
1698             STA     MIN11101
1699             LDA     MINR11101-1,X
1700             STA     MIN11101+1
1701   ;         LTH=LITH(J)                                                    02960003
1702   ; C      IF(LTH.EQ.1)WRITE(NOUT,351)LTH                                  02970026
1703   ; C      IF(LTH.EQ.2)WRITE(NOUT,352)LTH                                  02980026
1704   ; C      IF(LTH.EQ.3)WRITE(NOUT,353)LTH                                  02990026
1705   ; C  351 FORMAT(/5X,'  SANDSTONE, LTH=',I2 /)                            03000013
1706   ; C  352 FORMAT(/5X,'  LIMESTONE, LTH=',I2 /)                            03010013
1707   ; C  353 FORMAT(/5X,'  DOLOSTONE, LTH=',I2 /)                            03020013
1708             LDA     J11111101+1
1709             ASL     A
1710             TAX
1711             LDA     LITH11101-2,X
1712             STA     LTH11101
1713             LDA     LITH11101-1,X
1714             STA     LTH11101+1
1715   ;         PCT=POR(J)*100.
1716   ; C      WRITE(NOUT,113)VP(J),BULKD(J),DEPTH(J),KM(J),GM(J),MIN,PCT,SONI
1717   ; C  113 FORMAT(/5X,'BRINE SATURATED INPUTS:'/5X,'  VP=',F10.1,' BULK DE
1718   ; C     *TY=',F10.5,'   DEPTH(KFT)=',F10.2,'  KM=',F6.1,'  GM=',F6.1,
1719   ; C     *'  MIN=',I3,/5X,'POROSITY(%)=',F6.2,'  SONIC=',F5.1 //)
1720   ; CC     IF(MIN.GT.0)WRITE(NOUT,307)(X(JL),JL=1,13),SAMP(J),COL(J)
1721   ; C  307 FORMAT(/5X,' MINERAL CARD X(I),I=1,13 '/5X,13F7.2,10X,A8,A2 //)
1722   ; C      POROSITY=0 ERROR.
1723   ; C      IF(PCT.LE.0)WRITE(NOUT,301)
1724   ; C  301 FORMAT(/5X,'    POROSITY=0, PROBLEM UNTENABLE' //)
1725             LDA     J11111101+1
1726             ASL     A
1727             ASL     A
1728             CLC
1729             ADC     #(POR11101-4) MOD ,M
1730             STA     .T000005
1731             LDA     #0
1732             ADC     #(POR11101-4)/256
1733             STA     .T000005+1
1734   .HFFMUL  SET     1
1735             JSR     .FFMUL
1736             .BYTE   0
1737             .WORD   -.T000005,.C000195
1738             .WORD   PCT11101
1739   ;         IF(PCT.LE.0.0)GO TO 200                                        03130000
1740   .HFFLE   SET     1
1741             JSR     .FFLE
1742             .BYTE   0
```

```
1743              .WORD  PCT11101,.C000196
1744              ASL    A
1745              BCS    *+5
1746              JMP    .L000197
1747              JMP    .L000198
1748   .L000197 EQU    *
1749   ;             IF(MIN.LE.0)GO TO 112                              03140000
1750              LDA    #0
1751              CMP    MIN11101+1
1752              LDA    #0
1753              SBC    MIN11101
1754              BMI    .L000198
1755              JMP    .L000200
1756   .L000198 EQU    *
1757   ;                                                                03150005
1758              LDA    J111101+1
1759              ASL    A
1760              ASL    A
1761              CLC
1762              ADC    #(POR11101-4) MOD .M
1763              STA    .T000004
1764              LDA    #0
1765              ADC    #(POR11101-4)/256
1766              STA    .T000004+1
1767   .MFFSUB   SET    1
1768              JSR    .FFSUB
1769              .BYTE  0
1770              .WORD  .C000201,-.T000004
1771              .WORD  .T000175
1772              LDA    J111101+1
1773              ASL    A
1774              ASL    A
1775              CLC
1776              ADC    #(RHOM1101-4) MOD .M
1777              STA    .T000004
1778              LDA    #0
1779              ADC    #(RHOM1101-4)/256
1780              STA    .T000004+1
1781   .MFFMUL   SET    1
1782              JSR    .FFMUL
1783              .BYTE  0
1784              .WORD  .T000175,-.T000004
1785              .WORD  .T000202
1786              LDA    J111101+1
1787              ASL    A
1788              ASL    A
1789              CLC
1790              ADC    #(POR11101-4) MOD .M
1791              STA    .T000005
1792              LDA    #0
1793              ADC    #(POR11101-4)/256
1794              STA    .T000005+1
1795   .MFFMUL   SET    1
1796              JSR    .FFMUL
1797              .BYTE  0
1798              .WORD  -.T000005,RHOBRN01
1799              .WORD  .T000081
1800   .MFFADD   SET    1
1801              JSR    .FFADD
1802              .BYTE  0
1803              .WORD  .T000081,.T000202
1804              .WORD  RHOBC101
1805   ;             U=BULKD(J)-RHOBC                                   03160000
1806              LDA    J111101+1
1807              ASL    A
1808              ASL    A
1809              CLC
1810              ADC    #(BULKD101-4) MOD .M
1811              STA    .T000005
1812              LDA    #0
1813              ADC    #(BULKD101-4)/256
1814              STA    .T000005+1
1815   .MFFSUB   SET    1
1816              JSR    .FFSUB
1817              .BYTE  0
1818              .WORD  -.T000005,RHOBC101
1819              .WORD  U111101
1820   ;             U=ABS(U)                                           03170000
1821              LDA    #U111101 MOD .M
1822              STA    ABS.0001
```

```
1823            LDA     #U1111101/256
1824            STA     ABS.0001+1
1825            LDA     #.T000081 MOD .M
1826            STA     ABS.0000
1827            LDA     #.T000081/256
1828            STA     ABS.0000+1
1829            JSR     ABS
1830   .MFLTASG SET     1
1831            JSR     .FLTASGN
1832            .BYTE   0
1833            .WORD   .T000081
1834            .WORD   U1111101
1835   ;        U=(U/BULKD(J))*100.                                              80000
1836   ; C      IF(U.GT.TST)WRITE(NOUT,115)TST                                   90026
1837   ; C  115 FORMAT(/5X,' COMPUTED AND OBSERVED BRINE BULK MODULI DIFFER BY   00000
1838   ; C      *MORE THAN TST % =',F10.2 //)                                    .10000
1839            LDA     J1111101+1
1840            ASL     A
1841            ASL     A
1842            CLC
1843            ADC     #(BULKD101-4) MOD .M
1844            STA     .T000004
1845            LDA     #0
1846            ADC     #(BULKD101-4)/256
1847            STA     .T000004+1
1848   .MFFDIV  SET     1
1849            JSR     .FFDIV
1850            .BYTE   0
1851            .WORD   U1111101,-.T000004
1852            .WORD   .T000081
1853   .MFFMUL  SET     1
1854            JSR     .FFMUL
1855            .BYTE   0
1856            .WORD   .T000081,.C000203
1857            .WORD   U1111101
1858   ;        GO TO 117                                                     03220000
1859            JMP     .L000204
1860   ;    112 RHOBC=BULKD(J)                                                03230000
1861   .L000200 EQU     *
1862            LDA     J1111101+1
1863            ASL     A
1864            ASL     A
1865            CLC
1866            ADC     #(BULKD101-4) MOD .M
1867            STA     .T000004
1868            LDA     #0
1869            ADC     #(BULKD101-4)/256
1870            STA     .T000004+1
1871   .MFLTASG SET     1
1872            JSR     .FLTASGN
1873            .BYTE   0
1874            .WORD   -.T000004
1875            .WORD   RHOBC101
1876   ;                                                                      03240005
1877            LDA     J1111101+1
1878            ASL     A
1879            ASL     A
1880            CLC
1881            ADC     #(POR1101-4) MOD .M
1882            STA     .T000005
1883            LDA     #0
1884            ADC     #(POR1101-4)/256
1885            STA     .T000005+1
1886   .MFFMUL  SET     1
1887            JSR     .FFMUL
1888            .BYTE   0
1889            .WORD   -.T000005,RHOBRN01
1890            .WORD   .T000081
1891            LDA     J1111101+1
1892            ASL     A
1893            ASL     A
1894            CLC
1895            ADC     #(POR1101-4) MOD .M
1896            STA     .T000004
1897            LDA     #0
1898            ADC     #(POR1101-4)/256
1899            STA     .T000004+1
1900   .MFFSUB  SET     1
1901            JSR     .FFSUB
1902            .BYTE   0
```

```
1903              .WORD   .C000205,-.T000004
1904              .WORD   .T000202
1905   .MFFSUB    SET     1
1906              JSR     .FFSUB
1907              .BYTE   0
1908              .WORD   RHOBC101,.T000081.
1909              .WORD   .T000175
1910              LDA     J111101+1
1911              ASL     A
1912              ASL     A
1913              CLC
1914              ADC     #(RHOM1101-4) MOD .M
1915              STA     .T000051
1916              LDA     #0
1917              ADC     #(RHOM1101-4)/256
1918              STA     .T000051+1
1919   .MFFDIV    SET     1
1920              JSR     .FFDIV
1921              .BYTE   0
1922              .WORD   .T000175,.T000202
1923              .WORD   -.T000051
1924   ;                                                          03250000
1925   .L000204   EQU     *
1926              LDA     J111101+1
1927              ASL     A
1928              ASL     A
1929              CLC
1930              ADC     #(VP111101-4) MOD .M
1931              STA     .T000005
1932              LDA     #0
1933              ADC     #(VP111101-4)/256
1934              STA     .T000005+1
1935   .MFFDIV    SET     1
1936              JSR     .FFDIV
1937              .BYTE   0
1938              .WORD   -.T000005,.C000206
1939              .WORD   .T000081
1940   .MFFMUL    SET     1
1941              JSR     .FFMUL
1942              .BYTE   0
1943              .WORD   .T000081,.C000207
1944              .WORD   .T000175
1945   .MFFMUL    SET     1
1946              JSR     .FFMUL
1947              .BYTE   0
1948              .WORD   .T000175,.C000208
1949              .WORD   RHOBC101
1950   ;          Z=DEPTH(J)                                      03260006
1951              LDA     J111101+1
1952              ASL     A
1953              ASL     A
1954              CLC
1955              ADC     #(DEPTH101-4) MOD .M
1956              STA     .T000004
1957              LDA     #0
1958              ADC     #(DEPTH101-4)/256
1959              STA     .T000004+1
1960   .MFLTASG   SET     1
1961              JSR     .FLTASGN
1962              .BYTE   0
1963              .WORD   -.T000004
1964              .WORD   Z111101
1965   ;          PFLUID=FGRAD*Z                                  03270010
1966   .MFFMUL    SET     1
1967              JSR     .FFMUL
1968              .BYTE   0
1969              .WORD   FGRAD101,Z111101
1970              .WORD   PFLUID01
1971   ;          IF(FTEMP(J).GT.0.0)TEMP=FTEMP(J)                03280010
1972              LDA     J111101+1
1973              ASL     A
1974              ASL     A
1975              CLC
1976              ADC     #(FTEMP101-4) MOD .M
1977              STA     .T000051
1978              LDA     #0
1979              ADC     #(FTEMP101-4)/256
1980              STA     .T000051+1
1981   .MFFGT     SET     1
1982              JSR     .FFGT
1983              .BYTE   0
```

```
1984                .WORD   -.T000051,..C000209
1985                ASL     A
1986                BCS     *+5
1987                JMP     .L000210
1988                LDA     J111101+1
1989                ASL     A
1990                ASL     A
1991                CLC
1992                ADC     #(FTEMP101-4) MOD .M
1993                STA     .T000004
1994                LDA     #0
1995                ADC     #(FTEMP101-4)/256
1996                STA     .T000004+1
1997    .MFLTASG    SET     1
1998                JSR     .FLTASGN
1999                .BYTE   0
2000                .WORD   -.T000004
2001                .WORD   TEMP1101
2002    .L000210    EQU     *
2003    ;           IF(FTEMP(J).LE.0.0)TEMP=T01+TGRAD*Z                              03290010
2004                LDA     J111101+1
2005                ASL     A
2006                ASL     A
2007                CLC
2008                ADC     #(FTEMP101-4) MOD .M
2009                STA     .T000051
2010                LDA     #0
2011                ADC     #(FTEMP101-4)/256
2012                STA     .T000051+1
2013    .MFFLE      SET     1
2014                JSR     .FFLE
2015                .BYTE   0
2016                .WORD   -.T000051,..C000211
2017                ASL     A
2018                BCS     *+5
2019                JMP     .L000212
2020    .MFFMUL     SET     1
2021                JSR     .FFMUL
2022                .BYTE   0
2023                .WORD   TGRAD101,Z111101
2024                .WORD   .T000081
2025    .MFFADD     SET     1
2026                JSR     .FFADD
2027                .BYTE   0
2028                .WORD   T01111101,.T000081
2029                .WORD   TEMP1101
2030    .L000212    EQU     *
2031    ;           KKM=KM(J)                                                        03300000
2032                LDA     J111101+1
2033                ASL     A
2034                ASL     A
2035                CLC
2036                ADC     #(KM111101-4) MOD .M
2037                STA     .T000004
2038                LDA     #0
2039                ADC     #(KM111101-4)/256
2040                STA     .T000004+1
2041    .MFLTASG    SET     1
2042                JSR     .FLTASGN
2043                .BYTE   0
2044                .WORD   -.T000004
2045                .WORD   KKM1101
2046    ;           GGM=GM(J)                                                        03310000
2047                LDA     J111101+1
2048                ASL     A
2049                ASL     A
2050                CLC
2051                ADC     #(GM111101-4) MOD .M
2052                STA     .T000004
2053                LDA     #0
2054                ADC     #(GM111101-4)/256
2055                STA     .T000004+1
2056    .MFLTASG    SET     1
2057                JSR     .FLTASGN
2058                .BYTE   0
2059                .WORD   -.T000004
2060                .WORD   GGM11101
2061    ;           PHI=POR(J)                                                       03320000
2062                LDA     J111101+1
2063                ASL     A
2064                ASL     A
```

```
2065           CLC
2066           ADC     #(POR11101-4) MOD .M
2067           STA     .T000004
2068           LDA     #0
2069           ADC     #(POR11101-4)/256
2070           STA     .T000004+1
2071  .MFLTASG SET     1
2072           JSR     .FLTASGN
2073           .BYTE   0
2074           .WORD   -.T000004
2075           .WORD   PHI11101                                   03330058
2076  ;
2077  .MFFSUB  SET     1
2078           JSR     .FFSUB
2079           .BYTE   0
2080           .WORD   .C000213,PHI11101
2081           .WORD   .T000175
2082  .MFFDIV  SET     1
2083           JSR     .FFDIV
2084           .BYTE   0
2085           .WORD   .T000175,KKM11101
2086           .WORD   .T000202
2087  .MFFDIV  SET     1
2088           JSR     .FFDIV
2089           .BYTE   0
2090           .WORD   PHI11101,KBRIN101
2091           .WORD   .T000081
2092  .MFFADD  SET     1
2093           JSR     .FFADD
2094           .BYTE   0
2095           .WORD   .T000081,.T000202
2096           .WORD   KLOW1101
2097  ;        KLOW=1.0/KLOW                                      03340058
2098  ; C      IF LIMESTONE OR DOLOSTONE CALL LIDOS,LTH=2 OR 3,OTHERWISE IF  03350004
2099  ; C      SANDSTONE:                                         03360004
2100  ; C      CALL KGKA AND CALQ TO COMPUTE KA/KM,K*/KM,G*/GM (SANDSTONE)  03370004
2101  .MFFDIV  SET     1
2102           JSR     .FFDIV
2103           .BYTE   0
2104           .WORD   .C000214,KLOW1101
2105           .WORD   KLOW1101
2106  ;        IF(LTH.EQ.2 .OR. LTH.EQ.3) GO TO 509               03380004
2107           LDA     LTH11101+1
2108           CMP     #3
2109           BNE     .L000215
2110           LDA     LTH11101
2111           CMP     #0
2112           BNE     .L000215
2113  .L000216 LDA     #80H
2114           BNE     *+4
2115  .L000215 LDA     #0
2116           STA     .T000005
2117           LDA     LTH11101+1
2118           CMP     #2
2119           BNE     .L000217
2120           LDA     LTH11101
2121           CMP     #0
2122           BNE     .L000217
2123  .L000218 LDA     #80H
2124           BNE     *+4
2125  .L000217 LDA     #0
2126           ORA     .T000005
2127           ASL     A
2128           BCS     *+5
2129           JMP     .L000219
2130           JMP     .L000220
2131  .L000219 EQU     *
2132  ;        CALL KGKA(PSTR,KKM,GGM,KBRINE,CO,PHI,AA,BB,GG,TOL) 03390034
2133           LDA     #TOL11101 MOD .M
2134           STA     KGKA.010
2135           LDA     #TOL11101/256
2136           STA     KGKA.010+1
2137           LDA     #GG11101 MOD .M
2138           STA     KGKA.009
2139           LDA     #GG11101/256
2140           STA     KGKA.009+1
2141           LDA     #BB11101 MOD .M
2142           STA     KGKA.008
2143           LDA     #BB11101/256
2144           STA     KGKA.008+1
2145           LDA     #AA11101 MOD .M
```

```
2146        STA     KGKA.007
2147        LDA     #AA11101/256
2148        STA     KGKA.007+1
2149        LDA     #PHI1101 MOD .M
2150        STA     KGKA.006
2151        LDA     #PHI1101/256
2152        STA     KGKA.006+1
2153        LDA     #CO11101 MOD .M
2154        STA     KGKA.005
2155        LDA     #CO11101/256
2156        STA     KGKA.005+1
2157        LDA     #KBRINE01 MOD .M
2158        STA     KGKA.004
2159        LDA     #KBRINE01/256
2160        STA     KGKA.004+1
2161        LDA     #GGM11101 MOD .M
2162        STA     KGKA.003
2163        LDA     #GGM11101/256
2164        STA     KGKA.003+1
2165        LDA     #KKM11101 MOD .M
2166        STA     KGKA.002
2167        LDA     #KKM11101/256
2168        STA     KGKA.002+1
2169        LDA     #PSTR1101 MOD .M
2170        STA     KGKA.001
2171        LDA     #PSTR1101/256
2172        STA     KGKA.001+1
2173        JSR     KGKA                                                          03400004
2174    ;   GO TO 510
2175        JMP     .L000221
2176    ;   509 CALL LIDOS(NP,DGRAD,LTH,Z,PSTR,KKM,GGM,KBRINE,PHI,AA,BB,GG)        03410031
2177    .L000220 EQU     *
2178        LDA     #GG11101 MOD .M
2179        STA     LIDOS.12
2180        LDA     #GG11101/256
2181        STA     LIDOS.12+1
2182        LDA     #BB11101 MOD .M
2183        STA     LIDOS.11
2184        LDA     #BB11101/256
2185        STA     LIDOS.11+1
2186        LDA     #AA11101 MOD .M
2187        STA     LIDOS.10
2188        LDA     #AA11101/256
2189        STA     LIDOS.10+1
2190        LDA     #PHI1101 MOD .M
2191        STA     LIDOS.09
2192        LDA     #PHI1101/256
2193        STA     LIDOS.09+1
2194        LDA     #KBRINE01 MOD .M
2195        STA     LIDOS.08
2196        LDA     #KBRINE01/256
2197        STA     LIDOS.08+1
2198        LDA     #GGM11101 MOD .M
2199        STA     LIDOS.07
2200        LDA     #GGM11101/256
2201        STA     LIDOS.07+1
2202        LDA     #KKM11101 MOD .M
2203        STA     LIDOS.06
2204        LDA     #KKM11101/256
2205        STA     LIDOS.06+1
2206        LDA     #PSTR1101 MOD .M
2207        STA     LIDOS.05
2208        LDA     #PSTR1101/256
2209        STA     LIDOS.05+1
2210        LDA     #Z11101 MOD .M
2211        STA     LIDOS.04
2212        LDA     #Z11101/256
2213        STA     LIDOS.04+1
2214        LDA     #LTH11101 MOD .M
2215        STA     LIDOS.03
2216        LDA     #LTH11101/256
2217        STA     LIDOS.03+1
2218        LDA     #DGRAD101 MOD .M
2219        STA     LIDOS.02
2220        LDA     #DGRAD101/256
2221        STA     LIDOS.02+1
2222        LDA     #NP11101 MOD .M
2223        STA     LIDOS.01
2224        LDA     #NP11101/256
2225        STA     LIDOS.01+1
```

```
2226            JSR    LIDOS
2227    ;
2228    .L000221 EQU    *
2229    ; C       IF(AA.LE.0.0)WRITE(NOUT,519)
2230    ; C 519 FORMAT(/5X,'WARNING:  A=KA/KM   IS NEGATIVE,POSSIBLE BOUND VIOLA
2231    ; C     *NS-PROBLEM QUESTIONABLE' //)
2232    .MFFMUL  SET    1
2233             JSR    .FFMUL
2234             .BYTE  0
2235             .WORD  AA111101,KKM11101
2236             .WORD  KA111101
2237    ;                                                                           03460000
2238    .MFFMUL  SET    1
2239             JSR    .FFMUL
2240             .BYTE  0
2241             .WORD  BB111101,KKM11101
2242             .WORD  KSTAR101
2243    ;                                                                           03470000
2244    ; C      K* BELOW LOWER H-S BOUND ERROR.                                    03480058
2245    ; C      IF(KLOW.GE.KSTAR)WRITE(NOUT,507)KLOW,KSTAR                          03490058
2246    ; C  507 FORMAT(/5X,' LOWER BOUND,KLOW=',F7.2,3X,'= OR > K*=',F7.2,3X,       03500061
2247    ; C     *'PROBLEM QUESTIONABLE' //)                                         03510058
2248    ; C      IF(NBUG.GT.0)WRITE(NOUT,513)                                       03520026
2249    ; C  513 FORMAT(/5X,'   SOME BRINE SATURATED OUTPUTS:' /)                   03530026
2250    ; C      IF(NBUG.GT.0)WRITE(NOUT,511)AA,BB,GG,KSTAR,GSTAR,PSTR              03540026
2251    ; C  511 FORMAT(/5X,' A=KA/KM,B=K*/KM,G=G*/GM,K*,G*,P*=',6F14.5 //)          03550000
2252    .MFFMUL  SET    1
2253             JSR    .FFMUL
2254             .BYTE  0
2255             .WORD  GG111101,GGM11101
2256             .WORD  GSTAR101
2257    ;                                                                           03560000
2258    .MFFDIV  SET    1
2259             JSR    .FFDIV
2260             .BYTE  0
2261             .WORD  KSTAR101,GSTAR101
2262             .WORD  R1111101
2263    ;                                                                           03570000
2264    .MFFDIV  SET    1
2265             JSR    .FFDIV
2266             .BYTE  0
2267             .WORD  .C000222,.C000223
2268             .WORD  .T000081
2269    .MFFADD  SET    1
2270             JSR    .FFADD
2271             .BYTE  0
2272             .WORD  R1111101,.T000081
2273             .WORD  FAC11101
2274    ;                                                                           03580000
2275             LDA    J111101+1
2276             ASL    A
2277             ASL    A
2278             CLC
2279             ADC    #(VP111101-4) MOD .M
2280             STA    .T000051
2281             LDA    #0
2282             ADC    #(VP111101-4)/256
2283             STA    .T000051+1
2284    .MFFDIV  SET    1
2285             JSR    .FFDIV
2286             .BYTE  0
2287             .WORD  .C000224,FAC11101
2288             .WORD  -.T000051
2289    ;                                                                           03590000
2290             LDA    #VS111101 MOD .M
2291             STA    SQRT.001
2292             LDA    #VS111101/256
2293             STA    SQRT.001+1
2294             LDA    #.T000081 MOD .M
2295             STA    SQRT.000
2296             LDA    #.T000081/256
2297             STA    SQRT.000+1
2298             JSR    SQRT
2299    .MFLTASG SET    1
2300             JSR    .FLTASGN
2301             .BYTE  0
2302             .WORD  .T000081
2303             .WORD  VCS11101
2304    ;                                                                           03600000
2305    .MFFMUL  SET    1
2306             JSR    .FFMUL
```

```
2307                .BYTE 0
2308                .WORD .C000225,R1111101
2309                .WORD .T000081
2310    .MFFMUL     SET   1
2311                JSR   .FFMUL
2312                .BYTE 0
2313                .WORD .C000227,R1111101
2314                .WORD .T000202
2315    .MFFADD     SET   1
2316                JSR   .FFADD
2317                .BYTE 0
2318                .WORD .T000202,.C000228
2319                .WORD .T000229
2320    .MFFSUB     SET   1
2321                JSR   .FFSUB
2322                .BYTE 0
2323                .WORD .T000081,.C000226
2324                .WORD .T000175
2325    .MFFDIV     SET   1
2326                JSR   .FFDIV
2327                .BYTE 0
2328                .WORD .T000175,.T000229
2329                .WORD SIGSTR01
2330    ;           RHOGRN=RHOM(J)                                                          03610000
2331                LDA   J1111101+1
2332                ASL   A
2333                ASL   A
2334                CLC
2335                ADC   #(RHOM1101-4) MOD .M
2336                STA   .T000004
2337                LDA   #0
2338                ADC   #(RHOM1101-4)/256
2339                STA   .T000004+1
2340    .MFLTASG    SET   1
2341                JSR   .FLTASGN
2342                .BYTE 0
2343                .WORD -.T000004
2344                .WORD RHOGRN01
2345    ;           VCP=VP(J)                                                               03620000
2346                LDA   J1111101+1
2347                ASL   A
2348                ASL   A
2349                CLC
2350                ADC   #(VP111101-4) MOD .M
2351                STA   .T000004
2352                LDA   #0
2353                ADC   #(VP111101-4)/256
2354                STA   .T000004+1
2355    .MFLTASG    SET   1
2356                JSR   .FLTASGN
2357                .BYTE 0
2358                .WORD -.T000004
2359                .WORD VCP11101
2360    ;           SGAS=0.0                                                                03630012
2361    .MFLTASG    SET   1
2362                JSR   .FLTASGN
2363                .BYTE 0
2364                .WORD .C000230
2365                .WORD SGAS1101
2366    ;           SOIL=0.0                                                                03640012
2367    ; C         COMPUTE RHOGAS AND KGAS.(PRINT IF NBUG>0).                              03650014
2368    .MFLTASG    SET   1
2369                JSR   .FLTASGN
2370                .BYTE 0
2371                .WORD .C000231
2372                .WORD SOIL1101
2373    ;           CALL GASMD3(PFLUID,TEMP,RHOGAS,KGAS,GASGRV,TOL,NBUG,NOUT,GASMIX 03660041
2374                LDA   #GASMIX01 MOD .M
2375                STA   GASMD3.9
2376                LDA   #GASMIX01/256
2377                STA   GASMD3.9+1
2378                LDA   #NOUT1101 MOD .M
2379                STA   GASMD3.8
2380                LDA   #NOUT1101/256
2381                STA   GASMD3.8+1
2382                LDA   #NBUG1101 MOD .M
2383                STA   GASMD3.7
2384                LDA   #NBUG1101/256
2385                STA   GASMD3.7+1
2386                LDA   #TOL11101 MOD .M
2387                STA   GASMD3.6
```

```
2388            LDA     #TOL11101/256
2389            STA     GASMD3.6+1
2390            LDA     #GASGRV01 MOD .M
2391            STA     GASMD3.5
2392            LDA     #GASGRV01/256
2393            STA     GASMD3.5+1
2394            LDA     #KGAS11101 MOD .M
2395            STA     GASMD3.4
2396            LDA     #KGAS11101/256
2397            STA     GASMD3.4+1
2398            LDA     #RHOGAS01 MOD .M
2399            STA     GASMD3.3
2400            LDA     #RHOGAS01/256
2401            STA     GASMD3.3+1
2402            LDA     #TEMP11101 MOD .M
2403            STA     GASMD3.2
2404            LDA     #TEMP11101/256
2405            STA     GASMD3.2+1
2406            LDA     #PFLUID01 MOD .M
2407            STA     GASMD3.1
2408            LDA     #PFLUID01/256
2409            STA     GASMD3.1+1
2410            JSR     GASMD3
2411    ; C    COMPUTE OIL DENSITY & MODULUS                                       03670041
2412    ; C    CONVERT FROM OIL GRAVITY TO DENSITY                                 03680041
2413    ;                                                                         03690041
2414    ; C    EMPIRICAL EQN. D.D. THOMPSON'S MEMO TO J.MAHER                      03700041
2415    .MFFADD  SET     1
2416            JSR     .FFADD
2417            .BYTE   0
2418            .WORD   OILGRV01,.C000233
2419            .WORD   .T000081
2420    .MFFDIV  SET     1
2421            JSR     .FFDIV
2422            .BYTE   0
2423            .WORD   .C000232,.T000081
2424            .WORD   RHOOIL01
2425    ;       KOIL=36.0*RHOOIL-19.6                                              '10041
2426    ; C     IF(NBUG.GT.0)WRITE(NOUT,253)                                        20026
2427    ; C 253 FORMAT(/5X,' COMPUTED GAS AND OIL PARAMETERS: '/)                   30026
2428    ; C     IF(NBUG.GT.0)WRITE(NOUT,251)KGAS,RHOGAS,TEMP,KOIL,RHOOIL            30026
2429    ; C 251 FORMAT(/5X,'    KGAS=',F10.5,'   RHOGAS=',F10.5,'   TEMPERATURE     30000
2430    ; C     *',F10.5,'    KOIL=',F10.5,'   RHOOIL=',F10.5 //)                   30012
2431    ; C     WRITE(NOUT,120)                                                    770026
2432    ; C 120 FORMAT(/5X,' SG=GAS SAT.(%)',' SO=OIL SAT.',8X,' VP(COMPUTED)',     780021
2433    ; C     *' VS(COMPUTED)',3X,' POISSON RATIO ',3X,' CALC. BULK DENSITY' /    790007
2434    ; C     WRITE(NOUT,125)SGAS,SOIL,VCP,VCS,SIGSTR,RHOBC                      900026
2435    ; CC 125 FORMAT(1X,2F15.2,F20.1,F20.1,F17.5,3X,F20.5    //)                810012
2436    .MFFMUL  SET     1
2437            JSR     .FFMUL
2438            .BYTE   0
2439            .WORD   .C000234,RHOOIL01
2440            .WORD   .T000081
2441    .MFFSUB  SET     1
2442            JSR     .FFSUB
2443            .BYTE   0
2444            .WORD   .T000081,.C000235
2445            .WORD   KOIL1101
2446    ;       DO 179 L=1,NSG                                                     03820012
2447            LDA     #0
2448            STA     L11111101
2449            LDA     #1
2450            STA     L11111101+1
2451            JMP     .L000238
2452    .L000236 EQU    *
2453            LDA     L11111101+1
2454            CLC
2455            ADC     #1
2456            STA     L11111101+1
2457            LDA     L11111101
2458            ADC     #0
2459            STA     L11111101
2460            LDA     NSG11101+1
2461            CMP     L11111101+1
2462            LDA     NSG11101
2463            SBC     L11111101
2464            BMI     .L000237
2465    .L000238 EQU    *
2466    ;       SGAS=SG(L)/100.0                                                   03830006
2467            LDA     L11111101+1
2468            ASL     A
```

```
2469            ASL     A
2470            CLC
2471            ADC     #(SGI11101-4) MOD .M
2472            STA     .T000005
2473            LDA     #0
2474            ADC     #(SGI11101-4)/256
2475            STA     .T000005+1
2476   .MFFDIV  SET     1
2477            JSR     .FFDIV
2478            .BYTE   0
2479            .WORD   -.T000005,.C000241
2480            .WORD   SGAS1101                                      03840010
2481   ;        DO 175 LO=1,NSO
2482            LDA     #0
2483            STA     LO111101
2484            LDA     #1
2485            STA     LO111101+1
2486            JMP     .L000244
2487   .L000242 EQU     *
2488            LDA     LO111101+1
2489            CLC
2490            ADC     #1
2491            STA     LO111101+1
2492            LDA     LO111101
2493            ADC     #0
2494            STA     LO111101
2495            LDA     NSO1101+1
2496            CMP     LO111101+1
2497            LDA     NSO1101
2498            SBC     LO111101
2499            BMI     .L000243
2500   .L000244 EQU     *
2501   ;        SOIL=SO(LO)/100.0                                     03850006
2502            LDA     LO111101+1
2503            ASL     A
2504            ASL     A
2505            CLC
2506            ADC     #(SOI11101-4) MOD .M
2507            STA     .T000005
2508            LDA     #0
2509            ADC     #(SOI11101-4)/256
2510            STA     .T000005+1
2511   .MFFDIV  SET     1
2512            JSR     .FFDIV
2513            .BYTE   0
2514            .WORD   -.T000005,.C000247
2515            .WORD   SOIL1101
2516   ;        IF(OILSAT.GT.0.0)SOIL=OILSAT/100.0                    03860012
2517   .MFFGT   SET     1
2518            JSR     .FFGT
2519            .BYTE   0
2520            .WORD   OILSAT01,.C000248
2521            ASL     A
2522            BCS     *+5
2523            JMP     .L000249
2524   .MFFDIV  SET     1
2525            JSR     .FFDIV
2526            .BYTE   0
2527            .WORD   OILSAT01,.C000250
2528            .WORD   SOIL1101
2529   .L000249 EQU     *
2530   ;        SHC=SGAS+SOIL                                         03870006
2531   .MFFADD  SET     1
2532            JSR     .FFADD
2533            .BYTE   0
2534            .WORD   SGAS1101,SOIL1101
2535            .WORD   SHC1101
2536   ;        IF(SHC.GT.1.0) GO TO 175                              03880007
2537   .MFFGT   SET     1
2538            JSR     .FFGT
2539            .BYTE   0
2540            .WORD   SHC1101,.C000251
2541            ASL     A
2542            BCS     *+5
2543            JMP     .L000252
2544            JMP     .L000246
2545   .L000252 EQU     *
2546   ; C      BEGIN SATURATION CALC. WITH SUBROUTINE FLMOD3(FLUID MODULI)
2547   ; C      COMPUTE (FOR EACH SHC) KF=FLUID BULK MOD. & RHOBC=TOTAL BULK DE
2548   ; C
```

```
2549  ;       CALL FLMOD3(SGAS,PHI,RHOGRN,RHOBRN,KBRINE,RHOGAS,KGAS,KF,RHOBC,
2550  ;      *SOIL,KOIL,RHOIL)
2551          LDA    #RHOIL101 MOD .M
2552          STA    FLMOD3.2
2553          LDA    #RHOIL101/256
2554          STA    FLMOD3.2+1
2555          LDA    #KOIL1101 MOD .M
2556          STA    FLMOD3.1
2557          LDA    #KOIL1101/256
2558          STA    FLMOD3.1+1
2559          LDA    #SOIL1101 MOD .M
2560          STA    FLMOD3.0
2561          LDA    #SOIL1101/256
2562          STA    FLMOD3.0+1
2563          LDA    #RHOBC101 MOD .M
2564          STA    FLMOD3.9
2565          LDA    #RHOBC101/256
2566          STA    FLMOD3.9+1
2567          LDA    #KF11101 MOD .M
2568          STA    FLMOD3.8
2569          LDA    #KF11101/256
2570          STA    FLMOD3.8+1
2571          LDA    #KGAS1101 MOD .M
2572          STA    FLMOD3.7
2573          LDA    #KGAS1101/256
2574          STA    FLMOD3.7+1
2575          LDA    #RHOGAS01 MOD .M
2576          STA    FLMOD3.6
2577          LDA    #RHOGAS01/256
2578          STA    FLMOD3.6+1
2579          LDA    #KBRINE01 MOD .M
2580          STA    FLMOD3.5
2581          LDA    #KBRINE01/256
2582          STA    FLMOD3.5+1
2583          LDA    #RHOBRN01 MOD .M
2584          STA    FLMOD3.4
2585          LDA    #RHOBRN01/256
2586          STA    FLMOD3.4+1
2587          LDA    #RHOGRN01 MOD .M
2588          STA    FLMOD3.3
2589          LDA    #RHOGRN01/256
2590          STA    FLMOD3.3+1
2591          LDA    #PHI1101 MOD .M
2592          STA    FLMOD3.2
2593          LDA    #PHI1101/256
2594          STA    FLMOD3.2+1
2595          LDA    #SGAS1101 MOD .M
2596          STA    FLMOD3.1
2597          LDA    #SGAS1101/256
2598          STA    FLMOD3.1+1
2599          JSR    FLMOD3
2600  ; C                                                                      03940000
2601  ; C     BIOT IS A SIMPLE BIOT-GASSMAN EQN ROUTINE WHICH COMPUTES K*.      03950006
2602  ;       CALL BIOT(AA,KKM,KF,PHI,KSTAR)                                    03960006
2603          LDA    #KSTAR101 MOD .M
2604          STA    BIOT.005
2605          LDA    #KSTAR101/256
2606          STA    BIOT.005+1
2607          LDA    #PHI1101 MOD .M
2608          STA    BIOT.004
2609          LDA    #PHI1101/256
2610          STA    BIOT.004+1
2611          LDA    #KF11101 MOD .M
2612          STA    BIOT.003
2613          LDA    #KF11101/256
2614          STA    BIOT.003+1
2615          LDA    #KKM1101 MOD .M
2616          STA    BIOT.002
2617          LDA    #KKM1101/256
2618          STA    BIOT.002+1
2619          LDA    #AA11101 MOD .M
2620          STA    BIOT.001
2621          LDA    #AA11101/256
2622          STA    BIOT.001+1
2623          JSR    BIOT
2624  ;       H=KSTAR/GSTAR                                                    03970000
2625  .MFFDIV SET    1
2626          JSR    .FFDIV
2627          .BYTE  0
2628          .WORD  KSTAR101,GSTAR101
2629          .WORD  H11101
```

```
2630                ;
2631    .MFFMUL     SET     1
2632                JSR     .FFMUL
2633                .BYTE   0
2634                .WORD   .C000253,R111101
2635                .WORD   .T000081
2636    .MFFMUL     SET     1
2637                JSR     .FFMUL
2638                .BYTE   0
2639                .WORD   .C000255,R111101
2640                .WORD   .T000202
2641    .MFFADD     SET     1
2642                JSR     .FFADD
2643                .BYTE   0
2644                .WORD   .T000202,.C000256
2645                .WORD   .T000229
2646    .MFFSUB     SET     1
2647                JSR     .FFSUB
2648                .BYTE   0
2649                .WORD   .T000081,.C000254
2650                .WORD   .T000175
2651    .MFFDIV     SET     1
2652                JSR     .FFDIV
2653                .BYTE   0
2654                .WORD   .T000175,.T000229
2655                .WORD   SIGSTR01
2656                ;
2657    .MFFDIV     SET     1
2658                JSR     .FFDIV
2659                .BYTE   0
2660                .WORD   .C000257,.C000258
2661                .WORD   .T000081
2662    .MFFADD     SET     1
2663                JSR     .FFADD
2664                .BYTE   0
2665                .WORD   R111101,.T000081
2666                .WORD   FAC11101
2667                ;
2668    .MFFMUL     SET     1
2669                JSR     .FFMUL
2670                .BYTE   0
2671                .WORD   .C000259,GSTAR101
2672                .WORD   .T000081
2673    .MFFDIV     SET     1
2674                JSR     .FFDIV
2675                .BYTE   0
2676                .WORD   .T000081,.C000260
2677                .WORD   .T000175
2678    .MFFADD     SET     1
2679                JSR     .FFADD
2680                .BYTE   0
2681                .WORD   KSTAR101,.T000175
2682                .WORD   PHAT1101
2683                ;
2684    ; C   COMPUTED P-WAVE AND SHEAR WAVE VELOCITIES,VCP,VCS FOR GIVEN SG.
2685    .MFFMUL     SET     1
2686                JSR     .FFMUL
2687                .BYTE   0
2688                .WORD   .C000201,RHOBC101
2689                .WORD   .T000081
2690    .MFFDIV     SET     1
2691                JSR     .FFDIV
2692                .BYTE   0
2693                .WORD   PHAT1101,.T000081
2694                .WORD   YY111101
2695                ;
2696                LDA     #YY111101 MOD .H
2697                STA     SQRT.001
2698                LDA     #YY111101/256
2699                STA     SQRT.001+1
2700                LDA     #.T000081 MOD .H
2701                STA     SQRT.000
2702                LDA     #.T000081/256
2703                STA     SQRT.000+1
2704                JSR     SQRT
2705    .MFFMUL     SET     1
2706                JSR     .FFMUL
2707                .BYTE   0
2708                .WORD   .T000081,.C000262
```

```
2709              .WORD  VCP11101                                         04040000
2710      ;
2711      .MFFMUL SET    1
2712              JSR    .FFMUL
2713              .BYTE  0
2714              .WORD  .C000263,RHOBC101
2715              .WORD  .T000081
2716      .MFFDIV SET    1
2717              JSR    .FFDIV
2718              .BYTE  0
2719              .WORD  GSTAR101,.T000081
2720              .WORD  VCS11101
2721      ;                                                               04050000
2722              LDA    #VCS11101 MOD .M
2723              STA    SQRT.001
2724              LDA    #VCS11101/256
2725              STA    SQRT.001+1
2726              LDA    #.T000081 MOD .M
2727              STA    SQRT.000
2728              LDA    #.T000081/256
2729              STA    SQRT.000+1
2730              JSR    SQRT
2731      .MFFMUL SET    1
2732              JSR    .FFMUL
2733              .BYTE  0
2734              .WORD  .T000081,.C000264
2735              .WORD  VCS11101
2736      ;       SGPCT=SGAS*100.                                         04060006
2737      .MFFMUL SET    1
2738              JSR    .FFMUL
2739              .BYTE  0
2740              .WORD  SGAS1101,.C000265
2741              .WORD  SGPCT101
2742      ;       SOPCT=SOIL*100.                                         04070006
2743      .MFFMUL SET    1
2744              JSR    .FFMUL
2745              .BYTE  0
2746              .WORD  SOIL1101,.C000266
2747              .WORD  SOPCT101
2748      ;       IF(SGAS.EQ.0.0 .AND. SOIL.EQ.0.0)GO TO 175              04080007
2749      .MFFEQ  SET    1
2750              JSR    .FFEQ
2751              .BYTE  0
2752              .WORD  SOIL1101,.C000268
2753              STA    .T000005
2754      .MFFEQ  SET    1
2755              JSR    .FFEQ
2756              .BYTE  0
2757              .WORD  SGAS1101,.C000267
2758              AND    .T000005
2759              ASL    A
2760              BCS    *+5
2761              JMP    .L000269
2762              JMP    .L000246
2763      .L000269 EQU   *
2764      ; C     WRITE(NOUT,125)SGPCT,SOPCT,VCP,VCS,SIGSTR,RHOBC          04090026
2765      ;   175 CONTINUE                                                 04100000
2766      .L000246 EQU   *
2767              JMP    .L000242
2768      .L000243 EQU   *
2769      ; C     IF(NSO.GT.1)WRITE(NOUT,90)                               04110026
2770      ; C  90 FORMAT(/2X,'***'/)                                       04120043
2771      ;   179 CONTINUE                                                 04130012
2772      .L000240 EQU   *
2773              JMP    .L000236
2774      .L000237 EQU   *
2775      ; C 176 WRITE (6,131)                                            04140006
2776      ; C 131 FORMAT(' * * * * * * * * * * * * * * * * * * '//)       04150049
2777      ;   200 CONTINUE                                                 04160000
2778      .L000194 EQU   *
2779              JMP    .L000190
2780      .L000191 EQU   *
2781      ;       GO TO 1                                                  04170000
2782              JMP    .L000040
2783      ;       END                                                     04180000
2784      .R000001 RTS
2785      ;       SUBROUTINE KGKA(PSTAR,KM,GM,KF,CO,POR,A,B,G,TOL)         04190000
2786      KGKA    EQU    *
2787      PSTAR102 EQU   KGKA.001
```

```
2788  KM111102 EQU    KGKA.002
2789  GM111102 EQU    KGKA.003
2790  KF111102 EQU    KGKA.004
2791  CO111102 EQU    KGKA.005
2792  POR111102 EQU   KGKA.006
2793  A111102 EQU     KGKA.007
2794  B111102 EQU     KGKA.008
2795  G111102 EQU     KGKA.009
2796  TOL111102 EQU   KGKA.010
2797  ; C     R.J.RUNGE                  COFRC.                              04200000
2798  ; C     CALCULATES A,B,G SUCH THAT ABS(Q)< TOL, I.E Q=0 USING          04210000
2799  ; C     HALVING SEARCH (THOMPSON,D.D. & BROWN,R.J.S.                   04220000
2800  ; C     COFRC                                                          04230034
2801  ; C     SANDSTONE CASE ONLY, LTH=1.                                    04240026
2802  ; C     *                                                              04250000
2803  ;       IMPLICIT REAL (K)                                              04260000
2804  ;       ALPHA0=(3.0*PSTAR)/(4.0*GM)                                    04270000
2805  .MFFMUL  SET    1
2806           JSR    .FFMUL
2807           .BYTE  0
2808           .WORD  .C000273,-GM111102
2809           .WORD  .T000274
2810  .MFFMUL  SET    1
2811           JSR    .FFMUL
2812           .BYTE  0
2813           .WORD  .C000271,-PSTAR102
2814           .WORD  .T000272
2815  .MFFDIV  SET    1
2816           JSR    .FFDIV
2817           .BYTE  0
2818           .WORD  .T000272,.T000274
2819           .WORD  ALPHA002
2820  ;                                                                      04280000
2821  .MFFMUL  SET    1
2822           JSR    .FFMUL
2823           .BYTE  0
2824           .WORD  .C000280,-GM111102
2825           .WORD  .T000274
2826  .MFFMUL  SET    1
2827           JSR    .FFMUL
2828           .BYTE  0
2829           .WORD  .C000279,-KM111102
2830           .WORD  .T000272
2831  .MFFDIV  SET    1
2832           JSR    .FFDIV
2833           .BYTE  0
2834           .WORD  .T000272,.T000274
2835           .WORD  BETA0102
2836  ;                                                                      04290000
2837  ; C     BEGIN HALVING SEARCH FOR A                                     04300000
2838  .MFFDIV  SET    1
2839           JSR    .FFDIV
2840           .BYTE  0
2841           .WORD  -KM111102,-KF111102
2842           .WORD  .T000272
2843  .MFFSUB  SET    1
2844           JSR    .FFSUB
2845           .BYTE  0
2846           .WORD  .T000272,.C000281
2847           .WORD  F0111102
2848  ;                                                                      04310000
2849  .MFLTASG SET    1
2850           JSR    .FLTASGN
2851           .BYTE  0
2852           .WORD  .C000282
2853           .WORD  ALOW1102
2854  ;       AHIGH=1.0                                                      04320000
2855  .MFLTASG SET    1
2856           JSR    .FLTASGN
2857           .BYTE  0
2858           .WORD  .C000283
2859           .WORD  AHIGH102
2860  ;                                                                      04330000
2861  .MFLTASG SET    1
2862           JSR    .FLTASGN
2863           .BYTE  0
2864           .WORD  .C000284
2865           .WORD  -A111102
2866  ;       CALL CALCU(QLOW,ALOW,B,G,CO,FO,POR,ALPHA0,BETA0)               04340000
2867           LDA    #BETA0102 MOD .M
2868           STA    CALCU.09
2869           LDA    #BETA0102/256
```

```
2870          STA    CALCQ.09+1
2871          LDA    #ALPHA002 MOD .M
2872          STA    CALCQ.08
2873          LDA    #ALPHA002/256
2874          STA    CALCQ.08+1
2875          LDA    POR11102
2876          STA    CALCQ.07
2877          LDA    POR11102+1
2878          STA    CALCQ.07+1
2879          LDA    #F011102 MOD .M
2880          STA    CALCQ.06
2881          LDA    #F011102/256
2882          STA    CALCQ.06+1
2883          LDA    CO111102
2884          STA    CALCQ.05
2885          LDA    CO111102+1
2886          STA    CALCQ.05+1
2887          LDA    G1111102
2888          STA    CALCQ.04
2889          LDA    G1111102+1
2890          STA    CALCQ.04+1
2891          LDA    B1111102
2892          STA    CALCQ.03
2893          LDA    B1111102+1
2894          STA    CALCQ.03+1
2895          LDA    #ALOW1102 MOD .M
2896          STA    CALCQ.02
2897          LDA    #ALOW1102/256
2898          STA    CALCQ.02+1
2899          LDA    #ULOW1102 MOD .M
2900          STA    CALCQ.01
2901          LDA    #ULOW1102/256
2902          STA    CALCQ.01+1
2903          JSR    CALCQ
2904    ;     CALL CALCQ(QHIGH,AHIGH,B,G,CO,FO,POR,ALPHAO,BETAO)           04350000
2905          LDA    #BETA0102 MOD .M
2906          STA    CALCQ.09
2907          LDA    #BETA0102/256
2908          STA    CALCQ.09+1
2909          LDA    #ALPHA002 MOD .M
2910          STA    CALCQ.08
2911          LDA    #ALPHA002/256
2912          STA    CALCQ.08+1
2913          LDA    POR11102
2914          STA    CALCQ.07
2915          LDA    POR11102+1
2916          STA    CALCQ.07+1
2917          LDA    #F011102 MOD .M
2918          STA    CALCQ.06
2919          LDA    #F011102/256
2920          STA    CALCQ.06+1
2921          LDA    CO111102
2922          STA    CALCQ.05
2923          LDA    CO111102+1
2924          STA    CALCQ.05+1
2925          LDA    G1111102
2926          STA    CALCQ.04
2927          LDA    G1111102+1
2928          STA    CALCQ.04+1
2929          LDA    B1111102
2930          STA    CALCQ.03
2931          LDA    B1111102+1
2932          STA    CALCQ.03+1
2933          LDA    #AHIGH102 MOD .M
2934          STA    CALCQ.02
2935          LDA    #AHIGH102/256
2936          STA    CALCQ.02+1
2937          LDA    #QHIGH102 MOD .M
2938          STA    CALCQ.01
2939          LDA    #QHIGH102/256
2940          STA    CALCQ.01+1
2941          JSR    CALCQ
2942    ;     IF(QLOW.LT.0.0  .AND. QHIGH.GT.0.0)GO TO 10                  04360000
2943    .MFFGT SET   1
2944          JSR    .FFGT
2945          .BYTE  0
2946          .WORD  QHIGH102,.C000286
2947          STA    .T000274
2948    .MFFLT SET   1
2949          JSR    .FFLT
```

```
2950                .BYTE  0
2951                .WORD  QLOW1102,.C000285
2952                AND    .T000274
2953                ASL    A
2954                BCS    *+5
2955                JMP    .L000287
2956                JMP    .L000288
2957   .L000287 EQU *
2958   ;       IF(QHIGH.LT.0.0  .AND. QLOW.GT.0.0)GO TO 15                   04370000
2959   .MFFGT   SET   1
2960                JSR    .FFGT
2961                .BYTE  0
2962                .WORD  QLOW1102,.C000290
2963                STA    .T000274
2964   .MFFLT   SET   1
2965                JSR    .FFLT
2966                .BYTE  0
2967                .WORD  QHIGH102,.C000289
2968                AND    .T000274
2969                ASL    A
2970                BCS    *+5
2971                JMP    .L000291
2972                JMP    .L000292
2973   .L000291 EQU *
2974   ;                                                                     04380000
2975   .MFUNMIN SET  1
2976                JSR    .FUNMIN
2977                .BYTE  0
2978                .WORD  .C000293
2979                .WORD  -A1111102
2980   ;       GO TO 20                                                      04390000
2981                JMP    .L000294
2982   ;    10 CALL CALC0(0,A,B,G,C0,F0,POR,ALPHA0,BETA0)                    04400000
2983   .L000288 EQU *
2984                LDA    #BETA0102 MOD .M
2985                STA    CALC0.09
2986                LDA    #BETA0102/256
2987                STA    CALC0.09+1
2988                LDA    #ALPHA002 MOD .M
2989                STA    CALC0.08
2990                LDA    #ALPHA002/256
2991                STA    CALC0.08+1
2992                LDA    POR1102
2993                STA    CALC0.07
2994                LDA    POR1102+1
2995                STA    CALC0.07+1
2996                LDA    #F01111102 MOD .M
2997                STA    CALC0.06
2998                LDA    #F01111102/256
2999                STA    CALC0.06+1
3000                LDA    C01111102
3001                STA    CALC0.05
3002                LDA    C01111102+1
3003                STA    CALC0.05+1
3004                LDA    G1111102
3005                STA    CALC0.04
3006                LDA    G1111102+1
3007                STA    CALC0.04+1
3008                LDA    B1111102
3009                STA    CALC0.03
3010                LDA    B1111102+1
3011                STA    CALC0.03+1
3012                LDA    A1111102
3013                STA    CALC0.02
3014                LDA    A1111102+1
3015                STA    CALC0.02+1
3016                LDA    #01111102 MOD .M
3017                STA    CALC0.01
3018                LDA    #01111102/256
3019                STA    CALC0.01+1
3020                JSR    CALC0
3021   ;    V=ABS(Q)                                                         04410000
3022                LDA    #01111102 MOD .M
3023                STA    ABS.0001
3024                LDA    #01111102/256
3025                STA    ABS.0001+1
3026                LDA    #.T000272 MOD .M
3027                STA    ABS.0000
3028                LDA    #.T000272/256
```

```
3029            STA     ABS.0000+1
3030            JSR     ABS
3031   .MFLTASG SET     1
3032            JSR     .FLTASGN
3033            .BYTE   0
3034            .WORD   .T000272
3035            .WORD   V11111102
3036    ;       IF(V.LE.TOL)GO TO 20
3037   .MFFLE   SET     1
3038            JSR     .FFLE
3039            .BYTE   0
3040            .WORD   V11111102,-TOL11102
3041            ASL     A
3042            BCS     *+5
3043            JMP     .L000295
3044            JMP     .L000294
3045   .L000295 EQU     *
3046    ;
3047   .MFFGT   SET     1
3048            JSR     .FFGT
3049            .BYTE   0
3050            .WORD   U11111102,.C000296
3051            ASL     A
3052            BCS     *+5
3053            JMP     .L000297
3054   .MFLTASG SET     1
3055            JSR     .FLTASGN
3056            .BYTE   0
3057            .WORD   -A11111102
3058            .WORD   AHIGH102
3059   .L000297 EQU     *
3060    ;
3061   .MFFLT   SET     1
3062            JSR     .FFLT
3063            .BYTE   0
3064            .WORD   U11111102,.C000298
3065            ASL     A
3066            BCS     *+5
3067            JMP     .L000299
3068   .MFLTASG SET     1
3069            JSR     .FLTASGN
3070            .BYTE   0
3071            .WORD   -A11111102
3072            .WORD   ALOW1102
3073   .L000299 EQU     *
3074    ;
3075   .MFFADD  SET     1
3076            JSR     .FFADD
3077            .BYTE   0
3078            .WORD   AHIGH102,ALOW1102
3079            .WORD   .T000272
3080   .MFFDIV  SET     1
3081            JSR     .FFDIV
3082            .BYTE   0
3083            .WORD   .T000272,.C000300
3084            .WORD   -A11111102
3085    ;
3086   .MFFSUB  SET     1
3087            JSR     .FFSUB
3088            .BYTE   0
3089            .WORD   AHIGH102,ALOW1102
3090            .WORD   R11111102
3091    ;
3092            LDA     #R11111102 MOD .M
3093            STA     ABS.0001
3094            LDA     #R11111102/256
3095            STA     ABS.0001+1
3096            LDA     #.T000272 MOD .M
3097            STA     ABS.0000
3098            LDA     #.T000272/256
3099            STA     ABS.0000+1
3100            JSR     ABS
3101   .MFLTASG SET     1
3102            JSR     .FLTASGN
3103            .BYTE   0
3104            .WORD   .T000272
3105            .WORD   R11111102
3106    ;
3107   .MFFDIV  SET     1
3108            JSR     .FFDIV
3109            .BYTE   0
```

```
3110              .WORD  R1111102,-A1111102
3111              .WORD  R1111102
3112    ;         IF(R.LT.0.001)GO TO 20                              04490000
3113    .MFFLT    SET    1
3114              JSR    .FFLT
3115              .BYTE  0
3116              .WORD  R1111102,.C000301
3117              ASL    A
3118              BCS    *+5
3119              JMP    .L000302
3120              JMP    .L000294
3121    .L000302  EQU    *
3122    ;         GO TO 10                                            04500000
3123              JMP    .L000288
3124    ;         IS CALL CALCQ(Q,A,B,G,CO,FO,POR,ALPHAO,BETAO)       04510000
3125    .L000292  EQU    *
3126              LDA    #BETAO102 MOD .M
3127              STA    CALCQ.09
3128              LDA    #BETAO102/256
3129              STA    CALCQ.09+1
3130              LDA    #ALPHAO02 MOD .M
3131              STA    CALCQ.08
3132              LDA    #ALPHAO02/256
3133              STA    CALCQ.08+1
3134              LDA    POR1111O2
3135              STA    CALCQ.07
3136              LDA    POR1111O2+1
3137              STA    CALCQ.07+1
3138              LDA    #FO111102 MOD .M
3139              STA    CALCQ.06
3140              LDA    #FO111102/256
3141              STA    CALCQ.06+1
3142              LDA    CO111102
3143              STA    CALCQ.05
3144              LDA    CO111102+1
3145              STA    CALCQ.05+1
3146              LDA    G1111102
3147              STA    CALCQ.04
3148              LDA    G1111102+1
3149              STA    CALCQ.04+1
3150              LDA    B1111102
3151              STA    CALCQ.03
3152              LDA    B1111102+1
3153              STA    CALCQ.03+1
3154              LDA    A1111102
3155              STA    CALCQ.02
3156              LDA    A1111102+1
3157              STA    CALCQ.02+1
3158              LDA    #Q1111102 MOD .M
3159              STA    CALCQ.01
3160              LDA    #Q1111102/256
3161              STA    CALCQ.01+1
3162              JSR    CALCQ
3163    ;         .V=ABS(G)                                           04520000
3164              LDA    #Q1111102 MOD .M
3165              STA    ABS.0001
3166              LDA    #Q1111102/256
3167              STA    ABS.0001+1
3168              LDA    #.T000272 MOD .M
3169              STA    ABS.0000
3170              LDA    #.T000272/256
3171              STA    ABS.0000+1
3172              JSR    ABS
3173    .MFLTASG  SET    1
3174              JSR    .FLTASGN
3175              .BYTE  0
3176              .WORD  .T000272
3177              .WORD  V1111102
3178    ;         IF(V.LE.TOL)GO TO 20                                04530000
3179    .MFFLE    SET    1
3180              JSR    .FFLE
3181              .BYTE  0
3182              .WORD  V1111102,-TOL11102
3183              ASL    A
3184              BCS    *+5
3185              JMP    .L000303
3186              JMP    .L000294
3187    .L000303  EQU    *
3188    ;                                                             04540000
3189    .MFFGT    SET    1
```

```
3190            JSR     .FFGT
3191            .BYTE   0
3192            .WORD   QIIIII02,.C000304
3193            ASL     A
3194            BCS     *+5
3195            JMP     .L000305
3196    .MFLTASG SET    1
3197            JSR     .FLTASGN
3198            .BYTE   0
3199            .WORD   -AIIIII02
3200            .WORD   ALOWII02
3201    .L000305 EQU    *
3202    ;                                                           04550000
3203    .MFFLT  SET     1
3204            JSR     .FFLT
3205            .BYTE   0
3206            .WORD   QIIIII02,.C000306
3207            ASL     A
3208            BCS     *+5
3209            JMP     .L000307
3210    .MFLTASG SET    1
3211            JSR     .FLTASGN
3212            .BYTE   0
3213            .WORD   -AIIIII02
3214            .WORD   AHIGHI02
3215    .L000307 EQU    *
3216    ;                                                           04560000
3217    .MFFADD SET     1
3218            JSR     .FFADD
3219            .BYTE   0
3220            .WORD   AHIGHI02,ALOWII02
3221            .WORD   .T000272
3222    .MFFDIV SET     1
3223            JSR     .FFDIV
3224            .BYTE   0
3225            .WORD   .T000272,.C000308
3226            .WORD   -AIIIII02
3227    ;                                                           04570000
3228    .MFFSUB SET     1
3229            JSR     .FFSUB
3230            .BYTE   0
3231            .WORD   AHIGHI02,ALOWII02
3232            .WORD   RIIIII02
3233    ;
3234            LDA     #RIIIII02 MOD .M                            04580000
3235            STA     ABS.0001
3236            LDA     #RIIIII02/256
3237            STA     ABS.0001+1
3238            LDA     #.T000272 MOD .M
3239            STA     ABS.0000
3240            LDA     #.T000272/256
3241            STA     ABS.0000+1
3242            JSR     ABS
3243    .MFLTASG SET    1
3244            JSR     .FLTASGN
3245            .BYTE   0
3246            .WORD   .T000272
3247            .WORD   RIIIII02
3248    ;
3249    .MFFDIV SET     1                                           04590000
3250            JSR     .FFDIV
3251            .BYTE   0
3252            .WORD   RIIIII02,-AIIIII02
3253            .WORD   RIIIII02
3254    ;       IF(R.LE.0.001)GO TO 20
3255    .MFFLE  SET     1                                           04600000
3256            JSR     .FFLE
3257            .BYTE   0
3258            .WORD   RIIIII02,.C000309
3259            ASL     A
3260            BCS     *+5
3261            JMP     .L000310
3262            JMP     .L000294
3263    .L000310 EQU    *
3264    ;       GO TO 15
3265            JMP     .L000292                                    04610000
3266    ; C     END HALVING SEARCH
3267    ;    20 RETURN                                              04620000
3268    .L000294 EQU    *                                           04630000
```

```
3269            JMP     .R000270
3270   ; C      *                                                                04640000
3271   ;        END                                                              04650000
3272   .R000270 RTS                                                              04660000
3273   ;       SUBROUTINE CALCQ(Q,A,B,G,CO,FO,POR,ALPHAO,BETAO)
3274   CALCQ   EQU     *
3275   Q111103 EQU     CALCQ.01
3276   A111103 EQU     CALCQ.02
3277   B111103 EQU     CALCQ.03
3278   G111103 EQU     CALCQ.04
3279   CO11103 EQU     CALCQ.05
3280   FO11103 EQU     CALCQ.06
3281   POR1103 EQU     CALCQ.07
3282   ALPHA003 EQU    CALCQ.08
3283   BETAO103 EQU    CALCQ.09
3284   ; C     R.J.RUNGE                COFHC
3285   ; C                     CALCULATES  Q(A)=LEFT SIDE OF Q=0 IN
3286   ; C     SUBROUTINE KGKA FOR A GIVEN A (HALVING SEARCH). ALSO, B,G. CALC
3287   ; C     SANDSTONE CASE ONLY, LTH=1.
3288   ; C     *
3289   ; C     BIOT GASSMAN EQUATION
3290   ;                                                                         04730000
3291   .MFFMUL SET     1
3292           JSR     .FFMUL
3293           .BYTE   0
3294           .WORD   -FO11103,-POR1103
3295           .WORD   .T000315
3296   .MFFADD SET     1
3297           JSR     .FFADD
3298           .BYTE   0
3299           .WORD   .T000315,.C000316
3300           .WORD   .T000320
3301   ;                                                                         04740000
3302   .MFFSUB SET     1
3303           JSR     .FFSUB
3304           .BYTE   0
3305           .WORD   .T000320,-A111103
3306           .WORD   .T000315
3307   .MFFDIV SET     1
3308           JSR     .FFDIV
3309           .BYTE   0
3310           .WORD   .C000314,.T000315
3311           .WORD   .T000320
3312   .MFFSUB SET     1
3313           JSR     .FFSUB
3314           .BYTE   0
3315           .WORD   .C000312,-A111103
3316           .WORD   .T000313
3317   .MFFADD SET     1
3318           JSR     .FFADD
3319           .BYTE   0
3320           .WORD   .T000313,.T000320
3321           .WORD   -A111103
3322   ;                                                                         04750000
3323   .MFFMUL SET     1
3324           JSR     .FFMUL
3325           .BYTE   0
3326           .WORD   -BETAO103,-B111103
3327           .WORD   .T000313
3328   .MFFSUB SET     1
3329           JSR     .FFSUB
3330           .BYTE   0
3331           .WORD   -ALPHA003,.T000313
3332           .WORD   -G111103
3333   ;                                                                         04760000
3334   .MFFSUB SET     1
3335           JSR     .FFSUB
3336           .BYTE   0
3337           .WORD   -A111103,-G111103
3338           .WORD   X111103
3339   ;                                                                         04770000
3340   ;                                                                         04780000
3341   .MFFADD SET     1
3342           JSR     .FFADD
3343           .BYTE   0
3344           .WORD   -A111103,-G111103
3345           .WORD   Y111103
3346   ;                                                                         04790000
3347   .MFFSUB SET     1
3348           JSR     .FFSUB
3349           .BYTE   0
```

```
3350              .WORD    Y1111103,.C000322
3351              .WORD    .T000313
3352   .MFFSUB    SET      1
3353              JSR      .FFSUB
3354              .BYTE    0
3355              .WORD    .T000313,.C000323
3356              .WORD    .T000315
3357   .MFFMUL    SET      1
3358              JSR      .FFMUL
3359              .BYTE    0
3360              .WORD    .C000321,.T000315
3361              .WORD    .T000313
3362   .MFFSUB    SET      1
3363              JSR      .FFSUB
3364              .BYTE    0
3365              .WORD    -C0111103,.T000313
3366              .WORD    X1111103
3367   ;          RETURN
3368              JMP      .R000311
3369   ; C        *
3370   ;          END
3371   .R000311   RTS
3372   ;          SUBROUTINE FLMOD3(SG,PHI,RHOGRN,RHOBRN,KBRINE,RHOGAS,KGAS,KF,RO
3373   FLMOD3     EQU      *
3374   SG111104   EQU      FLMOD3.1
3375   PHI11104   EQU      FLMOD3.2
3376   RHOGRN04   EQU      FLMOD3.3
3377   RHOBRN04   EQU      FLMOD3.4
3378   KBRINE04   EQU      FLMOD3.5
3379   RHOGAS04   EQU      FLMOD3.6
3380   KGAS1104   EQU      FLMOD3.7
3381   KF111104   EQU      FLMOD3.8                                              04840044
3382   ;          *,SO,KOIL,RHOOIL)
3383   RHOB1104   EQU      FLMOD3.9
3384   SO111104   EQU      FLMOD3.0
3385   KOIL1104   EQU      FLMOD3.1
3386   RHOOIL04   EQU      FLMOD3.2
3387   ; C        R.J. RUNGE              COFRC.
3388   ; C        COMPUTES KF=FLUID MIX BULK MODULUS AND
3389   ; C        RHOB=BULK DENSITY.
3390   ; C
3391   ; C        SG=FRACTIONAL GAS SATURATION, PHI=FRACTIONAL POROSITY OF ROCK
3392   ; C        DENSITIES IN GM/CM**3,BULK MODULI IN KILOBARS
3393   ; C        RHOGRN=GRAIN DENSITY(E.G. 2.68),RHOBRN=LIQUID(BRINE OR OIL) DEN
3394   ; C        (RHOBRN=1.05 GULF COAST), KBRINE=LIQUID(BRINE)MODULUS=25.0 FOR
3395   ; C        A-BRINE.  KOIL=OIL BULK MODULUS(KB,)  RHOOIL=OIL BULK DENSITY
3396   ; C        INPUTTED FROM MAIN.  KGAS=GAS MODULUS FROM GASMD3,RHOGAS=GAS DE
3397   ; C
3398   ;          IMPLICIT REAL (K)
3399   ;          SM=SG+SO
3400   .MFFADD    SET      1
3401              JSR      .FFADD
3402              .BYTE    0
3403              .WORD    -SG111104,-SO111104
3404              .WORD    SM111104
3405   ;          IF(SG.EQ.1.0)KLIQ=0.0                                           04980018
3406   .MFFEQ     SET      1
3407              JSR      .FFEQ
3408              .BYTE    0
3409              .WORD    -SG111104,.C000328
3410              ASL      A
3411              BCS      *+5
3412              JMP      .L000329
3413   .MFLTASG   SET      1
3414              JSR      .FLTASGN
3415              .BYTE    0
3416              .WORD    .C000330
3417              .WORD    KLIQ1104
3418   .L000329   EQU      *
3419   ;          IF(SG.EQ.1.0)GO TO 5                                            04990018
3420   .MFFEQ     SET      1
3421              JSR      .FFEQ
3422              .BYTE    0
3423              .WORD    -SG111104,.C000331
3424              ASL      A
3425              BCS      *+5
3426              JMP      .L000332
3427              JMP      .L000333
3428   .L000332   EQU      *
3429   ;                                                                         05000009
```

```
3430        .MFFSUB   SET    1
3431                  JSR    .FFSUB
3432                  .BYTE  0
3433                  .WORD  .C000334,SH111104
3434                  .WORD  .T000325
3435        .MFFDIV   SET    1
3436                  JSR    .FFDIV
3437                  .BYTE  0
3438                  .WORD  .T000325,-KBRINE04
3439                  .WORD  KLIQ1104
3440        ;                                                05010008
3441        .MFFDIV   SET    1
3442                  JSR    .FFDIV
3443                  .BYTE  0
3444                  .WORD  -SO111104,-KOIL1104
3445                  .WORD  .T000325
3446        .MFFADD   SET    1
3447                  JSR    .FFADD
3448                  .BYTE  0
3449                  .WORD  KLIQ1104,.T000325
3450                  .WORD  KLIQ1104
3451        ;                                                05020008
3452        .MFFDIV   SET    1
3453                  JSR    .FFDIV
3454                  .BYTE  0
3455                  .WORD  .C000337,KLIQ1104
3456                  .WORD  KLIQ1104
3457        ;                                                05030008
3458        .MFFEQ    SET    1
3459                  JSR    .FFEQ
3460                  .BYTE  0
3461                  .WORD  -SG111104,.C000338
3462                  ASL    A
3463                  BCS    *+5
3464                  JMP    .L000339
3465        .MFLTASG  SET    1
3466                  JSR    .FLTASGN
3467                  .BYTE  0
3468                  .WORD  KLIQ1104
3469                  .WORD  -KF111104
3470        .L000339  EQU    *
3471        ;         IF(SG.EQ.0.0)GO TO 10                  05040000
3472        .MFFEQ    SET    1
3473                  JSR    .FFEQ
3474                  .BYTE  0
3475                  .WORD  -SG111104,.C000340
3476                  ASL    A
3477                  BCS    *+5
3478                  JMP    .L000341
3479                  JMP    .L000342
3480        .L000341  EQU    *
3481        ;                                                05050000
3482        ;                                                05060018
3483        .L000333  EQU    *
3484        .MFFSUB   SET    1
3485                  JSR    .FFSUB
3486                  .BYTE  0
3487                  .WORD  .C000343,SH111104
3488                  .WORD  .T000336
3489        .MFFDIV   SET    1
3490                  JSR    .FFDIV
3491                  .BYTE  0
3492                  .WORD  .T000336,-KBRINE04
3493                  .WORD  .T000344
3494        .MFFDIV   SET    1
3495                  JSR    .FFDIV
3496                  .BYTE  0
3497                  .WORD  -SG111104,-KGAS1104
3498                  .WORD  .T000325
3499        .MFFDIV   SET    1
3500                  JSR    .FFDIV
3501                  .BYTE  0
3502                  .WORD  -SO111104,-KOIL1104
3503                  .WORD  .T000345
3504        .MFFADD   SET    1
3505                  JSR    .FFADD
3506                  .BYTE  0
3507                  .WORD  .T000325,.T000344
3508                  .WORD  .T000336
```

```
3509  .MFFADD  SET   1
3510           JSR   .FFADD
3511           .BYTE 0
3512           .WORD .T000336,.T000345
3513           .WORD U1111104
3514  ;                                                                 05070000
3515  .MFFDIV  SET   1
3516           JSR   .FFDIV
3517           .BYTE 0
3518           .WORD .C000346,U1111104
3519           .WORD -KF111104
3520  ;
3521  .L000342 EQU   *
3522  .MFFSUB  SET   1
3523           JSR   .FFSUB
3524           .BYTE 0
3525           .WORD .C000347,-PHI111104
3526           .WORD .T000325
3527  .MFFMUL  SET   1
3528           JSR   .FFMUL
3529           .BYTE 0
3530           .WORD -SU111104,-RHOOIL04
3531           .WORD .T000345
3532  .MFFMUL  SET   1
3533           JSR   .FFMUL
3534           .BYTE 0
3535           .WORD -SG111104,-RHOGAS04
3536           .WORD .T000344
3537  .MFFSUB  SET   1
3538           JSR   .FFSUB
3539           .BYTE 0
3540           .WORD .C000349,SW111104
3541           .WORD .T000350
3542  .MFFMUL  SET   1
3543           JSR   .FFMUL
3544           .BYTE 0
3545           .WORD .T000350,-RHOBRN04
3546           .WORD .T000351
3547  .MFFADD  SET   1
3548           JSR   .FFADD
3549           .BYTE 0
3550           .WORD .T000344,.T000345
3551           .WORD .T000348
3552  .MFFADD  SET   1
3553           JSR   .FFADD
3554           .BYTE 0
3555           .WORD .T000348,.T000351
3556           .WORD .T000344
3557  .MFFMUL  SET   1
3558           JSR   .FFMUL
3559           .BYTE 0
3560           .WORD -PHI111104,.T000344
3561           .WORD .T000345
3562  .MFFMUL  SET   1
3563           JSR   .FFMUL
3564           .BYTE 0
3565           .WORD .T000325,-RHOGRN04
3566           .WORD .T000336
3567  .MFFADD  SET   1
3568           JSR   .FFADD
3569           .BYTE 0
3570           .WORD .T000336,.T000345
3571           .WORD -RHOB1104
3572  ;        RETURN                                                    05080000
3573           JMP   .R000324                                            05090000
3574  ;        END                                                       05100000
3575  .R000324 RTS
3576  ;        SUBROUTINE BIOT(AA,KM,KF,PHI,KSTAR)                       05110010
3577  BIOT     EQU   *
3578  AA111105 EQU   BIOT.001
3579  KM111105 EQU   BIOT.002
3580  KF111105 EQU   BIOT.003
3581  PHI111105 EQU  BIOT.004
3582  KSTAR105 EQU   BIOT.005
3583  ; C      R.J. RUNGE  COFRC                                         05120000
3584  ; C      CALCULATES KSTAR FROM BIOT GASSMAN EQN. GIVEN AA=KA/KM,KM, 05130000
3585  ; C      KF=TOTAL FLUID MODULUS(INCL.GAS+LIQUID),FRACT. POROSITY=PHI. 05140000
3586  ; C                                                                05150000
3587  ; C      *                                                         05160000
3588  ;        IMPLICIT REAL(K)                                          05170000
3589  ;                                                                  05180000
```

```
3590    .MFFDIV   SET     1
3591              JSR     .FFDIV
3592              .BYTE   0
3593              .WORD   -KM111105,-KF111105
3594              .WORD   .T000353
3595    .MFFSUB   SET     1
3596              JSR     .FFSUB
3597              .BYTE   0
3598              .WORD   .T000353,.C000354
3599              .WORD   FO111105                                05190000
3600    ;
3601    .MFFMUL   SET     1
3602              JSR     .FFMUL
3603              .BYTE   0
3604              .WORD   FO111105,-PH111105
3605              .WORD   .T000358
3606    .MFFSUB   SET     1
3607              JSR     .FFSUB
3608              .BYTE   0
3609              .WORD   .T000358,-AA111105
3610              .WORD   .T000361
3611    .MFFADD   SET     1
3612              JSR     .FFADD
3613              .BYTE   0
3614              .WORD   .T000361,.C000362
3615              .WORD   .T000358
3616    .MFFDIV   SET     1
3617              JSR     .FFDIV
3618              .BYTE   0
3619              .WORD   .C000360,.T000358
3620              .WORD   .T000361
3621    .MFFSUB   SET     1
3622              JSR     .FFSUB
3623              .BYTE   0
3624              .WORD   .C000359,-AA111105
3625              .WORD   .T000353
3626    .MFFADD   SET     1
3627              JSR     .FFADD
3628              .BYTE   0
3629              .WORD   .T000353,.T000361
3630              .WORD   -AA111105
3631    ;                                                         05200000
3632    .MFFMUL   SET     1
3633              JSR     .FFMUL
3634              .BYTE   0
3635              .WORD   BB111105,-KM111105
3636              .WORD   -KSTAR105
3637    ;         RETURN                                          05210000
3638              JMP     .R000352
3639    ; C       *                                               05220000
3640    ;         END                                             05230000
3641    .R000352  RTS
3642    ;         SUBROUTINE NAME2(TITLE,NLINE,NC,NIN,NOUT)       05240029
3643    NAME2     EQU     *
3644    TITLE106  EQU     NAME2.01
3645    NLINE106  EQU     NAME2.02
3646    NC111106  EQU     NAME2.03
3647    NIN111106 EQU     NAME2.04
3648    NOUT11106 EQU     NAME2.05
3649    ; C       *                                               05250000
3650    ; C       R.J. RUNGE    CUFRC        (MODIFICATION OF 'NAME')  05260028
3651    ; C       EBIDIC STORED IN TITLE (M) M=20*NLINE           05270000
3652    ; C       READS IN 80 COL. HEADINGS (20A4) NLINE CARDS IN NUMBER.  05280028
3653    ; C       SEE BELOW IF NC < 0.                            05290028
3654    ;         DIMENSION TITLE(1)                              05300000
3655    ;         M=20*NLINE                                      05310000
3656    ; C       NIN=INPUT UNIT, USUALLY=5.                      05320000
3657    ; C       NOUT=OUTPUT UNIT,USUALLY=6.                     05330029
3658    ; C       READ(NIN,3,END=15)(TITLE(J),J=1,M)              05340027
3659    ; C     3 FORMAT(20A4)                                    05350000
3660    .MIMUL    SET     1
3661              JSR     .IMUL
3662              .BYTE   6
3663              .WORD   .C000364,-NLINE106
3664              .WORD   M111106
3665    ;         IF(NC.LT.0)GO TO 75                             05360000
3666              LDY     #1
3667              LDA     (NC111106),Y
3668              CMP     #0
3669              LDA     (NC111106)
```

```
3670              SBC     #0
3671              BMI     .L000369
3672              JMP     .L000366
3673   .L000369 EQU       *
3674              JMP     .L000370
3675   .L000368 EQU       *                                                          05370029
3676   ; C        WRITE (NOUT,1)                                                     05380000
3677   ; C      1 FORMAT(1H1 ///)                                                    05390029
3678   ; C        WRITE (NOUT,2)                                                     05400000
3679   ; C      2 FORMAT('           CHEVRON OIL FIELD RESEARCH CO. LA HABRA,        05410000
3680   ; C        * CALIFORNIA   90631      '  ////)                                 05420029
3681   ; C     75 WRITE (NOUT,4)(TITLE(J),J=1,M)                                     05430000
3682   ; C      4 FORMAT(1H 20A4)                                                    05440029
3683   ; C        WRITE (NOUT,9)                                                     05450000
3684   ; C      9 FORMAT(///' * * '///)                                              05460000
3685   ;       10 RETURN
3686   .L000371 EQU       *
3687              JMP     .R000363
3688   ; C     15 WRITE(NOUT,16)                                                     05470026
3689   ; C     16 FORMAT(///' * * * END OF PROBLEMS * * *   '  ////)                 05480000
3690   ;          STOP                                                               05490000
3691   .MSTOP    SET     1
3692              JSR     .STOP
3693              .DBYTE  0
3694   ;          END                                                                05500000
3695   .R000363 RTS
3696   ;          SUBROUTINE LIDOS(NP,DGRAD,LITH,Z,PSTAR,KM,GM,KF,PHI,A,B,G )         05510031
3697   LIDOS     EQU     *
3698   NP|||||07 EQU     LIDOS.01
3699   DGRAD|07  EQU     LIDOS.02
3700   LITH|||07 EQU     LIDOS.03
3701   Z|||||07  EQU     LIDOS.04
3702   PSTAR|07  EQU     LIDOS.05
3703   KM||||07  EQU     LIDOS.06
3704   GM||||07  EQU     LIDOS.07
3705   KF||||07  EQU     LIDOS.08
3706   PHI|||07  EQU     LIDOS.09
3707   A|||||07  EQU     LIDOS.10
3708   B|||||07  EQU     LIDOS.11
3709   G|||||07  EQU     LIDOS.12
3710   ; C                                                                           05520001
3711   ; C        R.J.RUNGE               COFRC.                                     05530028
3712   ; C        COMPUTES A,B,G FOR LIMESTONE AND DOLOSTONE LITHOLOGIES.             05540001
3713   ; C        SEE RUNGE,R.J &THOMPSON,O.D TECH MEMO                               05550001
3714   ; C        NP=NO. OF PRESSURES=6                                               05560001
3715   ; C        DGRAD=DIFFERENTIAL PRESSURE GRADIENT (KPSI/KFT)                     05570001
3716   ; C        LITH=2 (LIMESTONES)  LITH=3(DOLOSTONES)                             05580001
3717   ; C        Z=DEPTH IN KILOFT.                                                  05590001
3718   ; C        PSTAR=P*=P-WAVE MODULUS.                                            05600001
3719   ; C        KM,GM=SOLID MATRIX MODULI (KB.)                                     05610001
3720   ; C        KF=FLUID MODULUS                                                    05620001
3721   ; C        PHI=POROSITY (FRACTION)                                             05630031
3722   ; C        A=KA/KM, B=K*/KM , G=G*/GM ARE COMPUTED AND RETURNED.               05640001
3723   ; C        AK,BK,AG,BG ARE INTERPOLATED BETWEEN ABLKL,..ABLKD..ETC.            05650001
3724   ; C                                                                           05660001
3725   ;          IMPLICIT REAL(K)                                                   05670001
3726   ;                                                                             05680001
3727   ;                                                                             05690001
3728   ;                                                                             05700001
3729   ;                                                                             05710001
3730   ;                                                                             05720031
3731   ;                                                                             05730001
3732   ;                                                                             05740001
3733   ;                                                                             05750001
3734   ;                                                                             05760031
3735   ; C        IF(LITH.NE.2 .AND. LITH.NE.3)WRITE(NOUT,10)LITH                     05770026
3736   ; C     10 FORMAT(/3X,' LITH=',I3,' IN LIDOS SUBROUTINE-LOGICAL ERROR' //      05780023
3737   ;          IF(LITH.NE.2 .AND. LITH.NE.3)GO TO 20                               05790023
3738              LDY     #1
3739              LDA     (LITH|||07),Y
3740              CMP     #3
3741              BNE     .L000376
3742              LDA     (LITH|||07)
3743              CMP     #0
3744              BEQ     .L000375
3745   .L000376  LDA     #$0H
3746              BNE     *+4
3747   .L000375  LDA     #0
3748              LDY     #1
```

```
3749              STA     .T000374
3750              LDA     (LITHI107),Y
3751              CMP     #2
3752              BNE     .L000378
3753              LDA     (LITHI107)
3754              CMP     #0
3755              BEQ     .L000377
3756  .L000378    LDA     #80H
3757              BNE     *+4
3758  .L000377    LDA     #0
3759              AND     .T000374
3760              ASL     A
3761              BCS     *+5
3762              JMP     .L000380
3763              JMP     .L000381
3764  .L000380 EQU        *
3765  ;         IF(LITH.EQ.2)CALL INTERP(NP,ABLKL,BBLKL,ASHRL,BSHRL,DP,DGRAD,Z,05800001
3766              LDY     #1
3767              LDA     (LITHI107),Y
3768              CMP     #2
3769              BNE     .L000382
3770              LDA     (LITHI107)
3771              CMP     #0
3772              BNE     .L000382
3773  ;          *BK,AG,BG)                                                   05810001
3774              LDA     #BGI11107 MOD .M
3775              STA     INTERP.2
3776              LDA     #BGI11107/256
3777              STA     INTERP.2+1
3778              LDA     #AGI11107 MOD .M
3779              STA     INTERP.1
3780              LDA     #AGI11107/256
3781              STA     INTERP.1+1
3782              LDA     #BKI11107 MOD .M
3783              STA     INTERP.0
3784              LDA     #BKI11107/256
3785              STA     INTERP.0+1
3786              LDA     #AKI11107 MOD .M
3787              STA     INTERP.9
3788              LDA     #AKI11107/256
3789              STA     INTERP.9+1
3790              LDA     ZI11107
3791              STA     INTERP.8
3792              LDA     ZI11107+1
3793              STA     INTERP.8+1
3794              LDA     DGRADI07
3795              STA     INTERP.7
3796              LDA     DGRADI07+1
3797              STA     INTERP.7+1
3798              LDA     #DPI11107 MOD .M
3799              STA     INTERP.6
3800              LDA     #DPI11107/256
3801              STA     INTERP.6+1
3802              LDA     #BSHRLI07 MOD .M
3803              STA     INTERP.5
3804              LDA     #BSHRLI07/256
3805              STA     INTERP.5+1
3806              LDA     #ASHRLI07 MOD .M
3807              STA     INTERP.4
3808              LDA     #ASHRLI07/256
3809              STA     INTERP.4+1
3810              LDA     #BBLKLI07 MOD .M
3811              STA     INTERP.3
3812              LDA     #BBLKLI07/256
3813              STA     INTERP.3+1
3814              LDA     #ABLKLI07 MOD .M
3815              STA     INTERP.2
3816              LDA     #ABLKLI07/256
3817              STA     INTERP.2+1
3818              LDA     NPI11107
3819              STA     INTERP.1
3820              LDA     NPI11107+1
3821              STA     INTERP.1+1
3822              JSR     INTERP
3823  .L000382 EQU        *
3824  ;          IF(LITH.EQ.2)GO TO 5                                         05820001
3825              LDY     #1
3826              LDA     (LITHI107),Y
3827              CMP     #2
3828              BNE     .L000384
3829              LDA     (LITHI107)
```

```
3830              CMP     #0
3831              BNE     .L000384
3832              JMP     .L000386
3833    .L000384  EQU     *
3834    ;         IF(LITH.EQ.3)CALL INTERP(NP,ABLKD,BBLKD,ASHRD,BSHRD,DP,DGRAD,Z,       05830001
3835              LDY     #1
3836              LDA     (LITH1107),Y
3837              CMP     #3
3838              BNE     .L000387
3839              LDA     (LITH1107)
3840              CMP     #0
3841              BNE     .L000387
3842    ;         *BK,AG,BG)                                                            05840001
3843              LDA     #BG111107 MOD .M
3844              STA     INTERP.2
3845              LDA     #BG111107/256
3846              STA     INTERP.2+1
3847              LDA     #AG111107 MOD .M
3848              STA     INTERP.1
3849              LDA     #AG111107/256
3850              STA     INTERP.1+1
3851              LDA     #BK111107 MOD .M
3852              STA     INTERP.0
3853              LDA     #BK111107/256
3854              STA     INTERP.0+1
3855              LDA     #AK111107 MOD .M
3856              STA     INTERP.9
3857              LDA     #AK111107/256
3858              STA     INTERP.9+1
3859              LDA     Z111107
3860              STA     INTERP.8
3861              LDA     Z111107+1
3862              STA     INTERP.8+1
3863              LDA     DGRAD107
3864              STA     INTERP.7
3865              LDA     DGRAD107+1
3866              STA     INTERP.7+1
3867              LDA     #DP111107 MOD .M
3868              STA     INTERP.6
3869              LDA     #DP111107/256
3870              STA     INTERP.6+1
3871              LDA     #BSHRD107 MOD .M
3872              STA     INTERP.5
3873              LDA     #BSHRD107/256
3874              STA     INTERP.5+1
3875              LDA     #ASHRD107 MOD .M
3876              STA     INTERP.4
3877              LDA     #ASHRD107/256
3878              STA     INTERP.4+1
3879              LDA     #BBLKD107 MOD .M
3880              STA     INTERP.3
3881              LDA     #BBLKD107/256
3882              STA     INTERP.3+1
3883              LDA     #ABLKD107 MOD .M
3884              STA     INTERP.2
3885              LDA     #ABLKD107/256
3886              STA     INTERP.2+1
3887              LDA     NP111107
3888              STA     INTERP.1
3889              LDA     NP111107+1
3890              STA     INTERP.1+1
3891              JSR     INTERP
3892    .L000387  EQU     *
3893    ;      5  G= (AG*PSTAR+BG)/GM                                                   05850001
3894    .L000386  EQU     *
3895    .MFFMUL   SET     1
3896              JSR     .FFMUL
3897              .BYTE   0
3898              .WORD   AG111107,-PSTAR107
3899              .WORD   .T000389
3900    .MFFADD   SET     1
3901              JSR     .FFADD
3902              .BYTE   0
3903              .WORD   .T000389,BG111107
3904              .WORD   .T000393
3905    .MFFDIV   SET     1
3906              JSR     .FFDIV
3907              .BYTE   0
3908              .WORD   .T000393,-GM111107
```

```
3909            .WORD -G111107                                          05860001
3910    ;
3911    .MFFMUL SET     1
3912            JSR     .FFMUL
3913            .BYTE 0
3914            .WORD AK111107,-PSTAR107
3915            .WORD .T000389
3916    .MFFADD SET     1
3917            JSR     .FFADD
3918            .BYTE 0
3919            .WORD .T000389,BK111107
3920            .WORD .T000393
3921    .MFFDIV SET     1
3922            JSR     .FFDIV
3923            .BYTE 0
3924            .WORD .T000393,-KM111107
3925            .WORD -B111107                                          05870001
3926    ;
3927    .MFFDIV SET     1
3928            JSR     .FFDIV
3929            .BYTE 0
3930            .WORD -KM111107,-KF111107
3931            .WORD .T000389
3932    .MFFSUB SET     1
3933            JSR     .FFSUB
3934            .BYTE 0
3935            .WORD .T000389,.C000394
3936            .WORD F0111107                                          05880031
3937    ;
3938    .MFFMUL SET     1
3939            JSR     .FFMUL
3940            .BYTE 0
3941            .WORD F0111107,-PH111107
3942            .WORD .T000389
3943    .MFFADD SET     1
3944            JSR     .FFADD
3945            .BYTE 0
3946            .WORD .T000389,.C000395
3947            .WORD .T000393
3948    .MFFMUL SET     1
3949            JSR     .FFMUL
3950            .BYTE 0
3951            .WORD .T000393,-B111107
3952            .WORD .T000389
3953    .MFFMUL SET     1
3954            JSR     .FFMUL
3955            .BYTE 0
3956            .WORD F0111107,-PH111107
3957            .WORD .T000397
3958    .MFFADD SET     1
3959            JSR     .FFADD
3960            .BYTE 0
3961            .WORD .T000397,-B111107
3962            .WORD .T000398
3963    .MFFSUB SET     1
3964            JSR     .FFSUB
3965            .BYTE 0
3966            .WORD .T000398,.C000399
3967            .WORD .T000397
3968    .MFFSUB SET     1
3969            JSR     .FFSUB
3970            .BYTE 0
3971            .WORD .T000389,.C000396
3972            .WORD .T000393
3973    .MFFDIV SET     1
3974            JSR     .FFDIV
3975            .BYTE 0
3976            .WORD .T000393,.T000397
3977            .WORD -A111107
3978    ;   20 RETURN                                                   05890001
3979    .L000381 EQU    *
3980            JMP     .R000372
3981    ;       END                                                     05900001
3982    .R000372 RTS
3983    ;       SUBROUTINE INTERP(N,ABLK,BBLK,ASHR,BSHR,DP,DGRAD,Z,AK,BK,AG,BG 05910001
3984    INTERP  EQU     *
3985    N111108  EQU    INTERP.1
3986    ABLK1108 EQU    INTERP.2
3987    BBLK1108 EQU    INTERP.3
```

```
3988        ASHRI108 EQU     INTERP.4
3989        BSHRI108 EQU     INTERP.5
3990        DPIII108 EQU     INTERP.6
3991        DGRADI08 EQU     INTERP.7
3992        ZIIIII08 EQU     INTERP.8
3993        AKIIII08 EQU     INTERP.9
3994        BKIIII08 EQU     INTERP.0
3995        AGIIII08 EQU     INTERP.1
3996        BGIIII08 EQU     INTERP.2
3997     ; C     *                                                              05920001
3998     ; C     R.J. RUNGE    COFRC                                            05930001
3999     ; C     Z=DEPTH IN KILOFT                                              05940030
4000     ; C     DGRAD=DIFFERENTIAL GRADIENT=OVGRAD-FGRAD  (KPSI/KFT)            05950030
4001     ; C     ABLK=AK,BBLK=BK, ASHR=AG, BSHR=BG=COEFFICIENTS FOR DOUBLE       05960001
4002     ; C     EXPONENTIAL  REGRESSION FMLAS (RJR-COT,                        05970030
4003     ; C     OR SOME OTHER POINTS OF INTERPOLATION IF DESIRED               05980030
4004     ; C     WE HAVE ABLK(J),BBLK(J),ASHR(J),BSHR(J) FOR EACH DIFFERENTIAL  05990001
4005     ; C     PRESSURE DP(J) (KPSI), J=1,N=NO. OF DIFF. PRESSURES             06000001
4006     ; C     EXTRAPOLATIONS OR INTERPOLATIONS ARE PERFORMED FOR ANY GIVEN    06010001
4007     ; C     COMPUTED QUANTITIES-                                           06020030
4008     ; C     DIFF. PRESS., PDIFF (KPSI) TO OBTAIN AK,BK,AG,BG.              06030001
4009     ; C     PRESSURES IN KPSI, AK,BK,AG,BG.                                06040030
4010     ; C     *                                                              06050001
4011     ;       IMPLICIT REAL (K)                                              06060001
4012     ;       DIMENSION ABLK(20),BBLK(20),ASHR(20),BSHR(20),DP(20)           06070001
4013     ;                                                                     06080001
4014     .MFFMUL  SET     1
4015             JSR     .FFMUL
4016             .BYTE   0
4017             .WORD   -DGRADI08,-ZIIIII08
4018             .WORD   PDIFFI08
4019                                                                            06090001
4020             LDY     #1
4021             LDA     (NIIIII08),Y
4022             SEC
4023             SBC     #1
4024             ASL     A
4025             ASL     A
4026             ADC     DPIII108
4027             STA     .T000403
4028             LDA     #0
4029             ADC     DPIII108+1
4030             STA     .T000403+1
4031     .MFFLE   SET     1
4032             JSR     .FFLE
4033             .BYTE   0
4034             .WORD   PDIFFI08,-.T000403
4035             STA     .T000402
4036             LDA     #1
4037             SEC
4038             SBC     #1
4039             ASL     A
4040             ASL     A
4041             ADC     DPIII108
4042             STA     .T000403
4043             LDA     #0
4044             ADC     DPIII108+1
4045             STA     .T000403+1
4046     .MFFGE   SET     1
4047             JSR     .FFGE
4048             .BYTE   0
4049             .WORD   PDIFFI08,-.T000403
4050             AND     .T000402
4051             ASL     A
4052             BCS     *+5
4053             JMP     .L000405
4054             JMP     .L000406
4055     .L000405 EQU     *                                                      06100015
4056     ;
4057             LDA     #1
4058             SEC
4059             SBC     #1
4060             ASL     A
4061             ASL     A
4062             ADC     DPIII108
4063             STA     .T000402
4064             LDA     #0
4065             ADC     DPIII108+1
4066             STA     .T000402+1
4067     .MFFLT   SET     1
4068             JSR     .FFLT
4069             .BYTE   0
```

```
4070              .WORD PDIFF1108,-.T000402
4071              ASL   A
4072              BCS   *+5
4073              JMP   .L000407
4074              JMP   .L000408
4075   .L000407 EQU   *
4076   ;                                                           06110001
4077              LDY   #1
4078              LDA   (N111108),Y
4079              SEC
4080              SBC   #1
4081              STA   .T000401
4082              LDA   .T000401
4083              SEC
4084              SBC   #1
4085              ASL   A
4086              ASL   A
4087              ADC   DP111108
4088              STA   .T000402
4089              LDA   #0
4090              ADC   DP111108+1
4091              STA   .T000402+1
4092              LDY   #1
4093              LDA   (N111108),Y
4094              SEC
4095              SBC   #1
4096              ASL   A
4097              ASL   A
4098              ADC   DP111108
4099              STA   .T000401
4100              LDA   #0
4101              ADC   DP111108+1
4102              STA   .T000401+1
4103   .MFFSUB  SET   1
4104              JSR   .FFSUB
4105              .BYTE 0
4106              .WORD -.T000401,-.T000402
4107              .WORD DELP1108
4108   ;                                                           06120001
4109              LDY   #1
4110              LDA   (N111108),Y
4111              SEC
4112              SBC   #1
4113              ASL   A
4114              ASL   A
4115              ADC   DP111108
4116              STA   .T000401
4117              LDA   #0
4118              ADC   DP111108+1
4119              STA   .T000401+1
4120   .MFFSUB  SET   1
4121              JSR   .FFSUB
4122              .BYTE 0
4123              .WORD PDIFF1108,-.T000401
4124              .WORD PEXT1108
4125   ;                                                           06130001
4126              LDY   #1
4127              LDA   (N111108),Y
4128              SEC
4129              SBC   #1
4130              STA   .T000401
4131              LDA   .T000401
4132              SEC
4133              SBC   #1
4134              ASL   A
4135              ASL   A
4136              ADC   ABLK1108
4137              STA   .T000402
4138              LDA   #0
4139              ADC   ABLK1108+1
4140              STA   .T000402+1
4141              LDY   #1
4142              LDA   (N111108),Y
4143              SEC
4144              SBC   #1
4145              ASL   A
4146              ASL   A
4147              ADC   ABLK1108
4148              STA   .T000401
```

```
4149              LDA     #0
4150              ADC     ABLK1108+1
4151              STA     .T000401+1
4152    .MFFSUB   SET     1
4153              JSR     .FFSUB
4154              .BYTE   0
4155              .WORD   -.T000401,-.T000402
4156              .WORD   .T000409
4157    .MFFDIV   SET     1
4158              JSR     .FFDIV
4159              .BYTE   0
4160              .WORD   .T000409,DELP1108
4161              .WORD   S1111108
4162    ;                                                                06140001
4163    .MFFMUL   SET     1
4164              JSR     .FFMUL
4165              .BYTE   0
4166              .WORD   S1111108,PEXT1108
4167              .WORD   .T000401
4168              LDY     #1
4169              LDA     (N1111108),Y
4170              SEC
4171              SBC     #1
4172              ASL     A
4173              ASL     A
4174              ADC     ABLK1108
4175              STA     .T000402
4176              LDA     #0
4177              ADC     ABLK1108+1
4178              STA     .T000402+1
4179    .MFFADD   SET     1
4180              JSR     .FFADD
4181              .BYTE   0
4182              .WORD   .T000401,-.T000402
4183              .WORD   -AK111108
4184    ;                                                                06150001
4185              LDY     #1
4186              LDA     (N1111108),Y
4187              SEC
4188              SBC     #1
4189              STA     .T000401
4190              LDA     .T000401
4191              SEC
4192              SBC     #1
4193              ASL     A
4194              ASL     A
4195              ADC     BBLK1108
4196              STA     .T000402
4197              LDA     #0
4198              ADC     BBLK1108+1
4199              STA     .T000402+1
4200              LDY     #1
4201              LDA     (N1111108),Y
4202              SEC
4203              SBC     #1
4204              ASL     A
4205              ASL     A
4206              ADC     BBLK1108
4207              STA     .T000401
4208              LDA     #0
4209              ADC     BBLK1108+1
4210              STA     .T000401+1
4211    .MFFSUB   SET     1
4212              JSR     .FFSUB
4213              .BYTE   0
4214              .WORD   -.T000401,-.T000402
4215              .WORD   .T000409
4216    .MFFDIV   SET     1
4217              JSR     .FFDIV
4218              .BYTE   0
4219              .WORD   .T000409,DELP1108
4220              .WORD   S1111108
4221    ;                                                                06160001
4222    .MFFMUL   SET     1
4223              JSR     .FFMUL
4224              .BYTE   0
4225              .WORD   S1111108,PEXT1108
4226              .WORD   .T000401
4227              LDY     #1
```

```
4228            LDA     (NI111108),Y
4229            SEC
4230            SBC     #1
4231            ASL     A
4232            ASL     A
4233            ADC     BBLK1108
4234            STA     .T000402
4235            LDA     #0
4236            ADC     BBLK1108+1
4237            STA     .T000402+1
4238   .MFFADD  SET     1
4239            JSR     .FFADD
4240            .BYTE   0
4241            .WORD   .T000401,-.T000402
4242            .WORD   -BK111108
4243   ;
4244            LDY     #1
4245            LDA     (NI111108),Y
4246            SEC
4247            SBC     #1
4248            STA     .T000401
4249            LDA     .T000401
4250            SEC
4251            SBC     #1
4252            ASL     A
4253            ASL     A
4254            ADC     ASHR1108
4255            STA     .T000402
4256            LDA     #0
4257            ADC     ASHR1108+1
4258            STA     .T000402+1
4259            LDY     #1
4260            LDA     (NI111108),Y
4261            SEC
4262            SBC     #1
4263            ASL     A
4264            ASL     A
4265            ADC     ASHR1108
4266            STA     .T000401
4267            LDA     #0
4268            ADC     ASHR1108+1
4269            STA     .T000401+1
4270   .MFFSUB  SET     1
4271            JSR     .FFSUB
4272            .BYTE   0
4273            .WORD   -.T000401,-.T000402
4274            .WORD   .T000409
4275   .MFFDIV  SET     1
4276            JSR     .FFDIV
4277            .BYTE   0
4278            .WORD   .T000409,DELP1108
4279            .WORD   S111108
4280   ;
4281   .MFFMUL  SET     1
4282            JSR     .FFMUL
4283            .BYTE   0
4284            .WORD   S111108,PEXT1108
4285            .WORD   .T000401
4286            LDY     #1
4287            LDA     (NI111108),Y
4288            SEC
4289            SBC     #1
4290            ASL     A
4291            ASL     A
4292            ADC     ASHR1108
4293            STA     .T000402
4294            LDA     #0
4295            ADC     ASHR1108+1
4296            STA     .T000402+1
4297   .MFFADD  SET     1
4298            JSR     .FFADD
4299            .BYTE   0
4300            .WORD   .T000401,-.T000402
4301            .WORD   -AG111108
4302   ;
4303            LDY     #1
4304            LDA     (NI111108),Y
4305            SEC
4306            SBC     #1
4307            STA     .T000401
4308            LDA     .T000401
4309            SEC
```

```
4310            SBC     #1
4311            ASL     A
4312            ASL     A
4313            ADC     BSHRI108
4314            STA     .T000402
4315            LDA     #0
4316            ADC     BSHRI108+1
4317            STA     .T000402+1
4318            LDY     #1
4319            LDA     (NI111108),Y
4320            SEC
4321            SBC     #1
4322            ASL     A
4323            ASL     A
4324            ADC     BSHRI108
4325            STA     .T000401
4326            LDA     #0
4327            ADC     BSHRI108+1
4328            STA     .T000401+1
4329  .MFFSUB   SET     1
4330            JSR     .FFSUB
4331            .BYTE   0
4332            .WORD   -.T000401,-.T000402
4333            .WORD   .T000409
4334  .MFFDIV   SET     1
4335            JSR     .FFDIV
4336            .BYTE   0
4337            .WORD   .T000409,DELPI108
4338            .WORD   SI111108
4339        ;                                                           06200001
4340  .MFFMUL   SET     1
4341            JSR     .FFMUL
4342            .BYTE   0
4343            .WORD   SI111108,PEXTI108
4344            .WORD   .T000401
4345            LDY     #1
4346            LDA     (NI111108),Y
4347            SEC
4348            SBC     #1
4349            ASL     A
4350            ASL     A
4351            ADC     BSHRI108
4352            STA     .T000402
4353            LDA     #0
4354            ADC     BSHRI108+1
4355            STA     .T000402+1
4356  .MFFADD   SET     1
4357            JSR     .FFADD
4358            .BYTE   0
4359            .WORD   .T000401,-.T000402
4360            .WORD   -BGI11108
4361       ;    GO TO 100                                                06210001
4362            JMP     .L000410
4363       ;    30 DELP=DP(2)-DP(1)                                      06220001
4364  .L000408  EQU     *
4365            LDA     #1
4366            SEC
4367            SBC     #1
4368            ASL     A
4369            ASL     A
4370            ADC     DPI11108
4371            STA     .T000401
4372            LDA     #0
4373            ADC     DPI11108+1
4374            STA     .T000401+1
4375            LDA     #2
4376            SEC
4377            SBC     #1
4378            ASL     A
4379            ASL     A
4380            ADC     DPI11108
4381            STA     .T000402
4382            LDA     #0
4383            ADC     DPI11108+1
4384            STA     .T000402+1
4385  .MFFSUB   SET     1
4386            JSR     .FFSUB
4387            .BYTE   0
4388            .WORD   -.T000402,-.T000401
```

```
4389              .WORD DELP1108
4390      ;                                                          06230001
4391              LDA   #1
4392              SEC
4393              SBC   #1
4394              ASL   A
4395              ASL   A
4396              ADC   DP111108
4397              STA   .T000402
4398              LDA   #0
4399              ADC   DP111108+1
4400              STA   .T000402+1
4401    .MFFSUB   SET   1
4402              JSR   .FFSUB
4403              .BYTE 0
4404              .WORD -.T000402,PDIFF108
4405              .WORD PEXT1108
4406      ;                                                          06240001
4407              LDA   #2
4408              SEC
4409              SBC   #1
4410              ASL   A
4411              ASL   A
4412              ADC   ABLK1108
4413              STA   .T000402
4414              LDA   #0
4415              ADC   ABLK1108+1
4416              STA   .T000402+1
4417              LDA   #1
4418              SEC
4419              SBC   #1
4420              ASL   A
4421              ASL   A
4422              ADC   ABLK1108
4423              STA   .T000403
4424              LDA   #0
4425              ADC   ABLK1108+1
4426              STA   .T000403+1
4427    .MFFSUB   SET   1
4428              JSR   .FFSUB
4429              .BYTE 0
4430              .WORD -.T000403,-.T000402
4431              .WORD .T000401
4432    .MFFDIV   SET   1
4433              JSR   .FFDIV
4434              .BYTE 0
4435              .WORD .T000401,DELP1108
4436              .WORD S111108
4437      ;                                                          06250001
4438    .MFFMUL   SET   1
4439              JSR   .FFMUL
4440              .BYTE 0
4441              .WORD S111108,PEXT1108
4442              .WORD .T000401
4443              LDA   #1
4444              SEC
4445              SBC   #1
4446              ASL   A
4447              ASL   A
4448              ADC   ABLK1108
4449              STA   .T000402
4450              LDA   #0
4451              ADC   ABLK1108+1
4452              STA   .T000402+1
4453    .MFFADD   SET   1
4454              JSR   .FFADD
4455              .BYTE 0
4456              .WORD .T000401,-.T000402
4457              .WORD -AK111108
4458      ;                                                          06260001
4459              LDA   #2
4460              SEC
4461              SBC   #1
4462              ASL   A
4463              ASL   A
4464              ADC   BBLK1108
4465              STA   .T000402
4466              LDA   #0
4467              ADC   BBLK1108+1
```

```
4468            STA     .T000402+1
4469            LDA     #1
4470            SEC
4471            SBC     #1
4472            ASL     A
4473            ASL     A
4474            ADC     BBLK1108
4475            STA     .T000403
4476            LDA     #0
4477            ADC     BBLK1108+1
4478            STA     .T000403+1
4479   .MFFSUB  SET     1
4480            JSR     .FFSUB
4481            .BYTE   0
4482            .WORD   -.T000403,-.T000402
4483            .WORD   .T000401
4484   .MFFDIV  SET     1
4485            JSR     .FFDIV
4486            .BYTE   0
4487            .WORD   .T000401,DELP1108
4488            .WORD   S111110R
4489        ;                                                               06270001
4490   .MFFMUL  SET     1
4491            JSR     .FFMUL
4492            .BYTE   0
4493            .WORD   S1111108,PEXT1108
4494            .WORD   .T000401
4495            LDA     #1
4496            SEC
4497            SBC     #1
4498            ASL     A
4499            ASL     A
4500            ADC     BRLK1108
4501            STA     .T000402
4502            LDA     #0
4503            ADC     BBLK1108+1
4504            STA     .T000402+1
4505   .MFFADD  SET     1
4506            JSR     .FFADD
4507            .BYTE   0
4508            .WORD   .T000401,-.T000402
4509            .WORD   -BK111108
4510        ;                                                               06280001
4511            LDA     #2
4512            SEC
4513            SBC     #1
4514            ASL     A
4515            ASL     A
4516            ADC     ASHR1108
4517            STA     .T000402
4518            LDA     #0
4519            ADC     ASHR1108+1
4520            STA     .T000402+1
4521            LDA     #1
4522            SEC
4523            SBC     #1
4524            ASL     A
4525            ASL     A
4526            ADC     ASHR1108
4527            STA     .T000403
4528            LDA     #0
4529            ADC     ASHR1108+1
4530            STA     .T000403+1
4531   .MFFSUB  SET     1
4532            JSR     .FFSUB
4533            .BYTE   0
4534            .WORD   -.T000403,-.T000402
4535            .WORD   .T000401
4536   .MFFDIV  SET     1
4537            JSR     .FFDIV
4538            .BYTE   0
4539            .WORD   .T000401,DELP1108
4540            .WORD   S1111108
4541        ;                                                               06290001
4542   .MFFMUL  SET     1
4543            JSR     .FFMUL
4544            .BYTE   0
4545            .WORD   S1111108,PEXT1108
4546            .WORD   .T000401
4547            LDA     #1
4548            SEC
4549            SBC     #1
```

```
4550            ASL     A
4551            ASL     A
4552            ADC     ASHRI108
4553            STA     .T000402
4554            LDA     #0
4555            ADC     ASHRI108+1
4556            STA     .T000402+1
4557   .MFFADD  SET     1
4558            JSR     .FFADD
4559            .BYTE   0
4560            .WORD   .T000401,-.T000402
4561            .WORD   -AG111108                                    06300001
4562   ;
4563            LDA     #2
4564            SEC
4565            SBC     #1
4566            ASL     A
4567            ASL     A
4568            ADC     BSHRI108
4569            STA     .T000402
4570            LDA     #0
4571            ADC     BSHRI108+1
4572            STA     .T000402+1
4573            LDA     #1
4574            SEC
4575            SBC     #1
4576            ASL     A
4577            ASL     A
4578            ADC     BSHRI108
4579            STA     .T000403
4580            LDA     #0
4581            ADC     BSHRI108+1
4582            STA     .T000403+1
4583   .MFFSUB  SET     1
4584            JSR     .FFSUB
4585            .BYTE   0
4586            .WORD   -.T000403,-.T000402
4587            .WORD   .T000401
4588   .MFFDIV  SET     1
4589            JSR     .FFDIV
4590            .BYTE   0
4591            .WORD   .T000401,DELPI108
4592            .WORD   S1111108                                     06310001
4593   ;
4594   .MFFMUL  SET     1
4595            JSR     .FFMUL
4596            .BYTE   0
4597            .WORD   S1111108,PEXT1108
4598            .WORD   .T000401
4599            LDA     #1
4600            SEC
4601            SBC     #1
4602            ASL     A
4603            ASL     A
4604            ADC     BSHRI108
4605            STA     .T000402
4606            LDA     #0
4607            ADC     BSHRI108+1
4608            STA     .T000402+1
4609   .MFFADD  SET     1
4610            JSR     .FFADD
4611            .BYTE   0
4612            .WORD   .T000401,-.T000402
4613            .WORD   -BG111108
4614   ;        GO TO 100                                            06320001
4615            JMP     .L000410
4616   ;    50 JJ=1                                                  06330001
4617   .L000406 EQU     *
4618            LDA     #0
4619            STA     JJ111108
4620            LDA     #1
4621            STA     JJ111108+1
4622   ;                                                             06340001
4623            LDY     #1
4624            LDA     (N111108),Y
4625            SEC
4626            SBC     #1
4627            STA     NM111108+1
4628            LDA     (N111108)
```

```
4629            SBC    #0
4630            STA    NM111108                                06350001
4631     ;      DO 60 J=1,NM1
4632            LDA    #0
4633            STA    J111108
4634            LDA    #1
4635            STA    J111108+1
4636            JMP    .L000413
4637    .L000411 EQU   *
4638            LDA    J111108+1
4639            CLC
4640            ADC    #1
4641            STA    J111108+1
4642            LDA    J111108
4643            ADC    #0
4644            STA    J111108
4645            LDA    NM111108+1
4646            CMP    J111108+1
4647            LDA    NM111108
4648            SBC    J111108
4649            BMI    .L000412
4650    .L000413 EQU   *                                       06360001
4651     ;      JP1=J+1
4652            LDA    J111108+1
4653            CLC
4654            ADC    #1
4655            STA    JP111108+1
4656            LDA    J111108
4657            ADC    #0
4658            STA    JP111108
4659     ;      IF(PDIFF.GE.DP(J) .AND. PDIFF.LE.DP(JP1))GO TO 70   06370001
4660            LDA    JP111108+1
4661            SEC
4662            SBC    #1
4663            ASL    A
4664            ASL    A
4665            ADC    DP111108
4666            STA    .T000403
4667            LDA    #0
4668            ADC    DP111108+1
4669            STA    .T000403+1
4670    .MFFLE  SET    1
4671            JSR    .FFLE
4672            .BYTE  0
4673            .WORD  PDIFF108,-.T000403
4674            STA    .T000402
4675            LDA    J111108+1
4676            SEC
4677            SBC    #1
4678            ASL    A
4679            ASL    A
4680            ADC    DP111108
4681            STA    .T000403
4682            LDA    #0
4683            ADC    DP111108+1
4684            STA    .T000403+1
4685    .MFFGE  SET    1
4686            JSR    .FFGE
4687            .BYTE  0
4688            .WORD  PDIFF108,-.T000403
4689            AND    .T000402
4690            ASL    A
4691            BCS    *+5
4692            JMP    .L000416
4693            JMP    .L000417
4694    .L000416 EQU   *
4695     ;                                                     06380001
4696            LDA    JJ111108+1
4697            CLC
4698            ADC    #1
4699            STA    JJ111108+1
4700            LDA    JJ111108
4701            ADC    #0
4702            STA    JJ111108
4703     ;   60 CONTINUE                                       06390001
4704    .L000415 EQU   *
4705            JMP    .L000411
4706    .L000412 EQU   *
4707     ;                                                     06400001
```

```
4708   .L000417  EQU     *
4709             LDA     JJ111108+1
4710             CLC
4711             ADC     #1
4712             STA     .T000401
4713             LDA     JJ111108+1
4714             SEC
4715             SBC     #1
4716             ASL     A
4717             ASL     A
4718             ADC     DP111108
4719             STA     .T000402
4720             LDA     #0
4721             ADC     DP111108+1
4722             STA     .T000402+1
4723             LDA     .T000401
4724             SEC
4725             SBC     #1
4726             ASL     A
4727             ASL     A
4728             ADC     DP111108
4729             STA     .T000403
4730             LDA     #0
4731             ADC     DP111108+1
4732             STA     .T000403+1
4733   .MFFSUB   SET     1
4734             JSR     .FFSUB
4735             .BYTE   0
4736             .WORD   -.T000403,-.T000402
4737             .WORD   DP111108
4738   ;
4739             LDA     JJ111108+1
4740             SEC
4741             SBC     #1
4742             ASL     A
4743             ASL     A
4744             ADC     DP111108
4745             STA     .T000401
4746             LDA     #0
4747             ADC     DP111108+1
4748             STA     .T000401+1
4749   .MFFSUB   SET     1
4750             JSR     .FFSUB
4751             .BYTE   0
4752             .WORD   DP111108,-.T000401
4753             .WORD   DP111108
4754   ;
4755             LDA     JJ111108+1
4756             CLC
4757             ADC     #1
4758             STA     .T000401
4759             LDA     JJ111108+1
4760             SEC
4761             SBC     #1
4762             ASL     A
4763             ASL     A
4764             ADC     ADEP111108
4765             STA     .T000402
4766             LDA     #0
4767             ADC     ADEP111108+1
4768             STA     .T000402+1
4769             LDA     .T000401
4770             SEC
4771             SBC     #1
4772             ASL     A
4773             ASL     A
4774             ADC     ADEP111108
4775             STA     .T000403
4776             LDA     #0
4777             ADC     ADEP111108+1
4778             STA     .T000403+1
4779   .MFFSUB   SET     1
4780             JSR     .FFSUB
4781             .BYTE   0
4782             .WORD   -.T000403,-.T000402
4783             .WORD   .T000409
4784   .MFFDIV   SET     1
4785             JSR     .FFDIV
4786             .BYTE   0
4787             .WORD   .T000409,DELP111108
4788             .WORD   S111108
4789   ;
```

```
4790    .MFFMUL   SET    1
4791              JSR    .FFMUL
4792              .BYTE  0
4793              .WORD  SIIIII08,PEXTII08
4794              .WORD  .T000401
4795              LDA    JJIIII08+1
4796              SEC
4797              SBC    #1
4798              ASL    A
4799              ASL    A
4800              ADC    ABLKII08
4801              STA    .T000402
4802              LDA    #0
4803              ADC    ABLKII08+1
4804              STA    .T000402+1
4805    .MFFADD   SET    1
4806              JSR    .FFADD
4807              .BYTE  0
4808              .WORD  .T000401,-.T000402
4809              .WORD  -AKIIII08
4810    ;                                                06440001
4811              LDA    JJIIII08+1
4812              CLC
4813              ADC    #1
4814              STA    .T000401
4815              LDA    JJIIII08+1
4816              SEC
4817              SBC    #1
4818              ASL    A
4819              ASL    A
4820              ADC    BBLKII08
4821              STA    .T000402
4822              LDA    #0
4823              ADC    BBLKII08+1
4824              STA    .T000402+1
4825              LDA    .T000401
4826              SEC
4827              SBC    #1
4828              ASL    A
4829              ASL    A
4830              ADC    BBLKII08
4831              STA    .T000403
4832              LDA    #0
4833              ADC    BBLKII08+1
4834              STA    .T000403+1
4835    .MFFSUB   SET    1
4836              JSR    .FFSUB
4837              .BYTE  0
4838              .WORD  -.T000403,-.T000402
4839              .WORD  .T000409
4840    .MFFDIV   SET    1
4841              JSR    .FFDIV
4842              .BYTE  0
4843              .WORD  .T000409,DELPII08
4844              .WORD  SIIIII08
4845    ;                                                06450001
4846    .MFFMUL   SET    1
4847              JSR    .FFMUL
4848              .BYTE  0
4849              .WORD  SIIIII08,PEXTII08
4850              .WORD  .T000401
4851              LDA    JJIIII08+1
4852              SEC
4853              SBC    #1
4854              ASL    A
4855              ASL    A
4856              ADC    BBLKII08
4857              STA    .T000402
4858              LDA    #0
4859              ADC    BBLKII08+1
4860              STA    .T000402+1
4861    .MFFADD   SET    1
4862              JSR    .FFADD
4863              .BYTE  0
4864              .WORD  .T000401,-.T000402
4865              .WORD  -BKIIII08
4866    ;                                                06460001
4867              LDA    JJIIII08+1
4868              CLC
```

```
4869            ADC     #1
4870            STA     .T000401
4871            LDA     JJ111108+1
4872            SEC
4873            SBC     #1
4874            ASL     A
4875            ASL     A
4876            ADC     ASHR1108
4877            STA     .T000402
4878            LDA     #0
4879            ADC     ASHR1108+1
4880            STA     .T000402+1
4881            LDA     .T000401
4882            SEC
4883            SBC     #1
4884            ASL     A
4885            ASL     A
4886            ADC     ASHR1108
4887            STA     .T000403
4888            LDA     #0
4889            ADC     ASHR1108+1
4890            STA     .T000403+1
4891  .MFFSUB   SET     1
4892            JSR     .FFSUB
4893            .BYTE   0
4894            .WORD   -.T000403,-.T000402
4895            .WORD   .T000409
4896  .MFFDIV   SET     1
4897            JSR     .FFDIV
4898            .BYTE   0
4899            .WORD   .T000409,DELP1108
4900            .WORD   S111108
4901  ;
4902  .MFFMUL   SET     1
4903            JSR     .FFMUL
4904            .BYTE   0
4905            .WORD   S111108,PEXT1108
4906            .WORD   .T000401
4907            LDA     JJ111108+1
4908            SEC
4909            SBC     #1
4910            ASL     A
4911            ASL     A
4912            ADC     ASHR1108
4913            STA     .T000402
4914            LDA     #0
4915            ADC     ASHR1108+1
4916            STA     .T000402+1
4917  .MFFADD   SET     1
4918            JSR     .FFADD
4919            .BYTE   0
4920            .WORD   .T000401,-.T000402
4921            .WORD   -AG111108
4922  ;
4923            LDA     JJ111108+1
4924            CLC
4925            ADC     #1
4926            STA     .T000401
4927            LDA     JJ111108+1
4928            SEC
4929            SBC     #1
4930            ASL     A
4931            ASL     A
4932            ADC     BSHR1108
4933            STA     .T000402
4934            LDA     #0
4935            ADC     BSHR1108+1
4936            STA     .T000402+1
4937            LDA     .T000401
4938            SEC
4939            SBC     #1
4940            ASL     A
4941            ASL     A
4942            ADC     BSHR1108
4943            STA     .T000403
4944            LDA     #0
4945            ADC     BSHR1108+1
4946            STA     .T000403+1
4947  .MFFSUB   SET     1
```

```
4948            JSR     .FFSUB
4949            .BYTE   0
4950            .WORD   -.T000403,-.T000402
4951            .WORD   .T000409
4952    .MFFDIV SET     1
4953            JSR     .FFDIV
4954            .BYTE   0
4955            .WORD   .T000409,DELPI108
4956            .WORD   SI111108                                        06490001
4957    ;
4958    .MFFMUL SET     1
4959            JSR     .FFMUL
4960            .BYTE   0
4961            .WORD   SI111108,PEXTI108
4962            .WORD   .T000401
4963            LDA     JJI11108+1
4964            SEC
4965            SBC     #1
4966            ASL     A
4967            ASL     A
4968            ADC     BSHRI108
4969            STA     .T000402
4970            LDA     #0
4971            ADC     BSHRI108+1
4972            STA     .T000402+1
4973    .MFFADD SET     1
4974            JSR     .FFADD
4975            .BYTE   0
4976            .WORD   .T000401,-.T000402
4977            .WORD   -BGI11108
4978    ;   100 CONTINUE                                                06500001
4979    .L000410 EQU    *
4980    ;       RETURN                                                  06510001
4981            JMP     .R000400
4982    ; C     *                                                       06520001
4983    ;       END                                                     06530001
4984    .R000400 RTS
4985    ;       SUBROUTINE GASMD3(PFLUID,FTEMP,RHOGAS,KGAS,GASGRV,TOL,NBUG,NOUT
4986    GASMD3  EQU     *
4987    PFLUID09 EQU    GASMD3.1
4988    FTEMPI09 EQU    GASMD3.2
4989    RHOGAS09 EQU    GASMD3.3
4990    KGASI109 EQU    GASMD3.4
4991    GASGRV09 EQU    GASMD3.5
4992    TOLI1109 EQU    GASMD3.6
4993    NBUGI109 EQU    GASMD3.7
4994    NOUTI109 EQU    GASMD3.8
4995    ;       *GASMIX )
4996    GASMIX09 EQU    GASMD3.9
4997    ; C     R.J.RUNGE               COFRC.
4998    ; C     CALCULATES & RETURNS METRIC RHOGAS & KGAS  DENSITY & BULK MODUL
4999    ; C     OF NATURAL GAS OF GRAVITY GASGRAV (API) USING THE BENEDICT-WEBB
5000    ; C     RUBIN EQN.  SEE K.THOMAS, W.HANKINSON, A.PHILLIPS.
5001    ; C     JOUR. PET.TECH. V.22 (1970) PGS. 889-895 FOR THE THEORY.
5002    ; C     ENGR. UNITS-VOLUME=FT**3,MASS=LB.,MODULI & PRESSURES IN PSI,
5003    ; C     DENSITY IN LB./FT**3 , TEMP=RANKINE, GRAVITY=API REF. TO AIR.
5004    ; C     CONVERSIONS TO RHOGAS (GM./CM**3) AND KGAS (KILOBARS) AT END.
5005    ; C     ISOTHERMAL KGAS COMPUTED=KISIGS, THEN ADIABATIC =KADGAS IS
5006    ; C     COMPUTED. FINALLY KGAS=(1.0-GASMIX)*KISOGS+GASMIX*KADGAS
5007    ; C     NOTE: KADGAS=(CP/CV)*KISOGS.
5008    ; C     SPECIFIC HEATS CP AND CV ARE COMPUTED USING T-H-P EQNS. 15-27.
5009    ; C
5010    ;       IMPLICIT REAL(K)
5011    ; C     BENEDICT-WEBB-RUBIN COEFFICIENTS (BWR) SEE T-H-P TABLE I PG.890
5012    ;
5013    ;
5014    ;
5015    ;
5016    ;
5017    ;
5018    ; C
5019    ;
5020    .MFLTASG SET    1
5021            JSR     .FLTASGN
5022            .BYTE   0
5023            .WORD   .C000419
5024            .WORD   RMI11109
5025    ;
5026    ; C     RM=10.73 PSI CU.FT./(LB.MOLE DEG. RANKINE) MOLAR GAS CONSTANT,
5027    ; C     RM=1.9871 BTU/LB.MOLE DEG.RANKINE, USED IN CP-CV=RR TYPE EQNS.
5028    ; C     RANKINE TEMPERATURE=T, P=PRESSURE IN PSI. (PLUID ENTERS IN KPSI
5029    ; C     FTEMP=FAHRENHEIT TEMP.
```

```
5030    ;                                                                               06830025
5031    .MFLTASG SET    1
5032             JSR    .FLTASGN
5033             .BYTE  0
5034             .WORD  .C000422
5035             .WORD  RR111109
5036    ;                                                                               06840011
5037    .MFFADD  SET    1
5038             JSR    .FFADD
5039             .BYTE  0
5040             .WORD  -FTEMP109,.C000423
5041             .WORD  T1111109
5042    ;                                                                               06850041
5043    .MFLTASG SET    1
5044             JSR    .FLTASGN
5045             .BYTE  0
5046             .WORD  -FTEMP109
5047             .WORD  FT111109
5048    ;                                                                               06860041
5049    .MFLTASG SET    1
5050             JSR    .FLTASGN
5051             .BYTE  0
5052             .WORD  -GASGRV09
5053             .WORD  G1111109
5054    ;                                                                               06870037
5055    .MFLTASG SET    1
5056             JSR    .FLTASGN
5057             .BYTE  0
5058             .WORD  -PFLUID09
5059             .WORD  P1111109
5060    ;                                                                               06880016
5061    .MFFLT   SET    1
5062             JSR    .FFLT
5063             .BYTE  0
5064             .WORD  PLFUID09,.C000425
5065             ASL    A
5066             BCS    *+5
5067             JMP    .L000426
5068    ; C      PSEUDO CRITICAL TEMP.& PRESSURE    TPC,PPC.                             06890011
5069    ; C      SEE THOMAS,HANKINSON & PHILLIPS EQNS. (11),(12) PG. 891                 06900011
5070    .MFFMUL  SET    1
5071             JSR    .FFMUL
5072             .BYTE  0
5073             .WORD  -PFLUID09,.C000427
5074             .WORD  P1111109
5075    .L000426 EQU    *
5076    ;                                                                               06910011
5077    .MFFMUL  SET    1
5078             JSR    .FFMUL
5079             .BYTE  0
5080             .WORD  .C000429,-GASGRV09
5081             .WORD  .T000424
5082    .MFFSUB  SET    1
5083             JSR    .FFSUB
5084             .BYTE  0
5085             .WORD  .C000428,.T000424
5086             .WORD  PPC11109
5087    ;                                                                               06920011
5088    ; C      PSEUDO REDUCED TEMP. & PRESSURE=TPR,PPR.                                06930025
5089    .MFFMUL  SET    1
5090             JSR    .FFMUL
5091             .BYTE  0
5092             .WORD  .C000433,-GASGRV09
5093             .WORD  .T000424
5094    .MFFADD  SET    1
5095             JSR    .FFADD
5096             .BYTE  0
5097             .WORD  .C000432,.T000424
5098             .WORD  TPC11109
5099    ;                                                                               06940011
5100    .MFFDIV  SET    1
5101             JSR    .FFDIV
5102             .BYTE  0
5103             .WORD  P1111109,PPC11109
5104             .WORD  PPR11109
5105    ;
5106    ; C      SELECT IY IN COEFF(6,IY) FOR AA...FF COEFFICIENTS IN T-H-P (27)
5107    .MFFDIV  SET    1
5108             JSR    .FFDIV
```

```
5109            .BYTE   0
5110            .WORD   TI111109,TPC11109
5111            .WORD   TPR11109
5112    ;       IY=1                                            06970056
5113            LDA     #0
5114            STA     IY111109
5115            LDA     #1
5116            STA     IY111109+1
5117    ;                                                       06980056
5118    .MFFLT  SET     1
5119            JSR     .FFLT
5120            .BYTE   0
5121            .WORD   -FTEMP109,.C000434
5122            ASL     A
5123            BCS     *+5
5124            JMP     .L000435
5125    ;                                                       06990056
5126            LDA     #0
5127            STA     IY111109
5128            LDA     #2
5129            STA     IY111109+1
5130    .L000435 EQU    *
5131    ;       IX=1                                            07000011
5132            LDA     #0
5133            STA     IX111109
5134            LDA     #1
5135            STA     IX111109+1
5136    ;       IF(PPR.GT.5.0)IX=2                              07010011
5137    .MFFGT  SET     1
5138            JSR     .FFGT
5139            .BYTE   0
5140            .WORD   PPR11109,.C000436
5141            ASL     A
5142            BCS     *+5
5143            JMP     .L000437
5144    ; C     BWR COEFFICIENTS (PSEUDO REDUCED, T-M-P EQN. 6) 07020025
5145            LDA     #0
5146            STA     IX111109
5147            LDA     #2
5148            STA     IX111109+1
5149    .L000437 EQU    *
5150    ;       AH=BWR(1,IX)                                    07030011
5151    ;       AOR=BWR(2,IX)                                   07040011
5152    ;       BR=BWR(3,IX)                                    07050011
5153    ;       BOR=BWR(4,IX)                                   07060011
5154    ;       CR=BWR(5,IX)                                    07070011
5155    ;       COR=BWR(6,IX)                                   07080011
5156    ;       ALPHAR=BWR(7,IX)                                07090011
5157    ;       GAMMR=BWR(8,IX)                                 07100011
5158    ; C     COEFFICIENTS                                    07110011
5159    ;                                                       07120011
5160    .MFFMUL SET     1
5161            JSR     .FFMUL
5162            .BYTE   0
5163            .WORD   BGR11109,TPR11109
5164            .WORD   .T000424
5165    .MFFMUL SET     1
5166            JSR     .FFMUL
5167            .BYTE   0
5168            .WORD   TPR11109,TPR11109
5169            .WORD   .T000438
5170    .MFFDIV SET     1
5171            JSR     .FFDIV
5172            .BYTE   0
5173            .WORD   COR11109,.T000438
5174            .WORD   .T000439
5175    .MFFSUB SET     1
5176            JSR     .FFSUB
5177            .BYTE   0
5178            .WORD   .T000424,AOR11109
5179            .WORD   .T000431
5180    .MFFSUB SET     1
5181            JSR     .FFSUB
5182            .BYTE   0
5183            .WORD   .T000431,.T000439
5184            .WORD   S111109
5185    ;                                                       07130011
5186    .MFFMUL SET     1
5187            JSR     .FFMUL
```

```
5188            .BYTE 0
5189            .WORD BR111109,TPR111109
5190            .WORD .T000424
5191   .MFFSUB  SET  1
5192            JSR  .FFSUB
5193            .BYTE 0
5194            .WORD .T000424,AR111109
5195            .WORD S2111109                                                           07140011
5196  ;                                                                                  07150011
5197  ; C       BEGIN HAVING SEARCH              SOLVING BWR EQUATION (6)
5198  ; C       OF THOMAS,HANKINSON & PHILLIPS . VPR=PSEUDO-REDUCED-VOLUME.               07160011
5199   .MFFMUL  SET  1
5200            JSR  .FFMUL
5201            .BYTE 0
5202            .WORD AR111109,ALPHAR09
5203            .WORD S3111109                                                            07170011
5204  ;         XLOW=0.0
5205   .MFLTASG SET  1
5206            JSR  .FLTASGN
5207            .BYTE 0
5208            .WORD .C000440
5209            .WORD XLOW109
5210  ;                                                                                   07180011
5211   .MFLTASG SET  1
5212            JSR  .FLTASGN
5213            .BYTE 0
5214            .WORD .C000441
5215            .WORD XHIGH109
5216  ;                                                                                   07190011
5217   .MFFDIV  SET  1
5218            JSR  .FFDIV
5219            .BYTE 0
5220            .WORD PPR111109,TPR111109
5221            .WORD X111109
5222  ;         N=1                                                                       07200011
5223            LDA  #0
5224            STA  N111109
5225            LDA  #1
5226            STA  N111109+1
5227  ;    10 Y=FCNBWR(X,S1,S2,S3,CR,GAMMR,TPR,PPR)                                       07210011
5228  .L000442  EQU  *
5229            LDA  #PPR111109 MOD .M
5230            STA  FCNBWR.8
5231            LDA  #PPR111109/256
5232            STA  FCNBWR.8+1
5233            LDA  #TPR111109 MOD .M
5234            STA  FCNBWR.7
5235            LDA  #TPR111109/256
5236            STA  FCNBWR.7+1
5237            LDA  #GAMMR109 MOD .M
5238            STA  FCNBWR.6
5239            LDA  #GAMMR109/256
5240            STA  FCNBWR.6+1
5241            LDA  #CR111109 MOD .M
5242            STA  FCNBWR.5
5243            LDA  #CR111109/256
5244            STA  FCNBWR.5+1
5245            LDA  #S3111109 MOD .M
5246            STA  FCNBWR.4
5247            LDA  #S3111109/256
5248            STA  FCNBWR.4+1
5249            LDA  #S2111109 MOD .M
5250            STA  FCNBWR.3
5251            LDA  #S2111109/256
5252            STA  FCNBWR.3+1
5253            LDA  #S1111109 MOD .M
5254            STA  FCNBWR.2
5255            LDA  #S1111109/256
5256            STA  FCNBWR.2+1
5257            LDA  #X111109 MOD .M
5258            STA  FCNBWR.1
5259            LDA  #X111109/256
5260            STA  FCNBWR.1+1
5261            LDA  #.T000424 MOD .M
5262            STA  FCNBWR.0
5263            LDA  #.T000424/256
5264            STA  FCNBWR.0+1
5265            JSR  FCNBWR
5266   .MFLTASG SET  1
5267            JSR  .FLTASGN
5268            .BYTE 0
5269            .WORD .T000424
```

```
5270                .WORD   Y1111109                                            07220011
5271    ;           IF(Y.LT.0.0)XHIGH=X
5272    .MFFLT      SET     1
5273                JSR     .FFLT
5274                .BYTE   0
5275                .WORD   Y1111109,.C000443
5276                ASL     A
5277                BCS     *+5
527A                JMP     .L000444
5279    .MFLTASG    SET     1
5280                JSR     .FLTASGN
5281                .BYTE   0
5282                .WORD   X1111109
5283                .WORD   XHIGH109
5284    .L000444    EQU     *
5285    ;           IF(Y.GT.0.0)XLOW=X                                          07230011
5286    .MFFGT      SET     1
5287                JSR     .FFGT
528A                .BYTE   0
5289                .WORD   Y1111109,.C000445
5290                ASL     A
5291                BCS     *+5
5292                JMP     .L000446
5293    .MFLTASG    SET     1
5294                JSR     .FLTASGN
5295                .BYTE   0
5296                .WORD   X1111109
5297                .WORD   XLOW1109
5298    .L000446    EQU     *
5299    ;           X=(XHIGH+XLOW)/2.0                                          07240011
5300    .MFFADD     SET     1
5301                JSR     .FFADD
5302                .BYTE   0
5303                .WORD   XHIGH109,XLOW1109
5304                .WORD   .T000424
5305    .MFFDIV     SET     1
5306                JSR     .FFDIV
5307                .BYTE   0
5308                .WORD   .T000424,.C000447
5309                .WORD   X1111109
5310    ;           V=ABS(Y)                                                    07250011
5311                LDA     #Y1111109 MOD .M
5312                STA     ABS.0001
5313                LDA     #Y1111109/256
5314                STA     ABS.0001+1
5315                LDA     #.T000424 MOD .M
5316                STA     ABS.0000
5317                LDA     #.T000424/256
5318                STA     ABS.0000+1
5319                JSR     ABS
5320    .MFLTASG    SET     1
5321                JSR     .FLTASGN
5322                .BYTE   0
5323                .WORD   .T000424
5324                .WORD   V1111109
5325    ;           IF(V.LE.TOL)GO TO 20                                        07260011
5326    .MFFLE      SET     1
5327                JSR     .FFLE
5328                .BYTE   0
5329                .WORD   V1111109,-TOL11109
5330                ASL     A
5331                BCS     *+5
5332                JMP     .L000448
5333                JMP     .L000449
5334    .L000448    EQU     *
5335    ;           R=XHIGH-XLOW                                                07270011
5336    .MFFSUB     SET     1
5337                JSR     .FFSUB
5338                .BYTE   0
5339                .WORD   XHIGH109,XLOW1109
5340                .WORD   R1111109
5341    ;           R=ABS(R)                                                    07280011
5342                LDA     #R1111109 MOD .M
5343                STA     ABS.0001
5344                LDA     #R1111109/256
5345                STA     ABS.0001+1
5346                LDA     #.T000424 MOD .M
5347                STA     ABS.0000
5348                LDA     #.T000424/256
```

```
5349              STA    ABS,0000+1
5350              JSR    ABS
5351   .MFLTASG  SET    1
5352              JSR    .FLTASGN
5353              .BYTE  0
5354              .WORD  .T000424
5355              .WORD  R1111109
5356   ;         R=R/X                                                    07290011
5357   .MFFDIV   SET    1
5358              JSR    .FFDIV
5359              .BYTE  0
5360              .WORD  R1111109,X1111109
5361              .WORD  R1111109
5362   ;         IF(R.LT.0.001)GO TO 20                                   07300011
5363   .MFFLT    SET    1
5364              JSR    .FFLT
5365              .BYTE  0
5366              .WORD  R1111109,.C000450
5367              ASL    A
5368              BCS    *+5
5369              JMP    .L000451
5370              JMP    .L000449
5371   .L000451 EQU    *
5372   ;         N=N+1                                                    07310011
5373              LDA    N1111109+1
5374              CLC
5375              ADC    #1
5376              STA    N1111109+1
5377              LDA    N1111109
5378              ADC    #0
5379              STA    N1111109
5380   ;         IF(N.GT.201)GO TO 20                                     07320012
5381              LDA    #201
5382              CMP    N1111109+1
5383              LDA    #0
5384              SBC    N1111109
5385              BMI    .L000454
5386              JMP    .L000453
5387   .L000454 EQU    *
5388              JMP    .L000449
5389   .L000453 EQU    *
5390   ;         GO TO 10                                                 07330011
5391              JMP    .L000442
5392   ;      20 CONTINUE                                                 07340011
5393   .L000449 EQU    *
5394   ; C       CALCULATE RHOGAS, X=1/VPR   T-H-P EQN.7  RM=10.73=RMOLAR.  07350024
5395   ;                                                                  07360024
5396   ; C       28.9=POUND MOLAR WT. OF AIR. WT=POUND MOLAR WT. OF GAS.  07370011
5397   .MFFMUL   SET    1
5398              JSR    .FFMUL
5399              .BYTE  0
5400              .WORD  PPC11109,X1111109
5401              .WORD  .T000431
5402   .MFFMUL   SET    1
5403              JSR    .FFMUL
5404              .BYTE  0
5405              .WORD  RM111109,TPC11109
5406              .WORD  .T000424
5407   .MFFDIV   SET    1
5408              JSR    .FFDIV
5409              .BYTE  0
5410              .WORD  .T000424,.T000431
5411              .WORD  VMOLAR09
5412   ;                                                                  07380011
5413   .MFFMUL   SET    1
5414              JSR    .FFMUL
5415              .BYTE  0
5416              .WORD  .C000455,-GASGRV09
5417              .WORD  WT111109
5418   ;         RHO=WT/VMOLAR                                            07390018
5419   ; C       RHO IN LB./FT**3,  RHOGAS IN GM./CM**3                   07400011
5420   .MFFDIV   SET    1
5421              JSR    .FFDIV
5422              .BYTE  0
5423              .WORD  WT111109,VMOLAR09
5424              .WORD  RHO11109
5425   ;                                                                  07410011
5426   ; C       CALCULATE ISOTHERMAL KGAS=KISOGS                         07420024
5427   .MFFMUL   SET    1
5428              JSR    .FFMUL
```

```
5429                .BYTE 0
5430                .WORD  RHO11109,.C000456
5431                .WORD  -RHOGA509
5432        ;      X2=X*X                                                07430011
5433   .MFFMUL     SET    1
5434                JSR   .FFMUL
5435                .BYTE 0
5436                .WORD X11109,X11109
5437                .WORD X21109
5438        ;      X3=X2*X                                               07440011
5439   .MFFMUL     SET    1
5440                JSR   .FFMUL
5441                .BYTE 0
5442                .WORD X21109,X11109
5443                .WORD X31109
5444        ;      X4=X3*X                                               07450011
5445   .MFFMUL     SET    1
5446                JSR   .FFMUL
5447                .BYTE 0
5448                .WORD X31109,X11109
5449                .WORD X41109
5450        ;      X5=X4*X                                               07460011
5451   .MFFMUL     SET    1
5452                JSR   .FFMUL
5453                .BYTE 0
5454                .WORD X41109,X11109
5455                .WORD X51109
5456        ;      X6=X5*X                                               07470011
5457.  .MFFMUL     SET    1
5458                JSR   .FFMUL
5459                .BYTE 0
5460                .WORD X51109,X11109
5461                .WORD X61109
5462        ;      X7=X6*X                                               07480011
5463   .MFFMUL     SET    1
5464                JSR   .FFMUL
5465                .BYTE 0
5466                .WORD X61109,X11109
5467                .WORD X71109
5468        ;                                                            07490011
5469   .MFFMUL     SET    1
5470                JSR   .FFMUL
5471                .BYTE 0
5472                .WORD .C000457,S11109
5473                .WORD .T000431
5474   .MFFMUL     SET    1
5475                JSR   .FFMUL
5476                .BYTE 0
5477                .WORD .T000431,X21109
5478                .WORD .T000438
5479   .MFFMUL     SET    1
5480                JSR   .FFMUL
5481                .BYTE 0
5482                .WORD X11109,TPR11109
5483                .WORD .T000424
5484   .MFFMUL     SET    1
5485                JSR   .FFMUL
5486                .BYTE 0
5487                .WORD .C000458,S21109
5488                .WORD .T000439
5489   .MFFMUL     SET    1
5490                JSR   .FFMUL
5491                .BYTE 0
5492                .WORD .T000439,X31109
5493                .WORD .T000459
5494   .MFFADD     SET    1
5495                JSR   .FFADD
5496                .BYTE 0
5497                .WORD .T000424,.T000438
5498                .WORD .T000431
5499   .MFFMUL     SET    1
5500                JSR   .FFMUL
5501                .BYTE 0
5502                .WORD .C000460,S31109
5503                .WORD .T000438
5504   .MFFMUL     SET    1
5505                JSR   .FFMUL
5506                .BYTE 0
5507                .WORD .T000438,X61109
5508                .WORD .T000439
5509   .MFFADD     SET    1
```

```
5510              JSR    .FFADD
5511              .BYTE  0
5512              .WORD  .T000431,.T000459
5513              .WORD  .T000424
5514   .MFFADD    SET    1
5515              JSR    .FFADD
5516              .BYTE  0
5517              .WORD  .T000424,.T000439
5518              .WORD  T1111109                              07500039
5519   ;
5520   .MFFMUL    SET    1
5521              JSR    .FFMUL
5522              .BYTE  0
5523              .WORD  GAMMR109,GAMMR109
5524              .WORD  .T000431
5525   .MFFMUL    SET    1
5526              JSR    .FFMUL
5527              .BYTE  0
5528              .WORD  .C000461,X7111109
5529              .WORD  .T000424
5530   .MFFMUL    SET    1
5531              JSR    .FFMUL
5532              .BYTE  0
5533              .WORD  .C000462,X5111109
5534              .WORD  .T000439
5535   .MFFMUL    SET    1
5536              JSR    .FFMUL
5537              .BYTE  0
5538              .WORD  .T000439,GAMMR109
5539              .WORD  .T000459
5540   .MFFMUL    SET    1
5541              JSR    .FFMUL
5542              .BYTE  0
5543              .WORD  .T000424,.T000431
5544              .WORD  .T000438
5545   .MFFMUL    SET    1
5546              JSR    .FFMUL
5547              .BYTE  0
5548              .WORD  .C000463,X3111109
5549              .WORD  .T000431
5550   .MFFSUB    SET    1
5551              JSR    .FFSUB
5552              .BYTE  0
5553              .WORD  .T000438,.T000459
5554              .WORD  .T000424
5555   .MFFADD    SET    1
5556              JSR    .FFADD
5557              .BYTE  0
5558              .WORD  .T000424,.T000431
5559              .WORD  12111109                              07510011
5560   ;
5561   .MFUNMIN   SET    1
5562              JSR    .FUNMIN
5563              .BYTE  0
5564              .WORD  GAMMR109
5565              .WORD  .T000424
5566   .MFFMUL    SET    1
5567              JSR    .FFMUL
5568              .BYTE  0
5569              .WORD  .T000424,X2111109
5570              .WORD  ARG111109
5571   ;                                                       07520011
5572              LDA    #ARG111109 MOD .M
5573              STA    EXP.0001
5574              LDA    #ARG111109/256
5575              STA    EXP.0001+1
5576              LDA    #.T000424 MOD .M
5577              STA    EXP.0000
5578              LDA    #.T000424/256
5579              STA    EXP.0000+1
5580              JSR    EXP
5581   ; C        KISURD=ISOTHERMAL PSEUDO REDUCED GAS BULK MODULUS.   07530024
5582   .MFFMUL    SET    1
5583              JSR    .FFMUL
5584              .BYTE  0
5585              .WORD  TPR111109,TPR111109
5586              .WORD  .T000438
5587   .MFFMUL    SET    1
5588              JSR    .FFMUL
5589              .BYTE  0
```

```
5590                .WORD   CRI11109,.T000424
5591                .WORD   .T000431
5592    .MFFDIV     SET     1
5593                JSR     .FFDIV
5594                .BYTE   0
5595                .WORD   .T000431,.T000438
5596                .WORD   T3111109                                            07540024
5597    ;
5598    .MFFMUL     SET     1
5599                JSR     .FFMUL
5600                .BYTE   0
5601                .WORD   T3111109,T2111109
5602                .WORD   .T000424
5603    .MFFADD     SET     1
5604                JSR     .FFADD
5605                .BYTE   0
5606                .WORD   T1111109,.T000424
5607                .WORD   KISORD09
5608    ;                                                                       07550024
5609    ; C     K NOW IN PSI. KISOGS IS IN KILOBARS.                            07560024
5610    .MFFMUL     SET     1
5611                JSR     .FFMUL
5612                .BYTE   0
5613                .WORD   KISORD09,PPC111109
5614                .WORD   K1111109
5615    ;       KISOGS=K/14500.0                                                07570024
5616    ; C     KGAS=KISOGS (R.J.S. BROWN TECH MEMO       SEISMIC CASE.         07580049
5617    ; C     OTHERWISE IF GASMIX.NE.0,KGAS =ISO +ADIABAT MIX                 07590041
5618    ; C     IN WELL LOGGING APPLICATIONS (WELL TO WELL) THE FREQUENCIES     07600056
5619    ; C             REQUIRE AN ADIABATIC CALCULATION, GASMIX=1.00           07610056
5620    ; C                                                                     07620056
5621    ; C     BEGIN THE ADIABATIC CALCULATIONS.                               07630056
5622    ; C                                                                     07640041
5623    ; C     NOW COMPUTE AA,BB...FF   OF T-H-P  EQN. 27                      07650056
5624    .MFFDIV     SET     1
5625                JSR     .FFDIV
5626                .BYTE   0
5627                .WORD   K1111109,.C000464
5628                .WORD   KISOGS09
5629    ;       AA=COEFF(1,IY)                                                  07660056
5630    ;       BB=COEFF(2,IY)                                                  07670056
5631    ;       CC=COEFF(3,IY)                                                  07680056
5632    ;       DD=COEFF(4,IY)                                                  07690056
5633    ;       EE=COEFF(5,IY)                                                  07700056
5634    ;       FF=COEFF(6,IY)                                                  07710056
5635    ; C     LOW PRESSURE SPECIFIC HEATS CPO,CVO (T-H-P,EQN. 27)             07720041
5636    ;                                                                       07730056
5637    .MFFMUL     SET     1
5638                JSR     .FFMUL
5639                .BYTE   0
5640                .WORD   BB111109,FT111109
5641                .WORD   .T000424
5642    .MFFMUL     SET     1
5643                JSR     .FFMUL
5644                .BYTE   0
5645                .WORD   CC111109,G1111109
5646                .WORD   .T000438
5647    .MFFADD     SET     1
5648                JSR     .FFADD
5649                .BYTE   0
5650                .WORD   AA111109,.T000424
5651                .WORD   .T000431
5652    .MFFMUL     SET     1
5653                JSR     .FFMUL
5654                .BYTE   0
5655                .WORD   G1111109,G1111109
5656                .WORD   .T000439
5657    .MFFMUL     SET     1
5658                JSR     .FFMUL
5659                .BYTE   0
5660                .WORD   DD111109,.T000439
5661                .WORD   .T000459
5662    .MFFADD     SET     1
5663                JSR     .FFADD
5664                .BYTE   0
5665                .WORD   .T000431,.T000438
5666                .WORD   .T000424
5667    .MFFMUL     SET     1
5668                JSR     .FFMUL
```

```
5669              .BYTE 0
5670              .WORD FT111109,GI111109
5671              .WORD .T000438
5672   .MFFMUL    SET  1
5673              JSR  .FFMUL
5674              .BYTE 0
5675              .WORD EE111109,.T000438
5676              .WORD .T000439
5677   .MFFADD    SET  1
5678              JSR  .FFADD
5679              .BYTE 0
5680              .WORD .T000424,.T000459
5681              .WORD .T000431
5682   .MFFMUL    SET  1
5683              JSR  .FFMUL
5684              .BYTE 0
5685              .WORD FT111109,FT111109
5686              .WORD .T000438
5687   .MFFMUL    SET  1
5688              JSR  .FFMUL
5689              .BYTE 0
5690              .WORD FF111109,.T000438
5691              .WORD .T000459
5692   .MFFADD    SET  1
5693              JSR  .FFADD
5694              .BYTE 0
5695              .WORD .T000431,.T000439
5696              .WORD .T000424
5697   ;MFFADD    SET  1
5698              JSR  .FFADD
5699              .BYTE 0
5700              .WORD .T000424,.T000459
5701              .WORD CP011109
5702   ;                                                                           07740041
5703   ; C    COMPUTE CV=(SPEC. HEAT AT CONST. VOL.) T-H-P EQN.25                   07750041
5704   .MFFSUB    SET  1
5705              JSR  .FFSUB
5706              .BYTE 0
5707              .WORD CPU11109,RR111109
5708              .WORD CV011109
5709   ;    CV=FCNCV(T,RM,TPC,PPC,VMOLAR,CVO,AR,AOR,BR,BOR,CR,COR,ALPHAR,           07760041
5710   ;    AGAMMR )                                                                07770041
5711              LDA  #GAMMR109 MOD .M
5712              STA  FCNCV.14
5713              LDA  #GAMMR109/256
5714              STA  FCNCV.14+1
5715              LDA  #ALPHAR09 MOD .M
5716              STA  FCNCV.13
5717              LDA  #ALPHAR09/256
5718              STA  FCNCV.13+1
5719              LDA  #COR11109 MOD .M
5720              STA  FCNCV.12
5721              LDA  #COR11109/256
5722              STA  FCNCV.12+1
5723              LDA  #CR111109 MOD .M
5724              STA  FCNCV.11
5725              LDA  #CR111109/256
5726              STA  FCNCV.11+1
5727              LDA  #BOR11109 MOD .M
5728              STA  FCNCV.10
5729              LDA  #BOR11109/256
5730              STA  FCNCV.10+1
5731              LDA  #BR111109 MOD .M
5732              STA  FCNCV.09
5733              LDA  #BR111109/256
5734              STA  FCNCV.09+1
5735              LDA  #AOR11109 MOD .M
5736              STA  FCNCV.08
5737              LDA  #AOR11109/256
5738              STA  FCNCV.08+1
5739              LDA  #AR111109 MOD .M
5740              STA  FCNCV.07
5741              LDA  #AR111109/256
5742              STA  FCNCV.07+1
5743              LDA  #CV011109 MOD .M
5744              STA  FCNCV.06
5745              LDA  #CV011109/256
5746              STA  FCNCV.06+1
5747              LDA  #VMOLAR09 MOD .M
5748              STA  FCNCV.05
5749              LDA  #VMOLAR09/256
```

```
5750            STA     FCNCV.05+1
5751            LDA     #PPC11109 MOD .M
5752            STA     FCNCV.04
5753            LDA     #PPC11109/256
5754            STA     FCNCV.04+1
5755            LDA     #TPC11109 MOD .M
5756            STA     FCNCV.03
5757            LDA     #TPC11109/256
5758            STA     FCNCV.03+1
5759            LDA     #RM111109 MOD .M
5760            STA     FCNCV.02
5761            LDA     #RM111109/256
5762            STA     FCNCV.02+1
5763            LDA     #T1111109 MOD .M
5764            STA     FCNCV.01
5765            LDA     #T1111109/256
5766            STA     FCNCV.01+1
5767            LDA     #.T000424 MOD .M
5768            STA     FCNCV.00
5769            LDA     #.T000424/256
5770            STA     FCNCV.00+1
5771            JSR     FCNCV
5772    ; C     NOW THE R1. SIDE OF T-H-P EQN. 15 IN PSEUDO REDUCED FORM.        07780041
5773    .MFLTASG SET    1
5774            JSR     .FLTASGN
5775            .BYTE   0
5776            .WORD   .T000424
5777            .WORD   CV111109
5778    ;                                                                       07790041
5779    ; C     DEN=-KISORD*X=-KISORD/VPR=DERIVATIVE OF PPR W.RESP. TO VPR AT    07800043
5780    ; C     CONSTANT TPR=DENOMINATOR IN T-H-P EQN 15 FOR PREDUCED CP-CV.     07810043
5781    .MFUNMIN SET    1
5782            JSR     .FUNMIN
5783            .BYTE   0
5784            .WORD   KISORD09
5785            .WORD   .T000424
5786    .MFFMUL  SET    1
5787            JSR     .FFMUL
5788            .BYTE   0
5789            .WORD   .T000424,X111109
5790            .WORD   DEN11109
5791    ;       DER=FCNPTV(X,BOR,COR,GAMMR,CR,BR,TPR)                            07820041
5792            LDA     #TPR11109 MOD .M
5793            STA     FCNPTV.7
5794            LDA     #TPR11109/256
5795            STA     FCNPTV.7+1
5796            LDA     #BR111109 MOD .M
5797            STA     FCNPTV.6
5798            LDA     #BR111109/256
5799            STA     FCNPTV.6+1
5800            LDA     #CR111109 MOD .M
5801            STA     FCNPTV.5
5802            LDA     #CR111109/256
5803            STA     FCNPTV.5+1
5804            LDA     #GAMMR109 MOD .M
5805            STA     FCNPTV.4
5806            LDA     #GAMMR109/256
5807            STA     FCNPTV.4+1
5808            LDA     #COR11109 MOD .M
5809            STA     FCNPTV.3
5810            LDA     #COR11109/256
5811            STA     FCNPTV.3+1
5812            LDA     #BOR11109 MOD .M
5813            STA     FCNPTV.2
5814            LDA     #BOR11109/256
5815            STA     FCNPTV.2+1
5816            LDA     #X111109 MOD .M
5817            STA     FCNPTV.1
5818            LDA     #X111109/256
5819            STA     FCNPTV.1+1
5820            LDA     #.T000424 MOD .M
5821            STA     FCNPTV.0
5822            LDA     #.T000424/256
5823            STA     FCNPTV.0+1
5824            JSR     FCNPTV
5825    ; C     DER=DERIVATIVE OF PPR W. RESPECT TO TPR AT CONSTANT VPR=1/X IN
5826    ; C     THE NUMERATOR OF T-H-P EQN. 15
5827    .MFLTASG SET    1
5828            JSR     .FLTASGN
```

```
5829            .BYTE 0
5830            .WORD .T000424
5831            .WORD DERI1109
5832    ;                                                                   07850041
5833    .MFFMUL SET   1
5834            JSR   .FFMUL
5835            .BYTE 0
5836            .WORD DERI1109,DERI1109
5837            .WORD DERI1109
5838    ;                                                                   07860041
5839    .MFUNMIN SET  1
5840            JSR   .FUNMIN
5841            .BYTE 0
5842            .WORD TPRI1109
5843            .WORD .T000424
5844    ; C     THE QUANTITY CPRCVR=CP(PREDUCED)-CV(PREDUCED) T-H-P EQN. 15  07870043
5845    ; C     NOW COMPUTE CP(CONST.PRESSURE) FROM CP-CV=RR*CPRCVR           07880049
5846                                                                        07890049
5847    .MFFMUL SET   1
5848            JSR   .FFMUL
5849            .BYTE 0
5850            .WORD .T000424,DERI1109
5851            .WORD .T000431
5852    .MFFDIV SET   1
5853            JSR   .FFDIV
5854            .BYTE 0
5855            .WORD .T000431,DENI1109
5856            .WORD CPRCVR09
5857    ;                                                                   07900048
5858    ;                                                                   07910046
5859    ; C                                                                 07920046
5860    .MFFMUL SET   1
5861            JSR   .FFMUL
5862            .BYTE 0
5863            .WORD RRI1109,CPRCVR09
5864            .WORD .T000424
5865    .MFFADD SET   1
5866            JSR   .FFADD
5867            .BYTE 0
5868            .WORD CVI1109,.T000424
5869            .WORD CPI1109                                               07930041
5870    ;                                                                   07940041
5871    ; C     ADIABATIC KADGAS=KISOGS*GAM  (KB.)
5872    .MFFDIV SET   1
5873            JSR   .FFDIV
5874            .BYTE 0
5875            .WORD CPI1109,CVI1109
5876            .WORD GAMI1109                                              07950041
5877    ;                                                                   07960041
5878    ; C     ADIABATIC CALCULATION COMPLETE.
5879    ; C     NOW MIX KISOGS & KADGAS.                                    07970041
5880    .MFFMUL SET   1
5881            JSR   .FFMUL
5882            .BYTE 0
5883            .WORD KISOGS09,GAMI1109
5884            .WORD KADGAS09
5885    ;                                                                   07980041
5886    .MFFSUB SET   1
5887            JSR   .FFSUB
5888            .BYTE 0
5889            .WORD .C000465,-GASMIX09
5890            .WORD .T000424
5891    ; C     FOR SEISMIC FREQ., GASMIX=0, KGAS=KISOGAS                   07990048
5892    ; C     FOR LOGGING  FREQ. GASMIX=1.0, KGAS=KADGAS                  08000048
5893    ; C     IF(NBUG.GT.0)WRITE(NOUT,30)N,X,PPR,VMOLAR,WT,TPR,IX,CP,CV,GAM,K08010041
5894    ; C     *GS,KADGAS                                                  08020041
5895    ; C  30 FORMAT(/5X,' IN SUBROUTINE GASMD3 THE DIAGNOSTIC QUANTITIES ARE08030041
5896    ; C     *5X,' N=',I3,'  X=',F10.3,'  PPR=',F10.5,' VMOLAR=',F10.5,' WT=08040012
5897    ; C     *F7.3,' TPR=',F10.5,'  IX=',I2 /5X,'  CP=',F10.5,'  CV=',F10.5, 08050041
5898    ; C     *' CP/CV=',F10.5,'  KISOGS=',F10.5,'  KADGAS=',F10.5//)     08060041
5899    .MFFMUL SET   1
5900            JSR   .FFMUL
5901            .BYTE 0
5902            .WORD -GASMIX09,KADGAS09
5903            .WORD .T000438
5904    .MFFMUL SET   1
5905            JSR   .FFMUL
5906            .BYTE 0
5907            .WORD KISOGS09,.T000424
```

```
5908              .WORD  .T000431
5909   .MFFADD    SET    1
5910              JSR    .FFADD
5911              .BYTE  0
5912              .WORD  .T000431,.T000438
5913              .WORD  -KGAS1109
5914   ;          RETURN                                                          08070011
5915              JMP    .R000418
5916   ;          END                                                             08080011
5917   .R000418   RTS
   8
   9   ;                                                                          08090011
  10   FCNBWR     EQU    *
  11   FCNBWR01   EQU    FCNBWR.0
  12   X1111101   EQU    FCNBWR.1
  13   S1111101   EQU    FCNBWR.2
  14   S2111101   EQU    FCNBWR.3
  15   S3111101   EQU    FCNBWR.4
  16   CR111101   EQU    FCNBWR.5
  17   GAMMR101   EQU    FCNBAR.6
  18   TPR11101   EQU    FCNBWR.7
  19   PPR11101   EQU    FCNBWR.8
  20   ; C        R.J.RUNGE                    COFRC.                             08100028
  21   ; C        BENEDICT-WEBB-RUBIN GAS LAW (BWR) CALCULATION IN X=1/VPR         08110011
  22   ; C        THOMAS,HANKINSON & PHILLIPS  EQN. (6) DEFINES FUNCTION.          08120011
  23   ;                                                                          08130011
  24   .MFFMUL    SET    1
  25              JSR    .FFMUL
  26              .BYTE  0
  27              .WORD  -TPR11101,-TPR11101
  28              .WORD  TSQ11101
  29   ;                                                                          08140011
  30   .MFFMUL    SET    1
  31              JSR    .FFMUL
  32              .BYTE  0
  33              .WORD  -X1111101,-X1111101
  34              .WORD  X2111101
  35   ;                                                                          08150011
  36   .MFFMUL    SET    1
  37              JSR    .FFMUL
  38              .BYTE  0
  39              .WORD  X2111101,-X1111101
  40              .WORD  X3111101
  41   ;                                                                          08160011
  42   .MFFMUL    SET    1
  43              JSR    .FFMUL
  44              .BYTE  0
  45              .WORD  X3111101,X3111101
  46              .WORD  X6111101
  47   ;                                                                          08170011
  48   .MFFMUL    SET    1
  49              JSR    .FFMUL
  50              .BYTE  0
  51              .WORD  -X1111101,-TPR11101
  52              .WORD  .T000002
  53   .MFFMUL    SET    1
  54              JSR    .FFMUL
  55              .BYTE  0
  56              .WORD  -S1111101,X2111101
  57              .WORD  .T000007
  58   .MFFSUB    SET    1
  59              JSR    .FFSUB
  60              .BYTE  0
  61              .WORD  -PPR11101,.T000002
  62              .WORD  .T000006
  63   .MFFMUL    SET    1
  64              JSR    .FFMUL
  65              .BYTE  0
  66              .WORD  -S2111101,X3111101
  67              .WORD  .T000008
  68   .MFFSUB    SET    1
  69              JSR    .FFSUB
  70              .BYTE  0
  71              .WORD  .T000006,.T000007
  72              .WORD  .T000002
  73   .MFFMUL    SET    1
  74              JSR    .FFMUL
  75              .BYTE  0
  76              .WORD  -S3111101,X6111101
```

```
 77            .WORD  .T000007
 78   .MFFSUB  SET    1
 79            JSR    .FFSUB
 80            .BYTE  0
 81            .WORD  .T000002,.T000008
 82            .WORD  .T000006
 83   .MFFSUB  SET    1
 84            JSR    .FFSUB
 85            .BYTE  0
 86            .WORD  .T000006,.T000007
 87            .WORD  T1111101                                      08180011
 88   ;
 89   .MFUNMIN SET    1
 90            JSR    .FUNMIN
 91            .BYTE  0
 92            .WORD  -GAMMR101
 93            .WORD  .T000002
 94   .MFFMUL  SET    1
 95            JSR    .FFMUL
 96            .BYTE  0
 97            .WORD  .T000002,X2111101
 98            .WORD  ARG11101                                      08190011
 99   ;
100            LDA    #ARG11101 MOD .M
101            STA    EXP.0001
102            LDA    #ARG11101/256
103            STA    EXP.0001+1
104            LDA    #.T000006 MOD .M
105            STA    EXP.0000
106            LDA    #.T000006/256
107            STA    EXP.0000+1
108            JSR    EXP
109   .MFUNMIN SET    1
110            JSR    .FUNMIN
111            .BYTE  0
112            .WORD  X3111101
113            .WORD  .T000002
114   .MFFMUL  SET    1
115            JSR    .FFMUL
116            .BYTE  0
117            .WORD  .T000002,.T000006
118            .WORD  .T000007
119   .MFFADD  SET    1
120            JSR    .FFADD
121            .BYTE  0
122            .WORD  .C000009,ARG11101
123            .WORD  .T000006
124   .MFFMUL  SET    1
125            JSR    .FFMUL
126            .BYTE  0
127            .WORD  .T000007,-CR111101
128            .WORD  .T000002
129   .MFFMUL  SET    1
130            JSR    .FFMUL
131            .BYTE  0
132            .WORD  .T000002,.T000006
133            .WORD  .T000007
134   .MFFDIV  SET    1
135            JSR    .FFDIV
136            .BYTE  0
137            .WORD  .T000007,TSQ11101
138            .WORD  I2111101                                      08200011
139   ;
140   .MFFADD  SET    1
141            JSR    .FFADD
142            .BYTE  0
143            .WORD  T1111101,T2111101
144            .WORD  -FCNBWR01                                     08210011
145   ;        RETURN
146            JMP    .R000001                                      08220011
147   ;        END
148   .R000001 RTS
149   ;        FUNCTION FCNCV(T,R,TPC,PPC,V,CV0,AR,AOR,BR,BOR,CR,COR,ALPHAR,GA
150   FCNCV    EQU    *
151   FCNCV102 EQU    FCNCV.00
152   T1111102 EQU    FCNCV.01
153   R111102  EQU    FCNCV.02
154   TPC11102 EQU    FCNCV.03
155   PPC11102 EQU    FCNCV.04
```

```
156     VIIII102  EQU     FCNCV.05
157     CVOIII02  EQU     FCNCV.06
158     ARIII102  EQU     FCNCV.07
159     AORIII02  EQU     FCNCV.08
160     BRIII102  EQU     FCNCV.09
161     BORIII02  EQU     FCNCV.10
162     CRIII102  EQU     FCNCV.11
163     CORIII02  EQU     FCNCV.12
164     ALPHAR02  EQU     FCNCV.13
165     ;       * )                                                          08240042
166     .GAMMR102 EQU     FCNCV.14
167     ; C     R.J.RUNGE
168     ; C     T=RANKINE TEMP. V=VOLUME(USUALLY MOLAR) R=(USUALLY MOLAR) GAS
169     ; C     CONSTANT,PPC=PSEUDO CRITICAL PRESS., TPC=PSEUDO CRITICAL TEMP.
170     ; C     CVO--GAMMR ARE PSEUDO REDUCED BWR COEFFICIENTS.              08280047
171     ; C     ADIABATIC CALCULATION -CV=CONST. VOLUME SPECIFIC HEAT        08290042
172     ; C     T-H-P EQUATION 25.                                           08300042
173     ; C                                                                  08310046
174     ; C     NOW COMPUTE FROM T-H-P EQNS. 17-24.                          08320046
175     ;                                                                    08330042
176     .MFFMUL   SET     1
177               JSR     .FFMUL
178               .BYTE   0
179               .WORD   -PPCIII02,-PPCIII02
180               .WORD   .T000015
181     .MFFMUL   SET     1
182               JSR     .FFMUL
183               .BYTE   0
184               .WORD   -TPCIII02,.C000013
185               .WORD   .T000014
186     .MFFMUL   SET     1
187               JSR     .FFMUL
188               .BYTE   0
189               .WORD   -RIIII102,.C000011
190               .WORD   .T000012
191     .MFFDIV   SET     1
192               JSR     .FFDIV
193               .BYTE   0
194               .WORD   .T000014,.T000015
195               .WORD   .T000012
196     ;                                                                    08340042
197     .MFFMUL   SET     1
198               JSR     .FFMUL
199               .BYTE   0
200               .WORD   -PIIII102,-RIIII102
201               .WORD   .T000014
202     .MFFMUL   SET     1
203               JSR     .FFMUL
204               .BYTE   0
205               .WORD   -TPCIII02,-TPCIII02
206               .WORD   .T000019
207     .MFFMUL   SET     1
208               JSR     .FFMUL
209               .BYTE   0
210               .WORD   -BRIII102,.T000014
211               .WORD   .T000015
212     .MFFMUL   SET     1
213               JSR     .FFMUL
214               .BYTE   0
215               .WORD   -PPCIII02,-PPCIII02
216               .WORD   .T000022
217     .MFFMUL   SET     1
218               JSR     .FFMUL
219               .BYTE   0
220               .WORD   .T000015,.T000019
221               .WORD   .T000014
222     .MFFDIV   SET     1
223               JSR     .FFDIV
224               .BYTE   0
225               .WORD   .T000014,.T000022
226               .WORD   BIIII102
227     ;                                                                    08350042
228     .MFFMUL   SET     1
229               JSR     .FFMUL
230               .BYTE   0
231               .WORD   -RIIII102,-RIIII102
232               .WORD   .T000014
233     .MFFMUL   SET     1
```

```
234             JSR    .FFMUL
235             .BYTE  0
236             .WORD  -TPC11102,-TPC11102
237             .WORD  .T000019
238   .MFFMUL   SET    1
239             JSR    .FFMUL
240             .BYTE  0
241             .WORD  -ACR11102,.T000014
242             .WORD  .T000015
243   .MFFMUL   SET    1
244             JSR    .FFMUL
245             .BYTE  0
246             .WORD  .T000015,.T000019
247             .WORD  .T000014
248   .MFFDIV   SET    1
249             JSR    .FFDIV
250             .BYTE  0
251             .WORD  .T000014,-PPC11102
252             .WORD  A011110
253   ;
254   .MFFMUL   SET    1
255             JSR    .FFMUL
256             .BYTE  0
257             .WORD  -bGR11102,-R111102
258             .WORD  .T000014
259   .MFFMUL   SET    1
260             JSR    .FFMUL
261             .BYTE  0
262             .WORD  .T000014,-TPC11102
263             .WORD  .T000015
264   .MFFDIV   SET    1
265             JSR    .FFDIV
266             .BYTE  0
267             .WORD  .T000015,-PPC11102
268             .WORD  B011110
269   ;
270   .MFFMUL   SET    1
271             JSR    .FFMUL
272             .BYTE  0
273             .WORD  -PPC11102,-PPC11102
274             .WORD  .T000019
275   .MFFMUL   SET    1
276             JSR    .FFMUL
277             .BYTE  0
278             .WORD  -TPC11102,.C000024
279             .WORD  .T000015
280   .MFFMUL   SET    1
281             JSR    .FFMUL
282             .BYTE  0
283             .WORD  -R111102,.C000023
284             .WORD  .T000014
285   .MFFDIV   SET    1
286             JSR    .FFDIV
287             .BYTE  0
288             .WORD  .T000015,.T000019
289             .WORD  .T000014
290   ;
291   .MFFMUL   SET    1
292             JSR    .FFMUL
293             .BYTE  0
294             .WORD  -R111102,-R111102
295             .WORD  .T000015
296   .MFFMUL   SET    1
297             JSR    .FFMUL
298             .BYTE  0
299             .WORD  -TPC11102,.C000025
300             .WORD  .T000022
301   .MFFMUL   SET    1
302             JSR    .FFMUL
303             .BYTE  0
304             .WORD  -COR11102,.T000015
305             .WORD  .T000019
306   .MFFDIV   SET    1
307             JSR    .FFDIV
308             .BYTE  0
309             .WORD  .T000022,-PPC11102
310             .WORD  .T000019
311   ;
```

```
312   .MFFMUL   SET    1
313             JSR    .FFMUL
314             .BYTE  0
315             .WORD  -TPC11102,.C000028
316             .WORD  .T000022
317   .MFFDIV   SET    1
318             JSR    .FFDIV
319             .BYTE  0
320             .WORD  -PPC11102,.C000029
321             .WORD  .T000022
322   ;
323   .MFFMUL   SET    1
324             JSR    .FFMUL
325             .BYTE  0
326             .WORD  -R11111O2,-R11111O2
327             .WORD  .T000026
328   .MFFMUL   SET    1
329             JSR    .FFMUL
330             .BYTE  0
331             .WORD  -TPC11102,-TPC11102
332             .WORD  .T000031
333   .MFFMUL   SET    1
334             JSR    .FFMUL
335             .BYTE  0
336             .WORD  -GAMMR102,.T000026
337             .WORD  .T000030
338   ; C
339   ; C       BACK TO EQN. 25 T-H-P.
340   ; C
341   .MFFMUL   SET    1
342             JSR    .FFMUL
343             .BYTE  0
344             .WORD  -PPC11102,-PPC11102
345             .WORD  .T000032
346   .MFFMUL   SET    1
347             JSR    .FFMUL
348             .BYTE  0
349             .WORD  .T000030,.T000031
350             .WORD  .T000026
351   .MFFDIV   SET    1
352             JSR    .FFDIV
353             .BYTE  0
354             .WORD  .T000026,.T000032
355             .WORD  GAMMA102
356   ;
357   .MFFMUL   SET    1
358             JSR    .FFMUL
359             .BYTE  0
360             .WORD  C11111O2,-V11111O2
361             .WORD  .T000026
362   .MFFDIV   SET    1
363             JSR    .FFDIV
364             .BYTE  0
365             .WORD  .T000026,GAMMA102
366             .WORD  .T000030
367   .MFFSUB   SET    1
368             JSR    .FFSUB
369             .BYTE  0
370             .WORD  C0111102,.T000030
371             .WORD  T1111102
372   ;
373   .MFFMUL   SET    1
374             JSR    .FFMUL
375             .BYTE  0
376             .WORD  -V11111O2,-V11111O2
377             .WORD  .T000030
378   .MFUNMIN  SET    1
379             JSR    .FUNMIN
380             .BYTE  0
381             .WORD  GAMMA102
382             .WORD  .T000026
383   .MFFDIV   SET    1
384             JSR    .FFDIV
385             .BYTE  0
386             .WORD  .T000026,.T000030
387             .WORD  ARG11102
388   ;
389             LDA    #ARG11102 MOD .M
390             STA    EXP,0001
```

```
391             LDA     #ARG11102/256
392             STA     EXP.0001+1
393             LDA     #.T000026 MOD .M
394             STA     EXP.0000
395             LDA     #.T000026/256
396             STA     EXP.0000+1
397             JSR     EXP
398     .MFFMUL SET     1
399             JSR     .FFMUL
400             .BYTE   0
401             .WORD   C1111102,.T000026
402             .WORD   T2111102                                08470046
403     ;
404     .MFFMUL SET     1
405             JSR     .FFMUL
406             .BYTE   0
407             .WORD   .C000034,-V1111102
408             .WORD   .T000030
409     .MFFDIV SET     1
410             JSR     .FFDIV
411             .BYTE   0
412             .WORD   .C000033,.T000030
413             .WORD   .T000031
414     .MFFDIV SET     1
415             JSR     .FFDIV
416             .BYTE   0
417             .WORD   -V1111102,GAMMA102
418             .WORD   .T000026
419     .MFFADD SET     1
420             JSR     .FFADD
421             .BYTE   0
422             .WORD   .T000026,.T000031
423             .WORD   .T000030
424     .MFFMUL SET     1
425             JSR     .FFMUL
426             .BYTE   0
427             .WORD   T2111102,.T000030
428             .WORD   T3111102
429     ;                                                       08480042
430     .MFFADD SET     1
431             JSR     .FFADD
432             .BYTE   0
433             .WORD   T1111102,T3111102
434             .WORD   S1111102
435     ;                                                       08490042
436     .MFFMUL SET     1
437             JSR     .FFMUL
438             .BYTE   0
439             .WORD   -T1111102,.C000036
440             .WORD   .T000030
441     .MFFDIV SET     1
442             JSR     .FFDIV
443             .BYTE   0
444             .WORD   -V1111102,.T000030
445             .WORD   .T000031
446     .MFFMUL SET     1
447             JSR     .FFMUL
448             .BYTE   0
449             .WORD   .C000035,S1111102
450             .WORD   .T000026
451     .MFFADD SET     1
452             JSR     .FFADD
453             .BYTE   0
454             .WORD   .T000026,.T000031
455             .WORD   -CV01102
456     ;                                                       08500042
457     .MFLTASG SET    1
458             JSR     .FLTASGN
459             .BYTE   0
460             .WORD   CV111102
461             .WORD   -FCNCV102
462     ;       RETURN                                          08510042
463             JMP     .R000010
464     ;       END                                             08520042
465     .R000010 RTS
466     ;       FUNCTION FCNPTV(X,BOR,COR,GAMMR,CR,BR,TPR  )    08530042
467     FCNPTV  EQU     *
468     FCNPTV03 EQU    FCNPTV.0
469     X1111103 EQU    FCNPTV.1
```

```
470        BOR11103 EQU    FCNPTV.2
471        COR11103 EQU    FCNPTV.3
472        GAMMR103 EQU    FCNPTV.4
473        CHI11103 EQU    FCNPTV.5
474        BR111103 EQU    FCNPTV.6
475        TPR11103 EQU    FCNPTV.7
476        ; C     R.RUNGE                                                          08540047
477        ; C     CALCULATES THE DERIVATIVE OF PPR W. RESPECT TO TPR AT CONSTANT   08550043
478        ; C     VPR (CONST. X) IN T-H-P EQN. 15 (NUMERATOR),                     08560043
479        ; C     WHERE PPR IS GIVEN BY THE PSEUDO REDUCED BWR EQN. 6 OF T-H-P.    08570046
480        ;                                                                        08580042
481        .MFLTASG SET    1
482                 JSR    .FLTASGN
483                 .BYTE  0
484                 .WORD  .C000038
485                 .WORD  -TPR11103                                                08590042
486        ;
487        .MFFMUL  SET    1
488                 JSR    .FFMUL
489                 .BYTE  0
490                 .WORD  .C000041,-COR11103
491                 .WORD  .T000042
492        .MFFDIV  SET    1
493                 JSR    .FFDIV
494                 .BYTE  0
495                 .WORD  .T000042,TP311103
496                 .WORD  .T000044
497        .MFFADD  SET    1
498                 JSR    .FFADD
499                 .BYTE  0
500                 .WORD  -BOR11103,.T000044
501                 .WORD  Q1111103                                                 08600042
502        ;
503        .MFLTASG SET    1
504                 JSR    .FLTASGN
505                 .BYTE  0
506                 .WORD  -X1111103
507                 .WORD  X1111103                                                 08610042
508        ;
509        .MFFMUL  SET    1
510                 JSR    .FFMUL
511                 .BYTE  0
512                 .WORD  -X1111103,-X1111103
513                 .WORD  X2111103                                                 08620042
514        ;
515        .MFFMUL  SET    1
516                 JSR    .FFMUL
517                 .BYTE  0
518                 .WORD  X2111103,-X1111103
519                 .WORD  X3111103                                                 08630042
520        ;
521        .MFUNMIN SET    1
522                 JSR    .FUNMIN
523                 .BYTE  0
524                 .WORD  -GAMMR103
525                 .WORD  .T000042
526        .MFFMUL  SET    1
527                 JSR    .FFMUL
528                 .BYTE  0
529                 .WORD  .T000042,X2111103
530                 .WORD  ARG11103
531        ;                                                                        08640042
532        .MFFMUL  SET    1
533                 JSR    .FFMUL
534                 .BYTE  0
535                 .WORD  C1111103,X2111103
536                 .WORD  .T000042
537        .MFFMUL  SET    1
538                 JSR    .FFMUL
539                 .BYTE  0
540                 .WORD  -BR111103,X3111103
541                 .WORD  .T000045
542        .MFFADD  SET    1
543                 JSR    .FFADD
544                 .BYTE  0
545                 .WORD  -X1111103,.T000042
546                 .WORD  .T000044
547        .MFFADD  SET    1
548                 JSR    .FFADD
```

```
549              .BYTE  0
550              .WORD  .T000044,.T000045
551              .WORD  T1111103
552       !                                                              08650042
553  .MFFMUL  SET    1
554              JSR    .FFMUL
555              .BYTE  0
556              .WORD  .C000046,X3111103
557              .WORD  .T000042
558              LDA    #ARG11103 MOD .M
559              STA    EXP,0001
560              LDA    #ARG11103/256
561              STA    EXP,0001+1
562              LDA    #.T000045 MOD .M
563              STA    EXP,0000
564              LDA    #.T000045/256
565              STA    EXP,0000+1
566              JSR    EXP
567  .MFFMUL  SET    1
568              JSR    .FFMUL
569              .BYTE  0
570              .WORD  .T000042,-CR111103
571              .WORD  .T000044
572  .MFFMUL  SET    1
573              JSR    .FFMUL
574              .BYTE  0
575              .WORD  -GAMMR103,X2111103
576              .WORD  .T000048
577  .MFFSUB  SET    1
578              JSR    .FFSUB
579              .BYTE  0
580              .WORD  .C000047,.T000048
581              .WORD  .T000049
582  .MFFMUL  SET    1
583              JSR    .FFMUL
584              .BYTE  0
585              .WORD  .T000044,.T000045
586              .WORD  .T000042
587  .MFFMUL  SET    1
588              JSR    .FFMUL
589              .BYTE  0
590              .WORD  .T000042,.T000049
591              .WORD  .T000044
592  .MFFDIV  SET    1
593              JSR    .FFDIV
594              .BYTE  0
595              .WORD  .T000044,TP311103
596              .WORD  T2111103
597       !                                                              08660042
598  .MFFSUB  SET    1
599              JSR    .FFSUB
600              .BYTE  0
601              .WORD  T1111103,T2111103
602              .WORD  -FCNPTV03
603       !  RETURN                                                      08670042
604              JMP    .R000037
605       !  END                                                         08680042
606  .R000037 RTS
```

CONCLUSION

From the above, it is apparent that the method of the present invention as described hereinbefore provides a well-log interpreter with a strong tool for determining amounts of gas/oil-filled reservoirs in variety of structural combinations, e.g., in sand, limestone, etc. However, the invention is not limited to the above structural combinations but is applicable to other anomalous circumstances as known to those skilled in the art. E.g., while the above presentations were directed in the most part to creating synthetic gas/oil-indicating characteristics for sandstones, limestones or dolostone at different saturations, other strata can be used. It should thus be understood that the invention is not limited to any specific embodiments set forth herein, as variations are readily apparent, and thus the invention is to be given the broadest possible interpretation within the terms of the following claims.

What is claimed is:

1. Method for resolving events of an acoustic log of a first well associated with at least a selected zone of an earth formation so as to determine gas/oil fractions therein by creating synthetic gas/oil-indicating characteristics from brine-saturated petrophysical parameters corresponding to said selected zone of interest at a second well, including P-wave velocity, bulk density and porosity, with or without mineralogical inputs, as a function of gas/oil saturation, temperature and pressure (depth), but without shear-wave velocity inputs, comprising the steps of:

(a) selecting a lithology for said second well at said selected zone of interest from a group comprising sandstone, limestone and dolostone:
   (b) from brine-saturated bulk and shear moduli (Kw* and Gw*) calculated from empirical equations including true brine-saturated P-wave modulus values (Pw*) of a sample which corresponds to said zone of interest based on well logging or geologic data, and estimated frame modulus values (Ka) of said zone of interest, predicting a plurality of bulk moduli (K*) with gas/oil present in said zone of interest in preselected amounts:
   (c) predicting a multiplicity of P-wave moduli of said zone with gas/oil present (Pgas/oil*) in said preselected amounts based on the relationship $$\hat{P}_{gas/oil}^* = \hat{K}_{gas/oil}^* + (4/3)\hat{G}_w^*$$

where $\hat{P}_{gas/oil}^*$ is a multiplicity of predicted P-wave moduli with gas/oil present in said preselected amounts; $\hat{K}_{gas/oil}^*$ is a plurality of predicted bulk moduli of said zone with gas/oil present in said preselected amounts; $\hat{G}_w^*$ is the brine-saturated shear modulus of said zone;
   (d) predicting from acoustic velocities within said zone calculated from step (c) as a function of different gas/oil gravities and saturations, synthetic acoustic values based on a relationship involving variation of said values as a function of different gas/oil gravities and saturations; and
   (e) comparing said synthetic values indexed to different gas/oil gravities and/or saturations with actual field-produced values produced from said acoustic log to predict amounts of gas/oil in said zone of interest.

2. Method of claim 1 in which each of said predicted bulk moduli K* includes a gas bulk modulus component KADGAS calculated under an adiabatic form of Benedict-Webb-Rubin in accordance with the equation $$KADGAS = C_p/C_v \cdot KISOGAS$$

where Cp is the specific heat of gas at constant pressure, Cv is the specific heat of gas at constant volume and KISOGAS is the isothermal form of Benedict-Webb-Rubin equal to $$K_{isog\,pr} P_{pc} = XT_{pr} + 2S_1 X^2 + 3S_2 X^3 + 6S_3 X^3 +$$

where:

$$C_r e^{-\gamma_r X^2} (2\gamma_r X^2 - 7\gamma_r X^5 + 3X^3)/T_{pr}^2$$

(i) Kisog*pr is the pseuco-reduced bulk modulus equal to the first term of the above equation in which X is the reciprocal of the pseudo-reduced volume, Tpr is the pseudo temperature, Cr and gamma-r are coefficients and $S_1$ and $S_2$ are functions of Tr and $S_3$ is a function of gamma-r; and
   (ii) Ppc is the pseudo-critical pressure which varies as a function of gas gravity (gamma).

3. Method of claim 2 in which said determination of synthetic characteristics is limited to estimations of gas fractions only so that comparisons with actual field data is on a similar gas-only basis.

4. Method of claim 2 in which said determination of synthetic characteristics is limited to estimations of oil fractions only whereby comparisons with actual field data is in a similar oil-only basis.

5. System for resolving event characteristics of an acoustic log of a first well so as to determine gas/oil fractions in a selected zone of an earth formation by creating synthetic gas-indicating characteristics from brine-saturated petrophysical parameters corresponding to said selected zone of interest associated with a second well, including P-wave velocity, bulk density and porosity, with or without mineralogical inputs, as a function of computed values of a gas/oil saturation, temperature and pressure (depth) but without shear-wave velocity input, comprising:

(A) a digital programmable computer for:
   (i) selecting a lithology for said selected zone of interest of said second well from a group comprising sandstone, limestone and dolestone;
   (ii) predicting brine-saturated bulk and shear moduli (Kw* and Gw*) using empirical equations containing coefficients and P-wave modulus values (Pw*), said coefficients varying in empirical fashion as a function of at least porosity, pressure and temperature, said P-wave modulus value (Pw*) being a true P-wave modulus value for a brine-saturated sample which corresponds to said zone of interest based on well logging or geologic data;
   (iii) estimating frame modulus values (Ka) of said zone of interest using a relationship involving Kw*, Kb, Km and $\phi$, where Kw* is brine-saturated bulk density of the aggregate, Kb is the bulk modulus of brine, and Km is the bulk modulus of the solid material making up the zone of interest and $\phi$ is porosity;
   (iv) predicting bulk modulus K* with the gas/oil present in said zone of interest using a relationship involving Ka of step (ii), Km, $\phi$, Kf, where Kf is the bulk modulus of a liquid-gas mixture of a selected oil/gas gravity and saturation;
   (v) assuming Gw* is equal to Ggas/oil*, predicting P-wave modulus of the zone with gas/oil present (Pgas/oil*) based on the relationship $$\hat{P}gas/oil/oil^* = Kgas^* + (4/3)Gw^*$$

(vi) predicting at least acoustic velocities within said zone at said second well from said P-wave modulus values (Pgas/oil*) of step (v) as a function of said selected gas/oil gravity and saturation; and (B) comparitor means connected to (A) for comparing said predicted velocities or derivations thereof with actual velocities or derivations thereof, from said acoustic log of said first well to predict presence and amounts of gas/oil fractions in said zone of interest at said first well.

6. System of claim 5 in which said computer under (iv) also predicts a gas bulk modulus component (KADGAS) for each of said predicted bulk moduli K* under an adiabic form of the Benedict-Webb-Rubin equation in accordance with $$KADGAS = Cp/Cv \cdot KISOGAS$$

where Cp is the specific heat of gas at constant pressure, Cv is the specific heat of gas at constant volume and KISOGAS is the isothermal form of Benedict-Webb-Rubin equal to $$\frac{K_{isog}}{prP_{pc}} = XT_{pr} + 2S_1 X^2 + 3S_2 X^3 + 6S_3 X^6 + C_r e^{-\gamma_r X^2}(-2\gamma_r X^2 - 7\gamma_r X^5 + 3X^3)/T_{pr}^2$$

where:
(i) Kisog*pr is the pseudo-reduced bulk modulus equal to the first term of the above equation in which X is the reciprocal of the pseudo-reduced volume, Tpr is the pseudo temperature, Cr and gamma-r are coefficients and $S_1$ and $S_2$ are functions of Tr and S3 is a function of gamma-r; and
(ii) Ppc is the pseudo-critical pressure which varies as a function of gas gravity (gamma).

7. System of claim 6 in which (iv)–(vi) of (A) are repeated for gas/oil-brine mixtures of different gas/oil gravities and saturations to provide, for said second well, a suite of velocities for said zone of interest as the function of a plurality of gas/oil saturations, and in which (B) compares said suite of velocities with actual logging velocities of said first well to provide a best match therebetween and so predict amount of gas/oil in said zone at said first well.

8. System of claim 7 in which (B) repeats in sequence velocity comparisons for different zones of said earth formation and at different depths within said formation so as to provide a multiplicity of compared and predicted gas/oil-saturated zones of said formation as a function of depth.

9. System for resolving event characteristics of a sonic log of a first well so as to determine gas/oil fractions in a selected zone of an earth formation by creating synthetic gas/oil-indicating characteristics from brine-saturated petro-physical parameters corresponding to said selected zone of interest but associated with a second well, as a function of computed values of gas/oil saturation, temperature and pressure (depth), but without shear-wave velocity inputs, comprising:

(A) a programmable digital computer for:
(i) selecting a lithology for said selected zone of interest of said first and second wells from a group comprising sandstone, limestone and dolostone;
(ii) from calculated normalized brine-saturated petrophysical parameters involving true laboratory and/or well-log generated brine-saturated P-wave modulus values for a brine-saturated rock sample corresponding to said zone of interest, predicting compressional velocities of said zone with gas/oil in differing amounts present in said zone, in accordance with the relationship $$V_p = \left[ 1/\rho_b \left( \hat{K}_a + \frac{(1 - \hat{K}_a/K_m)^2}{\phi/K_f + (1 - \phi)/K_m - \hat{K}_a/K_m^2} + (4/3)\hat{G}^* \right) \right]^{\frac{1}{2}}$$

where rho-B is the bulk density, $\phi$ is the porosity, G* is the shear modulus at the saturations of interest, Kf equals the bulk modulus for the liquid-gas mixture, Ka is the frame modulus Km is the bulk modulus of a hypothetical rock, i.e., same composition but perfectly cemented with zero porosity;

(iii) from sonic velocities of said zone calculated from (ii), predicting synthetic sonic information with gas/oil present in said zone; and (iv) comparing said predicted sonic information with gas/oil present with actual field-acquired logging data of said first well so as to determine both presence and amounts of gas/oil within said zone of interest at said first well.

10. System of claim 9 in which (ii) is further characterized by:
simultaneously solving through iteration the following equations:

$$\rho_B V_p^2 = P^* = K^* + (4/3)G^* \quad (1)$$

$$(K^* - K_a)/K_m = K_{fc}/K_m = b - a = \frac{(1-a)^2}{f\phi + (1-a)} = \frac{(1-b)^2}{f\phi - (1-b)} \quad (2)$$

$$a - q = f_3(c, a + g) \quad (3)$$

to provide estimations of Ka and G* as a function of fluid saturation, where:
rho-B is the bulk density of the zone of interest,
Vp is the compressional velocity,
p* is the P-wave modulus at said saturations of interest,
K* is the bulk modulus at said saturations of interest,
G* is the shear modulus at said saturations of interest,
Ka and Ga are frame moduli,
Kfc is the fluid correction equal to K*−Ka,
Km and Gm are the bulk and shear moduli of a hypothetical rock (i.e., same composition but perfectly cemented with zero porosity),
$\phi$ = porosity
a = Ka/Km
b = K*/Km
g = G*/Gm = Ga/Gm
f = (Km/Kf) − 1
C is an empirical parameter and
$f_3$ describes a functional operator which relates to the variables of interest of Equation (3).

11. System of claim 9 in which (ii) is further characterized by the substeps of:
(i)' predicting brine-saturated bulk and shear moduli ($Kw^*$ and $Gw^*$) using empirical equations containing coefficients and P-wave modulus values ($Pw^*$), said coefficients varying in empirical fashion as a function of at least porosity, pressure and temperature, said P-wave modulus value ($Pw^*$) being a true P-wave modulus value for a brine-saturated sample which corresponds to said zone of interest based on well logging or geologic data, said shear modulus $Gw^*$ being equal to $Ggas/oil^*$ where $Ggas/oil^*$ is the shear modulus of said zone with gas/oil present;
(ii)' estimating frame modulus values (Ka) of said zone of interest using a relationship involving $Kw^*$, Kb, Km and $\phi$, where $Kw^*$ is brine-saturated bulk density of the aggregate, Kb is the bulk modulus of brine, and Km is the bulk modulus of the solid material making up the zone of interest and $\phi$ is porosity.

12. System of claim 9 in which (iv) is provided by a separate comparitor means connected to said computer.

* * * * *